United States Patent
Chen et al.

(10) Patent No.: US 12,276,904 B2
(45) Date of Patent: *Apr. 15, 2025

(54) CONTROLLABLE APERTURE STOP, COMPACT CAMERA MODULE AND ELECTRONIC DEVICE

(71) Applicant: LARGAN PRECISION CO., LTD., Taichung (TW)

(72) Inventors: Hao Jan Chen, Taichung (TW); Yu Chen Lai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,045

(22) Filed: Jan. 25, 2024

(65) Prior Publication Data

US 2024/0160086 A1 May 16, 2024

Related U.S. Application Data

(63) Continuation of application No. 17/833,959, filed on Jun. 7, 2022, now Pat. No. 11,921,417.

(30) Foreign Application Priority Data

Feb. 25, 2022 (TW) ................................. 111107076

(51) Int. Cl.
 *G03B 9/06* (2021.01)
 *G03B 30/00* (2021.01)
(52) U.S. Cl.
 CPC ............... *G03B 9/06* (2013.01); *G03B 30/00* (2021.01)

(58) Field of Classification Search
 CPC .. G03B 9/05; G03B 9/06; G02B 27/646–648; G02B 7/04–105; G02B 5/005
 See application file for complete search history.

(56) References Cited

U.S. PATENT DOCUMENTS

| 4,731,626 A | 3/1988 | Kawamoto |
| 9,223,118 B2 | 12/2015 | Mercado |

(Continued)

FOREIGN PATENT DOCUMENTS

| CN | 108933886 A | 12/2018 |
| CN | 110579926 A | 12/2019 |

(Continued)

OTHER PUBLICATIONS

European Search Report dated Apr. 3, 2023 as received in application No. 22188730.0.

*Primary Examiner* — Leon W Rhodes, Jr.
(74) *Attorney, Agent, or Firm* — Maschoff Brennan

(57) ABSTRACT

A controllable aperture stop includes a light pass portion, a fixed portion, a driving part and rollable elements. The light pass portion includes movable blades together surrounding a light pass aperture. The fixed portion has shaft structures corresponding to the movable blades. The driving part includes a rotatable element, a magnet and a coil. The rotatable element is for driving the movable blades to rotate relative to the shaft structures to adjust the size of the light pass aperture. The magnet is disposed on the rotatable element. The coil corresponds to the magnet. The magnet and the coil are to drive the rotatable element to rotate around the light pass aperture. The rollable elements are disposed between the fixed portion and the rotatable element and arranged around the light pass aperture, so the rotatable element is rotatable relative to the fixed portion.

19 Claims, 43 Drawing Sheets

(56) References Cited

U.S. PATENT DOCUMENTS

| | | | |
|---|---|---|---|
| 10,969,653 B2 | 4/2021 | Kim | |
| 11,921,417 B2 * | 3/2024 | Chen | ................ G03B 30/00 |
| 2006/0120644 A1 | 6/2006 | Smith | |
| 2012/0251095 A1 | 10/2012 | Ono | |
| 2019/0373145 A1 | 12/2019 | Yu | |

FOREIGN PATENT DOCUMENTS

| | | |
|---|---|---|
| CN | 110858048 A | 3/2020 |
| CN | 112099225 A | 12/2020 |
| CN | 112147772 A | 12/2020 |
| CN | 112262566 A | 1/2021 |
| CN | 113259545 A | 8/2021 |
| EP | 3805817 A1 | 4/2021 |
| JP | 2005249812 A | 9/2005 |
| JP | 2009-195084 | 8/2009 |
| KR | 20200107457 A | 9/2020 |
| WO | 2022257989 A1 | 12/2022 |

\* cited by examiner

CONTROLLABLE APERTURE STOP, COMPACT CAMERA MODULE AND ELECTRONIC DEVICE

RELATED APPLICATIONS

This application is a continuation patent application of U.S. application Ser. No. 17/833,959, filed on Jun. 7, 2022, which claims priority to Taiwan Application 111107076, filed on Feb. 25, 2022, which is incorporated by reference herein in its entirety.

BACKGROUND

Technical Field

The present disclosure relates to a controllable aperture stop, a compact camera module and an electronic device, more particularly to a controllable aperture stop and a compact camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, compact camera modules are applied in more and more fields, such as portable devices (e.g., smartphones, action cameras), augmented reality and virtual reality head-mounted devices or aerial cameras. Moreover, the hardwares of the compact camera modules are constantly upgraded, such as larger image sensors and imaging lenses with better image quality. A larger image sensor provides better image quality, but the background in the pictures may become blurry. Conventionally, controllable aperture stops can be used to adjust the blur degree of the background and control the amount of incident light. However, due to the limitation of the size, it is difficult for the camera modules to be equipped with controllable aperture stops. In specific, there are some problems occurring when conventional controllable aperture stops are applied to compact camera modules. For example, light-blocking blades can be easily damaged with the reduction of the size of camera modules, the total weight may be too heavy, and several precision requirements (e.g., the size and position precisions of light pass aperture) cannot be satisfied.

SUMMARY

According to one aspect of the present disclosure, a controllable aperture stop includes a light pass portion, a fixed portion, a driving part and a plurality of rollable elements. The light pass portion includes a plurality of movable blades, and the movable blades together surround a light pass aperture. The fixed portion has a plurality of shaft structures respectively disposed corresponding to the movable blades. The driving part includes a rotatable element, a first magnet and a first coil. The rotatable element is connected to the movable blades, and the rotatable element is configured to drive the movable blades to rotate respectively relative to the shaft structures so as to adjust a size of the light pass aperture. The first magnet is disposed on the rotatable element. The first coil is disposed corresponding to the first magnet, and the first coil is located farther away from the light pass aperture than the first magnet to the light pass aperture. The first magnet and the first coil are configured to drive the rotatable element to rotate around the light pass aperture. The rollable elements are disposed between the fixed portion and the rotatable element and arranged around the light pass aperture, so that the rotatable element can be rotated relative to the fixed portion. In addition, when a farthest distance between the first magnet and a central axis of the light pass aperture is rm, a shortest distance between the first coil and the central axis is rc, and a shortest distance between the rollable elements and the central axis is rb, the following conditions are satisfied:

$0.5 \leq rm/rc < 1$; and $0.6 \leq rb/rm \leq 1.8$.

According to another aspect of the present disclosure, a controllable aperture stop includes a light pass portion, a fixed portion, a driving part and a plurality of rollable elements. The light pass portion includes a plurality of movable blades, and the movable blades together surround a light pass aperture. The fixed portion has a plurality of shaft structures respectively disposed corresponding to the movable blades. The driving part includes a rotatable element, a first magnet and a first coil. The rotatable element is connected to the movable blades, and the rotatable element is configured to drive the movable blades to rotate respectively relative to the shaft structures so as to adjust a size of the light pass aperture. The first magnet is disposed on the rotatable element. The first coil is disposed corresponding to the first magnet, and the first coil is located farther away from the light pass aperture than the first magnet to the light pass aperture. The first magnet and the first coil are configured to drive the rotatable element to rotate around the light pass aperture. The rollable elements are disposed between the fixed portion and the rotatable element and arranged around the light pass aperture, so that the rotatable element can be rotated relative to the fixed portion. In addition, the fixed portion includes a frame element, and the frame element is in physical contact with the rollable elements so as to support the rollable elements and the rotatable element. The frame element includes a metal component and a clad component, and the metal component is insert-molded with the clad component to together form the frame element. The metal component has a plurality of filled holes, and the clad component is filled into the filled holes. The filled holes and the first magnet do not overlap with each other in a direction parallel to a central axis of the light pass aperture.

According to another aspect of the present disclosure, a controllable aperture stop includes a light pass portion, a fixed portion, a driving part and a plurality of rollable elements. The light pass portion includes a plurality of movable blades, and the movable blades together surround a light pass aperture. The fixed portion has a plurality of shaft structures respectively disposed corresponding to the movable blades. The driving part includes a rotatable element, a first magnet and a first coil. The rotatable element is connected to the movable blades, and the rotatable element is configured to drive the movable blades to rotate respectively relative to the shaft structures so as to adjust a size of the light pass aperture. The first magnet is disposed on the rotatable element. The first coil is disposed corresponding to the first magnet, and the first coil is located farther away from the light pass aperture than the first magnet to the light pass aperture. The first magnet and the first coil are configured to drive the rotatable element to rotate around the light pass aperture. The rollable elements are disposed between the fixed portion and the rotatable element and arranged around the light pass aperture, so that the rotatable element can be rotated relative to the fixed portion. In addition, the fixed portion includes a frame element, and the frame element is in physical contact with the rollable elements so as to support the rollable elements and the rotatable element. The frame element includes a metal component and a clad component, and the metal component is insert-molded with the clad component to together form the frame element. The metal component includes an attraction portion. The attraction portion is ferromagnetic and disposed corresponding to the first magnet so as to generate a magnetic attraction, and the magnetic attraction forces the first magnet and the rotatable element to exert a pressure on the rollable elements. The first magnet includes a first surface, a second surface and a connection surface. The first surface faces the first coil, and the second surface is located closer to the light pass aperture than the first surface to the light pass aperture. The connection surface is connected to the first surface and the second surface, and the attraction portion is disposed corresponding to the connection surface.

According to another aspect of the present disclosure, a controllable aperture stop includes a light pass portion, a fixed portion and a driving part. The light pass portion includes a plurality of movable blades, and the movable blades together surround a light pass aperture. The fixed portion has a plurality of shaft structures respectively disposed corresponding to the movable blades. The driving part includes a rotatable element, a first magnet, a first coil and an electronic component. The rotatable element is connected to the movable blades, and the rotatable element is configured to drive the movable blades to rotate respectively relative to the shaft structures so as to adjust a size of the light pass aperture. The first magnet is disposed on the rotatable element. The first coil is disposed corresponding to the first magnet, and the first coil is located farther away from the light pass aperture than the first magnet to the light pass aperture. The first magnet and the first coil are configured to drive the rotatable element to rotate around the light pass aperture. The electronic component has a position sensing circuit, the electronic component is disposed corresponding to the first magnet, and the electronic component is located farther away from the light pass aperture than the first magnet to the light pass aperture. In addition, when a farthest distance between the first magnet and a central axis of the light pass aperture is rm, a shortest distance between the first coil and the central axis is rc, and a shortest distance between the electronic component and the central axis is rp, the following conditions are satisfied:

$0.5 \le rm/rc < 1$; and $0.5 \le rm/rp < 1$.

According to another aspect of the present disclosure, a controllable aperture stop includes a light pass portion, a fixed portion, a driving part and a plurality of rollable elements. The light pass portion includes a plurality of movable blades, and the movable blades together surround a light pass aperture. The fixed portion has a plurality of shaft structures respectively disposed corresponding to the movable blades. The driving part includes a rotatable element, a first magnet and an electronic component. The rotatable element is rotatable around the light pass aperture, and the rotatable element is connected to the movable blades. The rotatable element is configured to drive the movable blades to rotate respectively relative to the shaft structures so as to adjust a size of the light pass aperture. The first magnet is disposed on the rotatable element. The electronic component has a position sensing circuit. The electronic component is disposed corresponding to the first magnet, and the electronic component is located farther away from the light pass aperture than the first magnet to the light pass aperture. The rollable elements are disposed between the fixed portion and the rotatable element and arranged around the light pass aperture, so that the rotatable element can be rotated relative to the fixed portion. In addition, when a farthest distance between the first magnet and a central axis of the light pass aperture is rm, a shortest distance between the electronic component and the central axis is rp, and a shortest distance of the plurality of rollable elements and the central axis is rb, the following conditions are satisfied:

$0.5 \le rm/rp < 1$; and $0.6 \le rb/rm \le 1.8$.

According to another aspect of the present disclosure, a compact camera module includes one of the aforementioned controllable aperture stops, and the controllable aperture stop is disposed on an aperture position of the compact camera module. In addition, when a focal length of the compact camera module is f, and an aperture area of the light pass aperture is a1, the following condition is satisfied:

$1.19 \le f/\sqrt{(a1)} \le 11.99$.

According to another aspect of the present disclosure, an electronic device includes the aforementioned compact camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
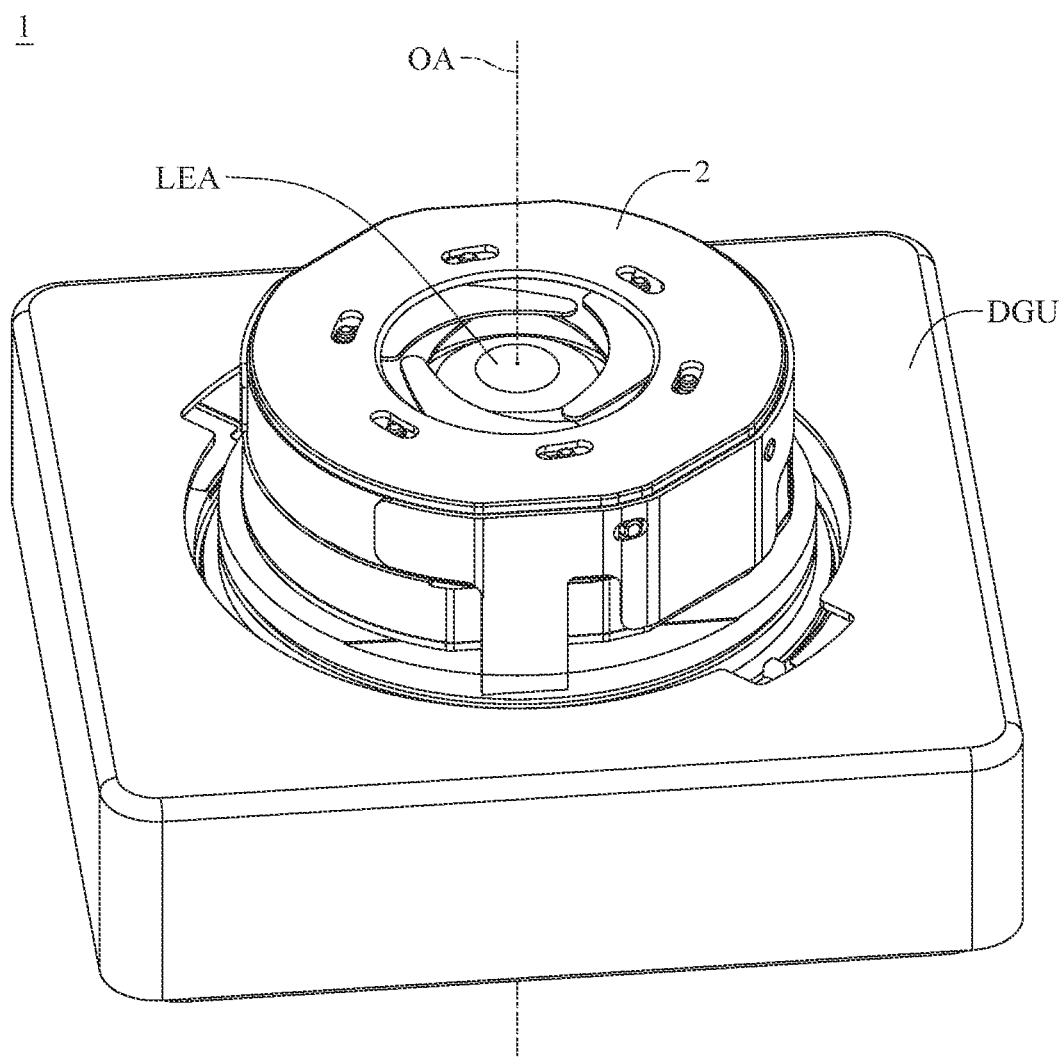
FIG. 1 is a perspective view of a compact camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a controllable aperture stop. The controllable aperture stop includes a light pass portion, a fixed portion and a driving part. The light pass portion includes a plurality of movable blades, and the movable blades together surround a light pass aperture. The fixed portion has a plurality of shaft structures respectively disposed corresponding to the movable blades. The driving part includes a rotatable element and a first magnet. The rotatable element is rotatable around the light pass aperture and connected to the movable blades, and the rotatable element is configured to drive the movable blades to rotate respectively relative to the shaft structures so as to adjust the size of the light pass aperture. In addition, the first magnet is disposed on the rotatable element so as to prevent a backlash between mechanical parts, thereby increasing the dimensional accuracy of the light pass aperture.

The driving part can further include a first coil disposed corresponding to the first magnet. In addition, the first coil is located farther away from the light pass aperture than the first magnet to the light pass aperture, so that the overlapping between components can be reduced, thereby allowing the components to be more easily positioned during assembling and reducing the height of the controllable aperture stop in a direction of a central axis of the light pass aperture. Moreover, the first magnet and the first coil are configured to drive the rotatable element to rotate around the light pass aperture. Moreover, when a farthest distance between the first magnet and the central axis of the light pass aperture is rm, and a shortest distance between the first coil and the central axis is rc, the following condition can be satisfied: $0.5 \leq rm/rc < 1$. Therefore, a proper corresponsive position between the first magnet and the first coil is favorable for the operation of the driving part. Moreover, the following condition can also be satisfied: $0.8 \leq rm/rc \leq 0.99$. Moreover, the following condition can also be satisfied: $0.9 \leq rm/rc \leq 0.97$. Please refer to FIG. 14, which shows a schematic view of rm and rc according to the 1st embodiment of the present disclosure. Said farthest distance between the first magnet and the central axis can refer to a distance between one side of the first magnet located farthest away from the light pass aperture and the central axis of the light pass aperture.

The controllable aperture stop can further include a plurality of rollable elements, and the rollable elements are disposed between the fixed portion and the rotatable element and arranged around the light pass aperture, so that the rotatable element is rotatable relative to the fixed portion. Moreover, the rollable elements can be, for example, balls, cylinders or frustums, but the present disclosure is not limited thereto. Furthermore, the rollable elements can be made of materials, such as metal, ceramic or plastic materials, but the present disclosure is not limited thereto. Moreover, when a shortest distance between the rollable elements and the central axis is rb, and the farthest distance between the first magnet and the central axis is rm, the following condition can be satisfied: $0.6 \leq rb/rm \leq 1.8$. Therefore, a proper corresponsive position between the first magnet and the rollable elements is favorable for preventing deformation of the rotatable element caused by the first magnet. Moreover, the following condition can also be satisfied: $0.7 \leq rb/rm \leq 1.5$. Moreover, the following condition can also be satisfied: $0.8 \leq rb/rm \leq 1.2$. Please refer to FIG. 14, which shows a schematic view of rb and rm according to the 1st embodiment of the present disclosure.

The fixed portion can include a frame element in physical contact with the rollable elements so as to support the rollable elements and the rotatable element. The frame element can have a through hole disposed corresponding to the light pass aperture. In addition, the frame element can include a metal component and a clad component, and the metal component is insert-molded with the clad component to together form the frame element. The metal component is configured to enhance the mechanical strength of the frame element, so that the frame element can carry the rollable elements and the rotatable element, and the size of the frame element can be reduced. The metal component can have a plurality of filled holes, and the clad component is filled into the filled holes. The filled holes are configured to increase the molding accuracy of the frame element so as to prevent misalignment and warpage of the metal component. Moreover, the clad component can be made of, for example, plastic or ceramic materials, but the present disclosure is not limited thereto. Moreover, the filled holes and the first magnet may not overlap with each other in the direction parallel to the central axis of the light pass aperture, such that the filled holes are not corresponding to the first magnet, thereby preventing influences on the uniformity of the magnetic field of the first magnet. Moreover, the filled holes can be half holes or full holes. Moreover, the shape of each of the filled holes can be circular, oval, oblong, C-shaped or U-shaped according to actual design requirements, and the present disclosure is not limited thereto. Moreover, the filled holes can be, for example, through holes or blind holes.

The frame element of the fixed portion can have a plurality of recesses, and a part of the metal component is exposed by the recesses. Therefore, it is favorable for positioning the metal component. In addition, the recesses are respectively disposed corresponding to the filled holes of the metal component, and the filled holes are respectively partially exposed by the recesses. Therefore, the filled holes of the metal component can be in contact with the mold so as to increase the flatness of the metal component. Furthermore, the recesses can be, for example, ejection holes disposed corresponding to ejector pins of a mold, so that the demolding force can be applied on the metal component during the demolding process of the frame element, thereby reducing deformation of the frame element. Moreover, the filled holes can be disposed corresponding to the ejection holes so as to reduce the number of holes (e.g., recesses) of the clad component, thereby reducing defect rate.

The metal component can include an attraction portion. The attraction portion is ferromagnetic and disposed corresponding to the first magnet so as to generate a magnetic attraction, and the magnetic attraction forces the first magnet and the rotatable element to exert a pressure on the rollable elements. Therefore, the vibration of the rollable elements and the rotatable element in the direction parallel to the central axis of the light pass aperture can be reduced so as to stabilize the driving process and thus, prevent misalignment of the rotatable element. In some configurations, the metal component can be made of ferromagnetic material, such that the entire metal component is ferromagnetic; furthermore, the metal component is disposed corresponding to the first magnet so as to generate a magnetic attraction, and the magnetic attraction forces the first magnet and the rotatable element to exert a pressure on the rollable elements so as to reduce the vibration of the rollable elements and the rotatable element in the direction parallel to the central axis of the light pass aperture, thereby stabilizing the driving process and therefore preventing misalignment of the rotatable element. Moreover, the magnetic field direction generated by the first coil is different from the attraction direction between the metal component and the first magnet so as to prevent the pressure maintaining the rollable elements from being changed during the movement of the rotatable element, such that the rotatable element can move stably. Moreover, the filled holes and the first magnet may not overlap with each other in the direction parallel to the central axis of the light pass aperture, so that the filled holes and the first magnet do not correspond to each other, thereby ensuring the uniformity of the magnetic attraction.

The first magnet can include a first surface, a second surface and a connection surface. The first surface faces the first coil, the second surface is located closer to the light pass aperture than the first surface to the light pass aperture, and the connection surface is connected to the first surface and the second surface. Moreover, the attraction portion of the metal component is disposed corresponding to the connection surface. Through the magnetic circuit arrangement, the pressure exerted on the rollable elements may not be influenced by the magnetic field change of the first coil, thereby stabilizing the driving process.

The driving part can further include an electronic component, and the electronic component has a position sensing circuit configured to obtain the position information of the rotatable element. The electronic component is disposed corresponding to the first magnet, and the electronic component is located farther away from the light pass aperture than the first magnet to the light pass aperture, so that the overlapping between components can be reduced, thereby allowing the components to be more easily positioned during assembling and reducing the height of the controllable aperture stop in the direction of the central axis of the light pass aperture. Moreover, when the farthest distance between the first magnet and the central axis of the light pass aperture is rm, and a shortest distance between the electronic component and the central axis is rp, the following condition can be satisfied: $0.5 \leq rm/rp < 1$. Therefore, a proper corresponsive position between the first magnet and the electronic component is favorable for ensuring normal operation of the driving part. Moreover, the following condition can also be satisfied: $0.8 \leq rm/rp \leq 0.99$. Moreover, the following condition can also be satisfied: $0.9 \leq rm/rp \leq 0.97$. Please refer to FIG. 14, which shows a schematic view of rm and rp according to the 1st embodiment of the present disclosure.

In some configurations, the electronic component can be a driver controller, and the driver controller is electrically connected to the first coil so as to control the first coil to generate a desired magnet field. Therefore, the driver controller being disposed in the controllable aperture stop is favorable for reducing the number of required cables connected to external components, thereby simplifying manufacturing process.

The fixed portion can further include a shaft element, and the shaft element has the shaft structures. The shaft element and the frame element of the fixed portion are fixed to each other, and the rollable elements are disposed between the frame element and the rotatable element. Moreover, the shaft structures and the rollable elements are respectively disposed on the shaft element and the frame element, preventing the assembling errors from influencing the dimensional accuracy of the light pass aperture.

The frame element can further include a curved installation structure, and at least one of the rollable elements is disposed on the curved installation structure and movable along the curved installation structure in a direction around the light pass aperture. Therefore, a degree of freedom of movement of the rotatable element around the light pass aperture can be provided, and the movement of the rotatable element in a direction perpendicular to the central axis of the light pass aperture can be reduced, thereby increasing the movement stabilization of the rotatable element.

The fixed portion can further include a cover, and the movable blades are disposed between the cover and the rotatable element. Therefore, it is favorable for reducing misalignment of the movable blades in the direction parallel to the central axis of the light pass aperture so as to ensure the quality of the light pass aperture. Moreover, the cover can include a positioning hole, and the positioning hole is disposed corresponding to one of the shaft structures. Therefore, it is favorable for the cover to be positioned in a specific position. In some configurations, the cover can include a plurality of positioning holes, and the positioning holes are respectively disposed corresponding to the shaft structures. Moreover, the positioning hole can be, for example, a through hole or a blind hole.

The cover can further include an inner surface facing the movable blades. Moreover, an arithmetic average roughness (Ra) of the inner surface can be smaller than 0.25 μm. Therefore, it is favorable for reducing the friction between the cover and the movable blades so as to extend the service life of the controllable aperture stop. Moreover, the arithmetic average roughness (Ra) of the inner surface can also be smaller or equal to 0.2 μm. Moreover, the arithmetic average roughness (Ra) of the inner surface can also be smaller or equal to 0.17 μm.

The cover can further include an outer surface, and the outer surface is located farther away from the movable blades than the inner surface to the movable blades. In addition, a reflectivity of the outer surface is smaller than a reflectivity of the inner surface. Therefore, it is favorable for improving assembling efficiency so as to prevent the cover from being installed in a wrong direction, and reducing reflection of light on the outer surface so as to ensure the appearance and prevent glare. Furthermore, the outer surface can have various roughnesses to achieve a low reflectivity feature, or the outer surface can be provided with a low reflection layer, anti-reflection layer or light absorbing layer to achieve a low reflectivity feature but the present disclosure is not limited thereto.

The first magnet can be in an arc shape, and a direction of the arc shape corresponds to a rotation direction of the first magnet. Therefore, it is favorable for reducing the distance change between the first magnet and the first coil during movement so as to stabilize the magnetic field generated by the first magnet and the first coil.

The fixed portion can further include a top contact surface, and the movable blades are disposed on the top contact surface. Moreover, an arithmetic average roughness (Ra) of the top contact surface can be smaller or equal to 0.25 μm. Therefore, it is favorable for reducing the friction between the top contact surface and the movable blades so as to extend the service life of the controllable aperture stop. Moreover, the arithmetic average roughness (Ra) of the top contact surface can also be smaller or equal to 0.2 μm. Moreover, the arithmetic average roughness (Ra) of the top contact surface can also be smaller or equal to 0.17 μm.

The rotatable element can include a bottom contact surface, and the movable blades are disposed on the bottom contact surface. Moreover, an arithmetic average roughness (Ra) of the bottom contact surface can be smaller than 0.25 μm. Therefore, it is favorable for reducing the friction between the bottom contact surface and the movable blades so as to extend the service life of the controllable aperture stop.

The driving part can further include a driver controller electrically connected to the first coil so as to control the first coil to generate a required magnetic field. Therefore, the driver controller being disposed in the controllable aperture stop is favorable for reducing the number of required cables connected to external components, thereby simplifying manufacturing process.

The driver controller can have a position sensing circuit configured to obtain the position information of the rotatable element. Therefore, the function of position sensing being integrated into the driver controller is favorable for reducing the number of electronic component so as to improve assembling efficiency. Furthermore, the position sensing function of the position sensing circuit can be achieved by sensing the magnetic field change, and said magnetic field can be generated by magnets, but the present disclosure is not limited thereto. In other configurations, the position sensing function of the position sensing circuit can also be achieved by sensing light rays or sound signals, and the present disclosure is not limited thereto.

The plurality of movable blades can consist of a first blade assembly and a second blade assembly, the first blade assembly includes some of the movable blades, and the second blade assembly includes the other of the movable blades. Moreover, in the direction parallel to the central axis, the movable blades of the first blade assembly do not overlap with one another, the movable blades of the second blade assembly do not overlap with one another, and the first blade assembly and the second blade assembly at least partially overlap with each other. Moreover, in the direction around the light pass aperture, the movable blades of the first blade assembly at least partially overlap with one another, the movable blades of the second blade assembly at least partially overlap with one another, and the first blade assembly and the second blade assembly do not overlap with each other. Therefore, it is favorable for preventing friction between edges of the movable blades when the movable blades move so as to prevent wear of the movable blades, thereby extending the service life of the movable blades.

The driving part can further include a second magnet, and the second magnet and the first magnet are symmetrically arranged. Moreover, the driving part can further include a second coil, and the second magnet and the second coil are disposed symmetrical to the first magnet and the first coil.

Therefore, it is favorable for balancing the force so as to prevent movement of the rotatable element in the direction perpendicular to the central axis, thereby increasing the stability of the rotatable element.

When the controllable aperture stop is in a maximum aperture state, a difference between a farthest distance between a periphery of the light pass aperture and the central axis of the light pass aperture and a shortest distance between the periphery of the light pass aperture and the central axis of the light pass aperture can be smaller than 9.8%. Therefore, it is favorable for preventing glare caused by an unsmooth shape of light pass aperture, thereby ensuring optical quality. Moreover, when the controllable aperture stop is in the maximum aperture state, the difference between the farthest distance and the shortest distance between the periphery of the light pass aperture and the central axis of the light pass aperture can also be smaller than 7.4%. Furthermore, in a configuration where the light pass aperture is circular when the controllable aperture stop is in the maximum aperture state, distances between the periphery of the light pass aperture and the central axis are the same, and said distance between the periphery of the light pass aperture and the central axis is a radius of the light pass aperture.

The present disclosure provides a compact camera module including the aforementioned controllable aperture stop, and the controllable aperture stop is disposed on an aperture position of the compact camera module. In addition, when a focal length of the compact camera module is f, and an aperture area of the light pass aperture is a1, the following condition can be satisfied: $1.19 \leq f\sqrt{(a1)} \leq 11.99$.

The present disclosure provides an electronic device including the aforementioned compact camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
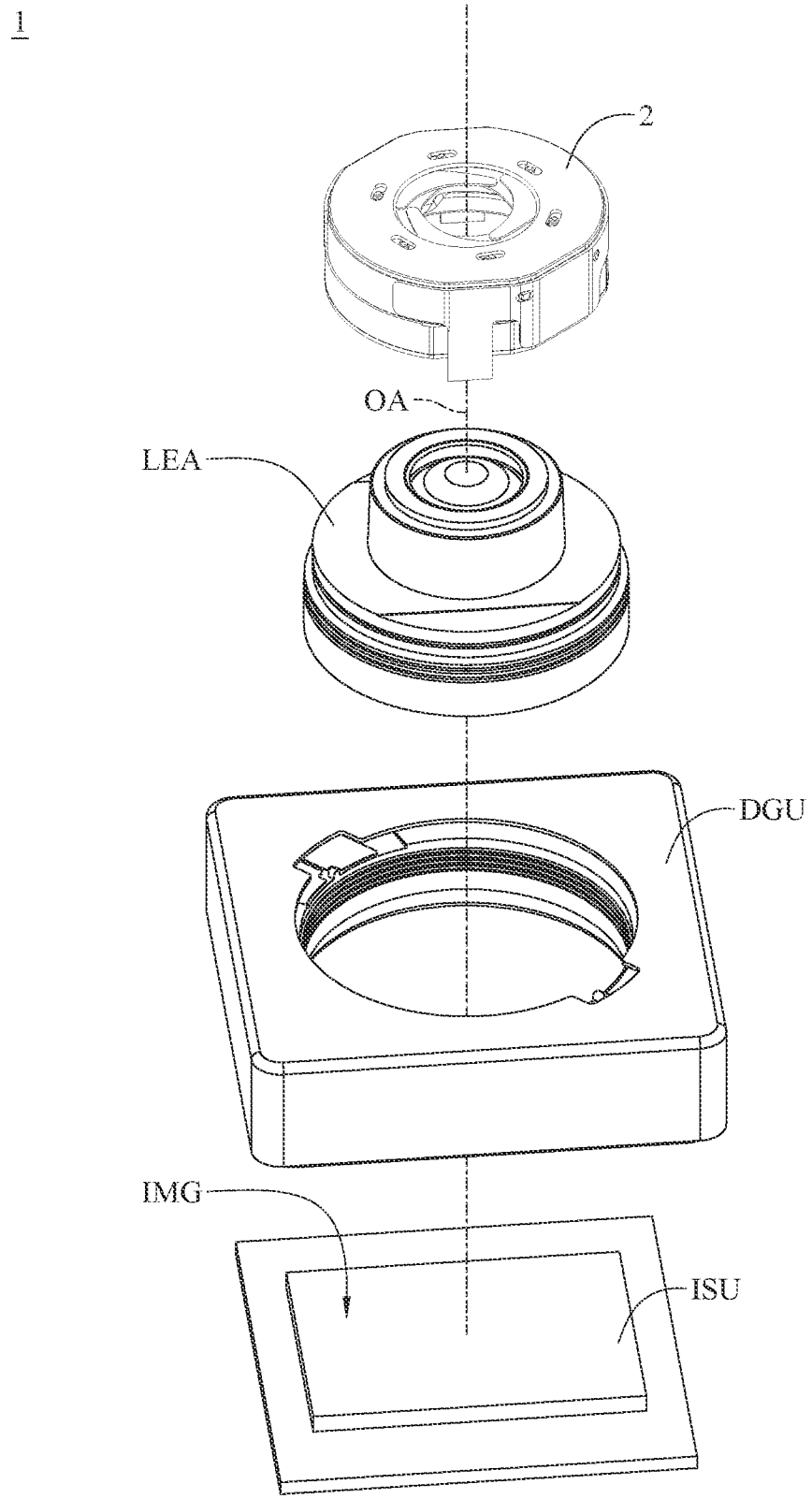
FIG. 2 is an exploded view of the compact camera module in FIG. 1.
Figure 3:
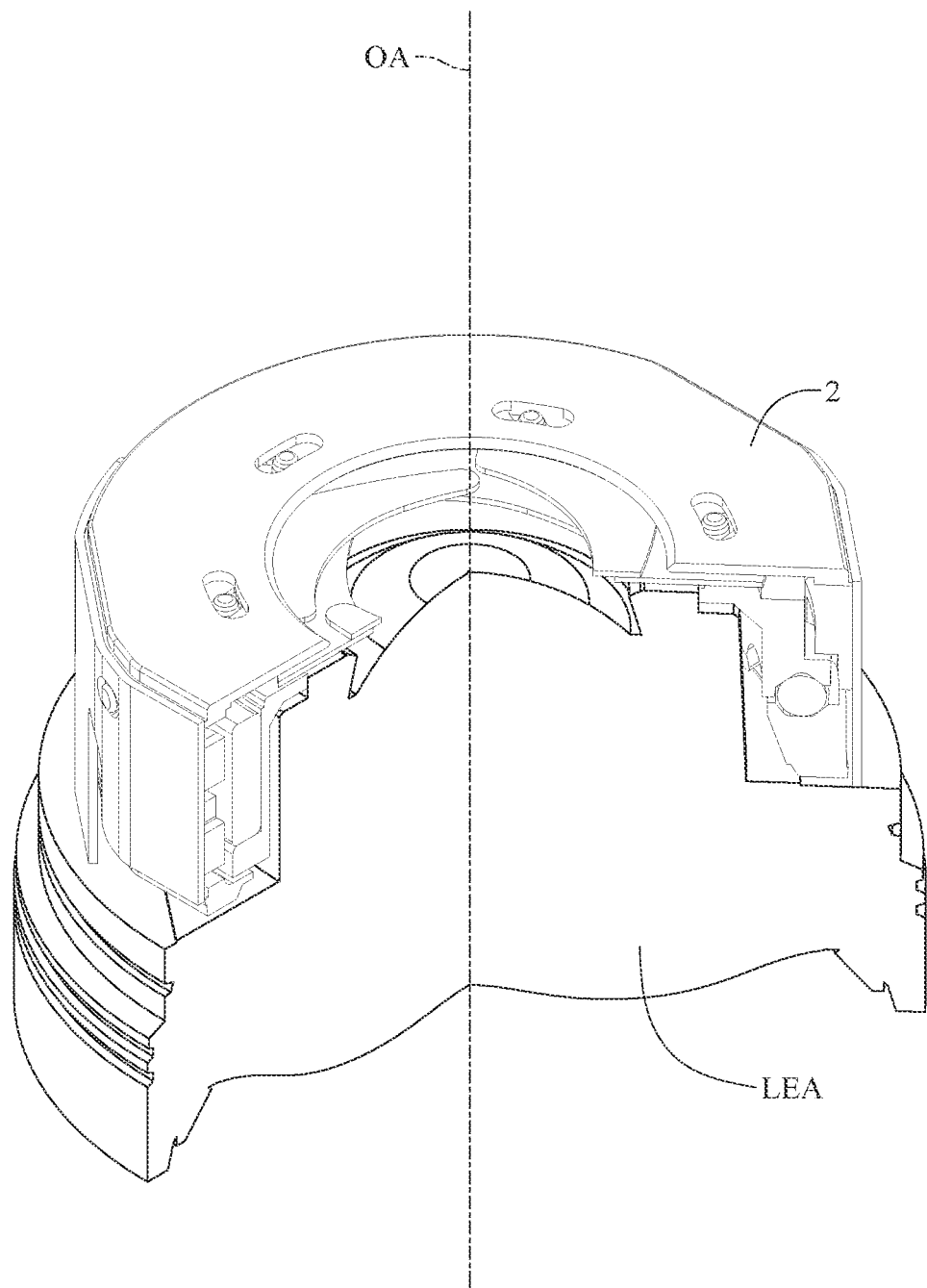
FIG. 3 is a sectional view of a controllable aperture stop and a lens assembly of the compact camera module in FIG. 1.
Figure 4:
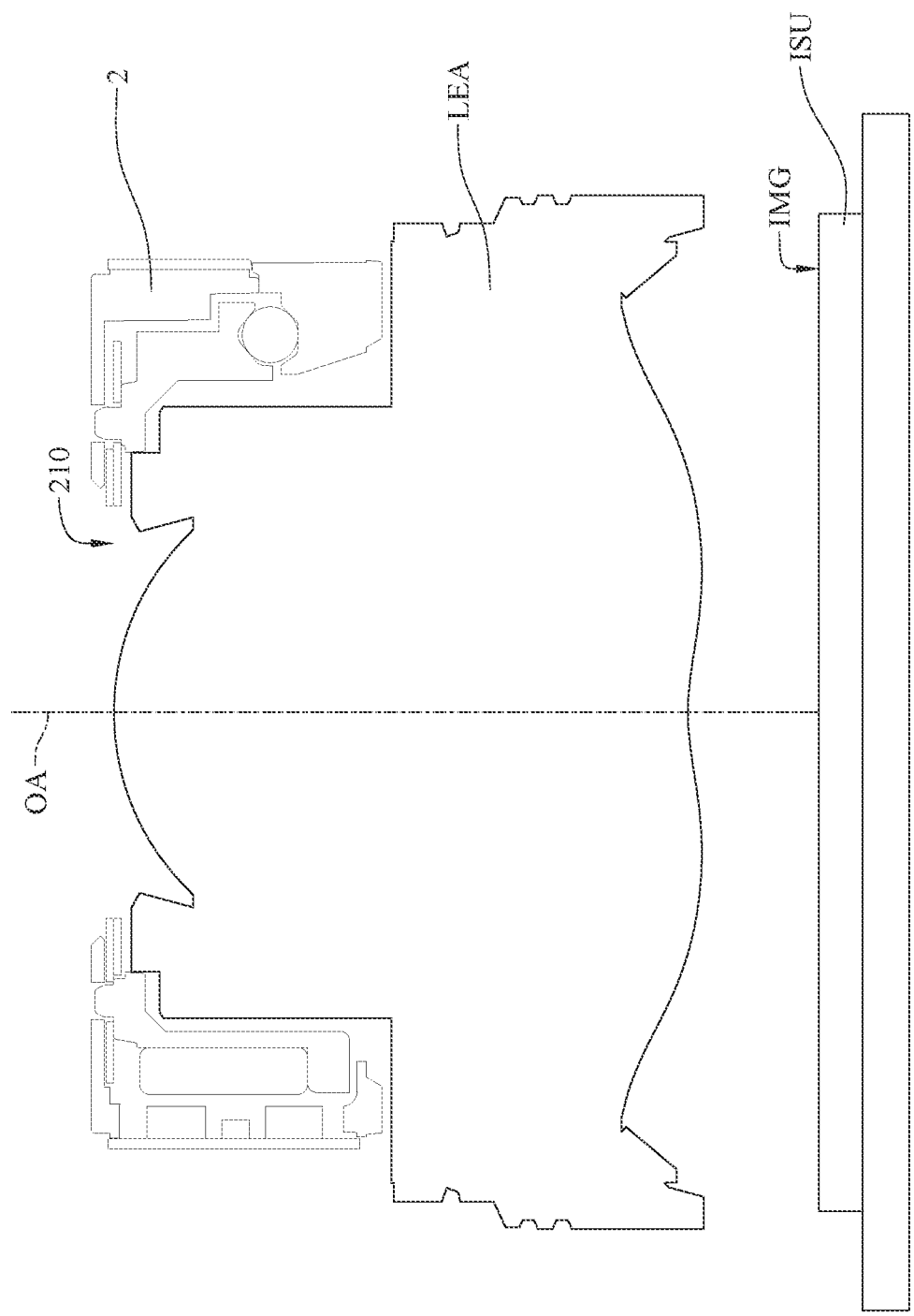
FIG. 4 is a side view of the controllable aperture stop and the lens assembly of the compact camera module in FIG. 3.
Figure 5:
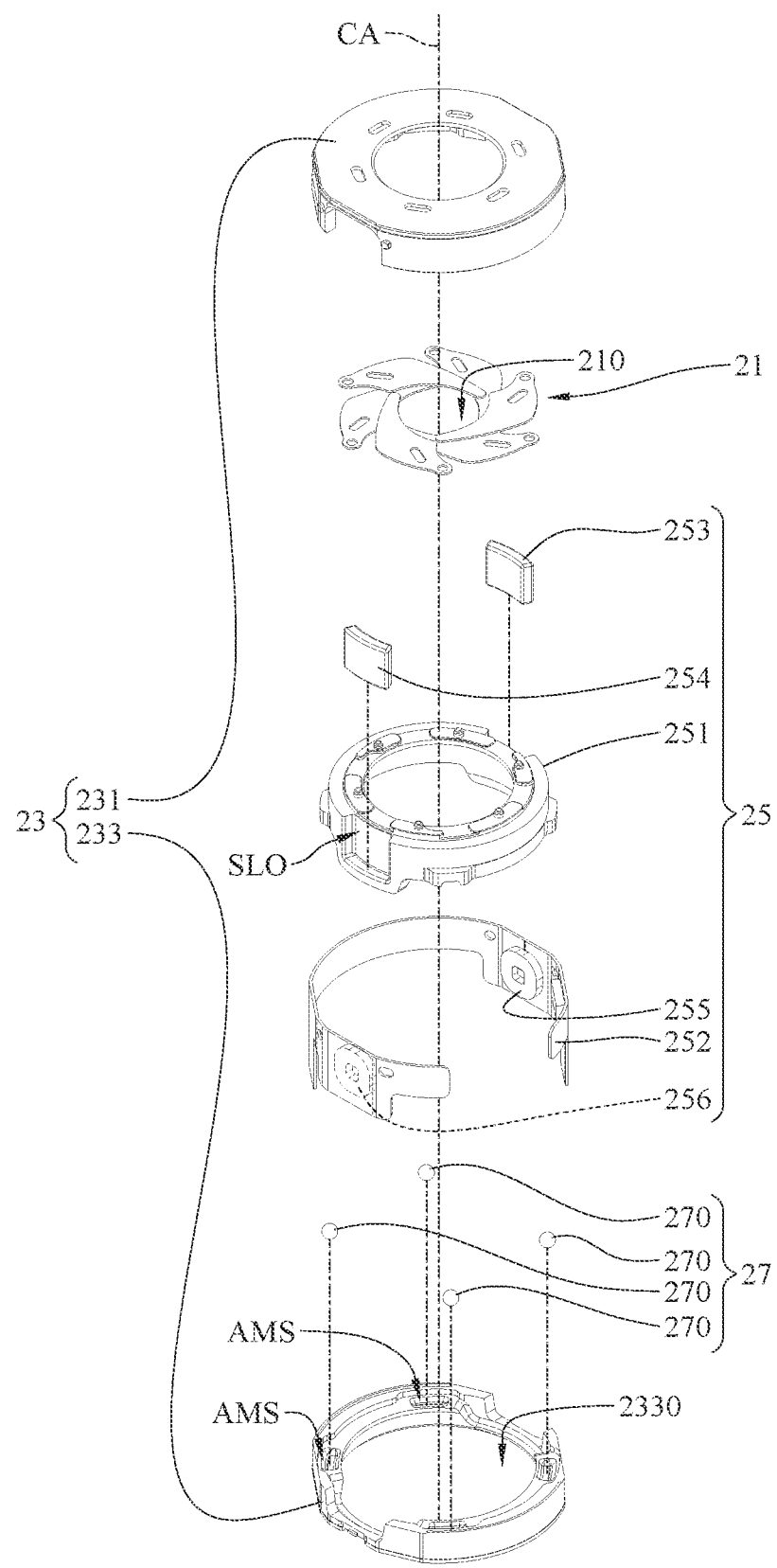
FIG. 5 is an exploded view of the controllable aperture stop of the compact camera module in FIG. 1.
Figure 6:
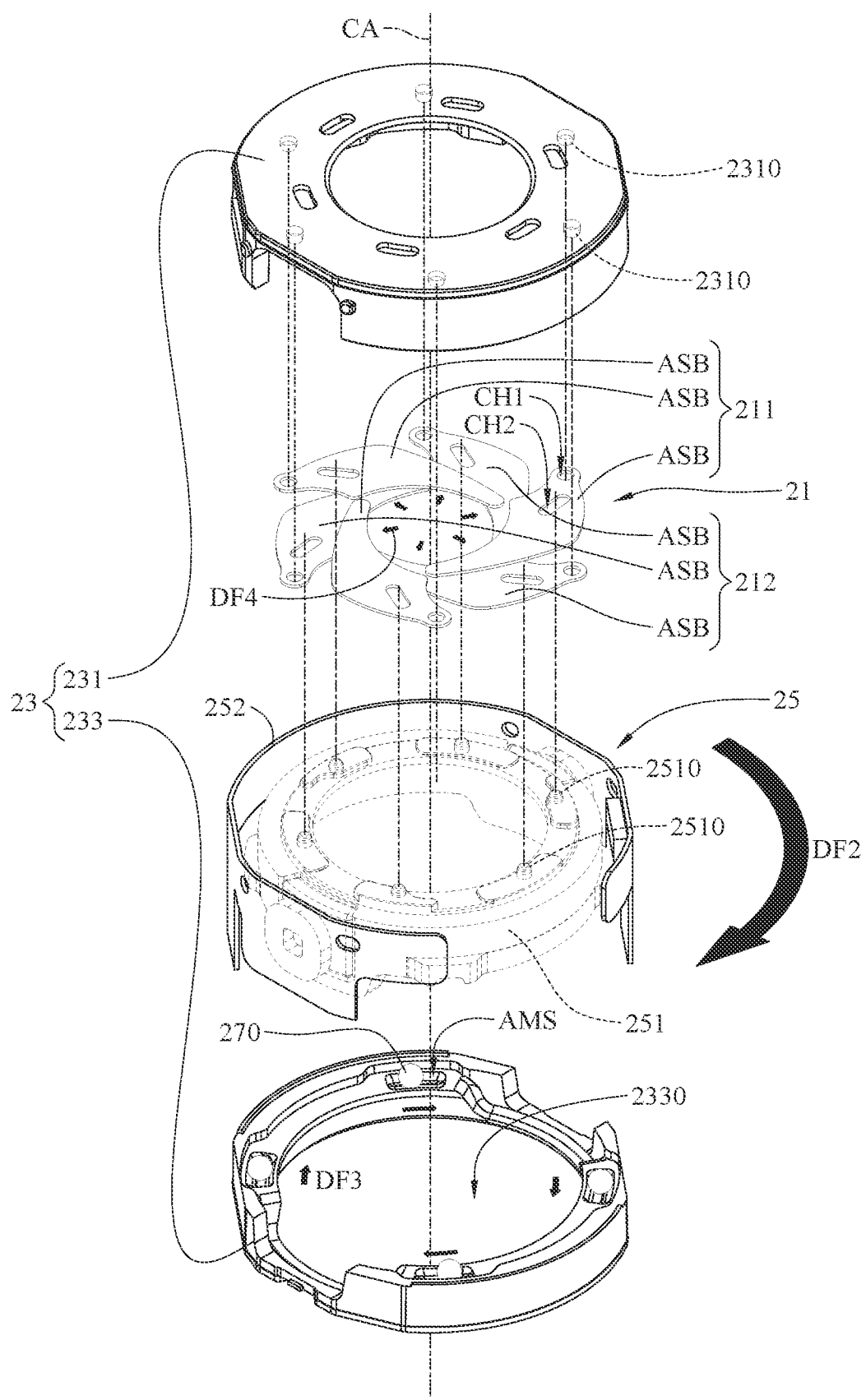
FIG. 6 is another exploded view of the controllable aperture stop of the compact camera module in FIG. 1.
Figure 7:
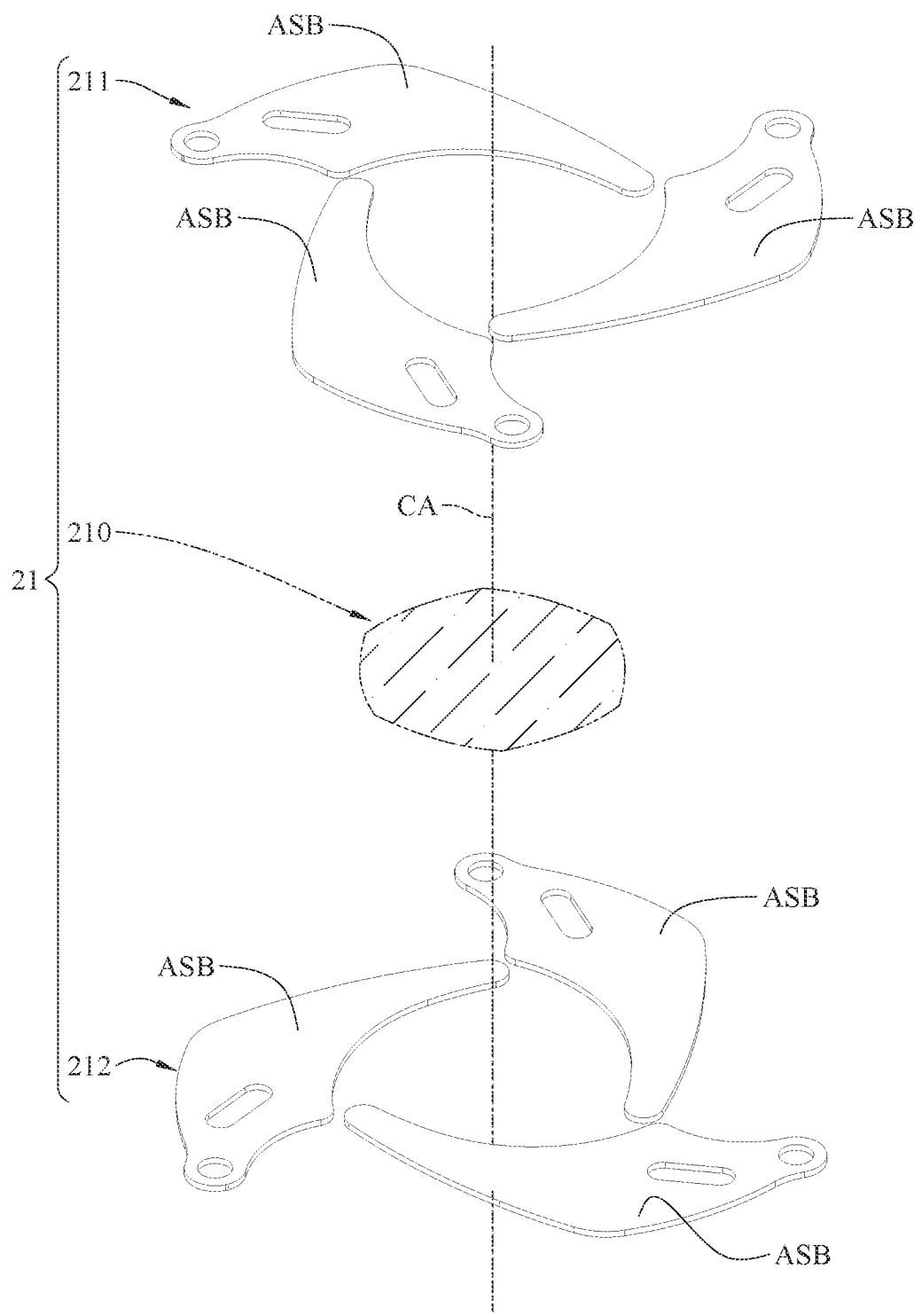
FIG. 7 is an exploded view of a light pass portion of the controllable aperture stop in FIG. 5.

FIG. 1 is a perspective view of a compact camera module according to the 1st embodiment of the present disclosure, FIG. 2 is an exploded view of the compact camera module in FIG. 1, FIG. 3 is a sectional view of a controllable aperture stop and a lens assembly of the compact camera module in FIG. 1, FIG. 4 is a side view of the controllable aperture stop and the lens assembly of the compact camera module in FIG. 3, FIG. 5 is an exploded view of the controllable aperture stop of the compact camera module in FIG. 1, FIG. 6 is another exploded view of the controllable aperture stop of the compact camera module in FIG. 1, and FIG. 7 is an exploded view of a light pass portion of the controllable aperture stop in FIG. 5.

In this embodiment, a compact camera module 1 includes a controllable aperture stop 2, a lens assembly LEA, a lens driving unit DGU and an image sensor ISU. Moreover, the controllable aperture stop 2 is disposed on an aperture position of the compact camera module 1, the lens driving unit DGU is configured to drive the lens assembly LEA to move along an optical axis OA of the lens assembly LEA, and the image sensor ISU is disposed on an image surface IMG of the lens assembly LEA.

The controllable aperture stop 2 includes a light pass portion 21, a fixed portion 23, a driving part 25 and a support portion 27.

The light pass portion 21 includes a first blade assembly 211 and a second blade assembly 212. The first blade assembly 211 includes three movable blades ASB, and the second blade assembly 212 includes three movable blades ASB. The movable blades ASB of the first blade assembly 211 and the second blade assembly 212 together surround a light pass aperture 210. Moreover, the size of the light pass aperture 210 can be adjusted through the rotation of the movable blades ASB driven by the driving part 25.

As shown in FIG. 6 and FIG. 7, in a direction of a central axis CA of the light pass aperture 210, the movable blades ASB of the first blade assembly 211 do not overlap with one another, the movable blades ASB of the second blade assembly 212 do not overlap with one another, and the first blade assembly 211 and the second blade assembly 212 at least partially overlap with each other. Furthermore, in a direction around the light pass aperture 210 (e.g., in a circumferential direction of the central axis CA), the movable blades ASB of the first blade assembly 211 at least partially overlap with one another, the movable blades ASB of the second blade assembly 212 at least partially overlap with one another, and the first blade assembly 211 and the second blade assembly 212 do not overlap with each other. In FIG. 7, an area of the light pass aperture 210 is an overlapping area of a projection of an opening surrounded by the movable blades ASB of the first blade assembly 211 in the direction of the central axis CA and a projection of an opening surrounded the movable blades ASB of the second blade assembly 212 in the direction of the central axis CA. In FIG. 7, that the light pass aperture 210 is separated from the first blade assembly 211 and the second blade assembly 212 is only illustrated for descriptive purpose. The light pass aperture 210 is not a real element, but a light permeable hole defined by the movable blades ASB as described above. Moreover, that the controllable aperture stop 2 is disposed on a position where the aperture of the compact camera module 1 exists can indicate that the light pass aperture 210 is disposed on said position for the aperture of the compact camera module 1. In addition, the optical axis OA of the lens assembly LEA and the central axis CA of the light pass aperture 210 are substantially totally overlapping each other.

The fixed portion 23 includes a shaft element 231 and a frame element 233 which are fixed to each other. The shaft element 231 has six shaft structures 2310, and the shaft structures 2310 are respectively disposed corresponding to the three movable blades ASB of the first blade assembly 211 and the three movable blades ASB of the second blade assembly 212. The frame element 233 has a through hole 2330 disposed corresponding to the light pass aperture 210, such that the frame element 233 can be sleeved on the lens assembly LEA.

The driving part 25 includes a rotatable element 251, a flexible printed circuit board 252, a first magnet 253, a second magnet 254, a first coil 255 and a second coil 256.

Figure 8:
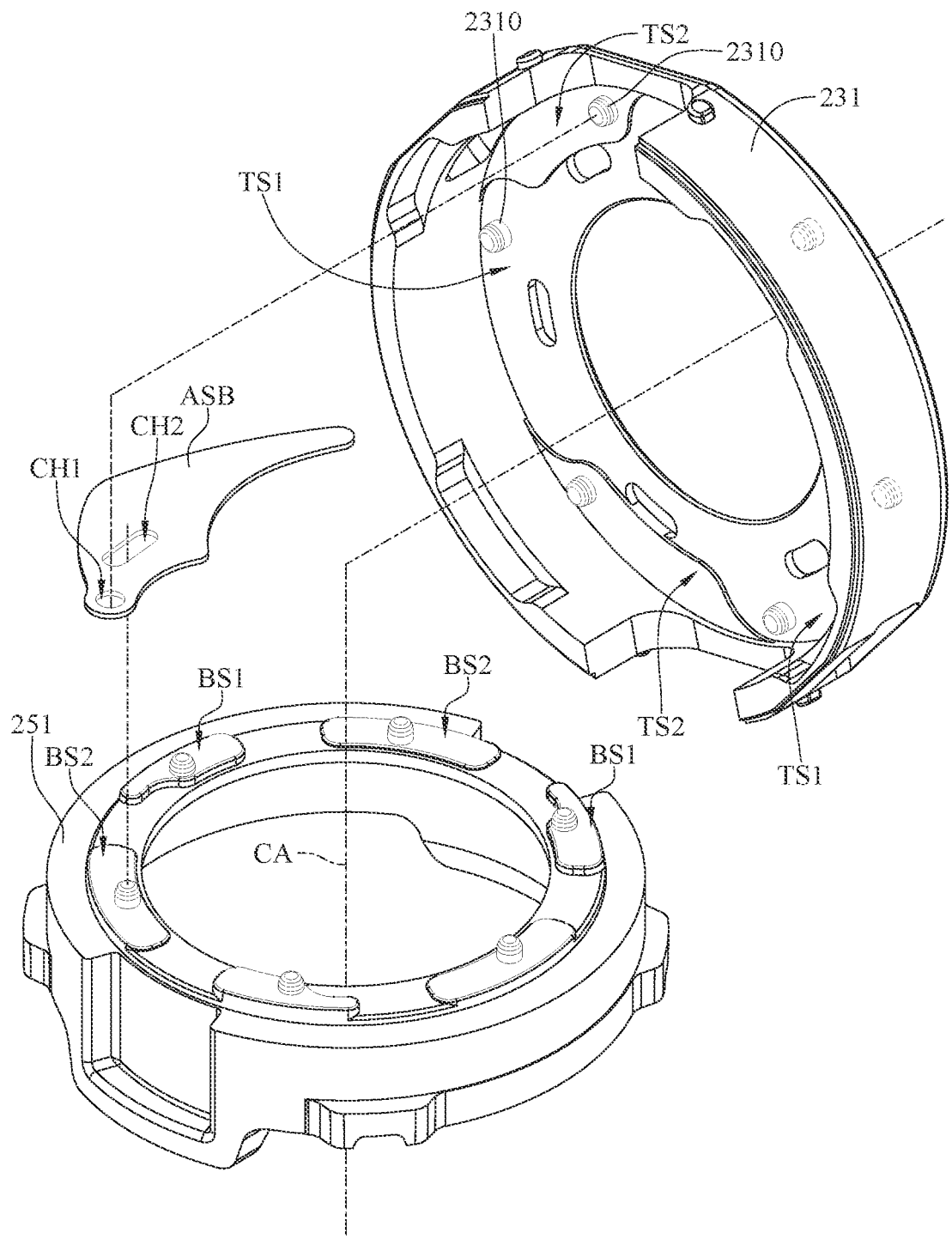
FIG. 8 is an exploded view of a shaft element of a fixed portion, a rotatable element of a driving part and one movable blade of the light pass portion in FIG. 5.

The rotatable element 251 is rotatable around the light pass aperture 210 and connected to the movable blades ASB, and the rotatable element 251 is configured to drive the movable blades ASB to rotate respectively relative to the shaft structures 2310 so as to adjust the size of the light pass aperture 210. In detail, please refer to FIG. 6 and FIG. 8, where FIG. 8 is an exploded view of a shaft element of a fixed portion, a rotatable element of a driving part and one movable blade of the light pass portion in FIG. 5. The first blade assembly 211 and the second blade assembly 212 are disposed between the shaft element 231 and the rotatable element 251. The fixed portion 23 further includes three first top contact surfaces TS1 and three second top contact surfaces TS2. The first top contact surfaces TS1 and the second top contact surfaces TS2 are located at the shaft element 231 and face the movable blades ASB. There is a step between the first top contact surfaces TS1 and the second top contact surfaces TS2, and the first top contact surfaces TS1 and the second top contact surfaces TS2 are arranged in a staggered manner around the central axis CA. The rotatable element 251 includes three first bottom contact surfaces BS1, three second bottom contact surfaces BS2 and six connection protrusions 2510. The first bottom contact surfaces BS1 and the second bottom contact surfaces BS2 face the movable blades ASB, and there is a step between the first bottom contact surfaces BS1 and the second bottom contact surfaces BS2. The first bottom contact surfaces BS1 and the second bottom contact surfaces BS2 are arranged in a staggered manner around the central axis CA. The connection protrusions 2510 are respectively disposed corresponding to the three movable blades ASB of the first blade assembly 211 and the three movable blades ASB of the second blade assembly 212. The movable blades ASB of the first blade assembly 211 are disposed between the first top contact surfaces TS1 and the first bottom contact surfaces BS1, and the movable blades ASB of the second blade assembly 212 are disposed between the second top contact surfaces TS2 and the second bottom contact surfaces BS2. Moreover, each of the movable blades ASB has a shaft structure corresponsive hole CH1 and a protrusion corresponsive groove CH2. The shaft structures 2310 of the shaft element 231 are respectively disposed through the shaft structure corresponsive holes CH1 of the movable blades ASB, such that the movable blades ASB can be rotated respectively around the shaft structures 2310 as rotation axes. The connection protrusions 2510 of the rotatable element 251 are respectively slidably disposed in the protrusion corresponsive grooves CH2 of the movable blades ASB, so that the rotatable element 251 can drive the movable blades ASB to rotate respectively around the shaft structures 2310 as rotation axes so as to adjust the size of the light pass aperture 210.

In this embodiment, the number of the movable blades ASB is six, but the present disclosure is not limited thereto. In other embodiments, the number of movable blades may be, for example, four or eight, and the numbers of shaft structures, connection protrusions and contact surfaces may be corresponsive.

In this embodiment, an arithmetic average roughness (Ra) of each of the first top contact surfaces TS1 and the second top contact surfaces TS2 of the fixed portion 23 can be smaller or equal to 0.25 μm, and an arithmetic average roughness (Ra) of each of the first bottom contact surfaces BS1 and the second bottom contact surfaces BS2 of the rotatable element 251 can be smaller than 0.25 μm.

The flexible printed circuit board 252 is arranged around the rotatable element 251. The first magnet 253 and the second magnet 254 are disposed on a side wall SLO of the rotatable element 251 extending in the direction of the central axis CA, and the first coil 255 and the second coil 256 are disposed on the flexible printed circuit board 252 and electrically connected to the flexible printed circuit board 252, thereby improving assembling yield rate. The first coil 255 and the second coil 256 respectively correspond to the first magnet 253 and the second magnet 254 so as to increase space utilization, thereby reducing the thickness of the controllable aperture stop 2. Moreover, the first coil 255 is located farther away from the light pass aperture 210 than the first magnet 253 to the light pass aperture 210, and the second coil 256 is located farther away from the light pass aperture 210 than the second magnet 254 to the light pass aperture 210. The first magnet 253, the second magnet 254, the first coil 255 and the second coil 256 are configured to drive the rotatable element 251 to rotate around the light pass aperture 210. In this embodiment, the second magnet 254 and the second coil 256 are disposed symmetrical to the first magnet 253 and the first coil 255.

The support portion 27 includes four rollable elements 270, and the rollable elements 270 are disposed between the fixed portion 23 and the rotatable element 251 and arranged around the light pass aperture 210. In detail, the frame element 233 of the fixed portion 23 further has four curved installation structures AMS, the rollable elements 270 are respectively disposed on the curved installation structures AMS of the frame element 233 and movable along the curved installation structures AMS in the direction around the light pass aperture 210, and the frame element 233 is in physical contact with the rollable elements 270 so as to support the rollable elements 270 and the rotatable element 251, such that the rotatable element 251 is rotatable relative to the fixed portion 23 in the circumferential direction of the central axis CA. In this embodiment, the curved installation structures AMS of the frame element 233 are arc-shaped recesses, but the present disclosure is not limited thereto. The rollable elements 270 are balls, and are made of metal material, ceramic material or plastic material. In this embodiment, the shaft structures 2310 and the rollable elements 270 are respectively disposed on the shaft element 231 and the frame element 233.

Figure 9:
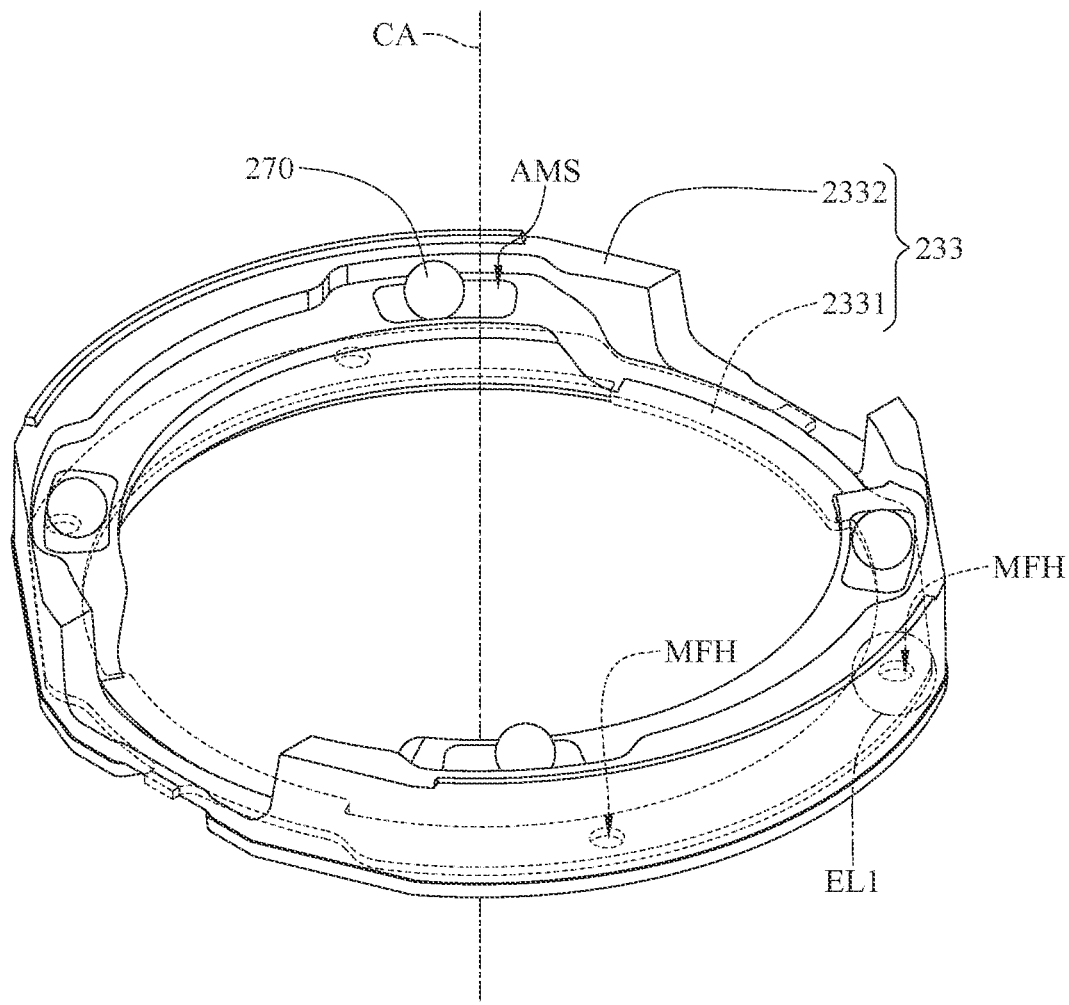
FIG. 9 is a perspective view of rollable elements and the frame element of the fixed portion in FIG. 5.
Figure 10:
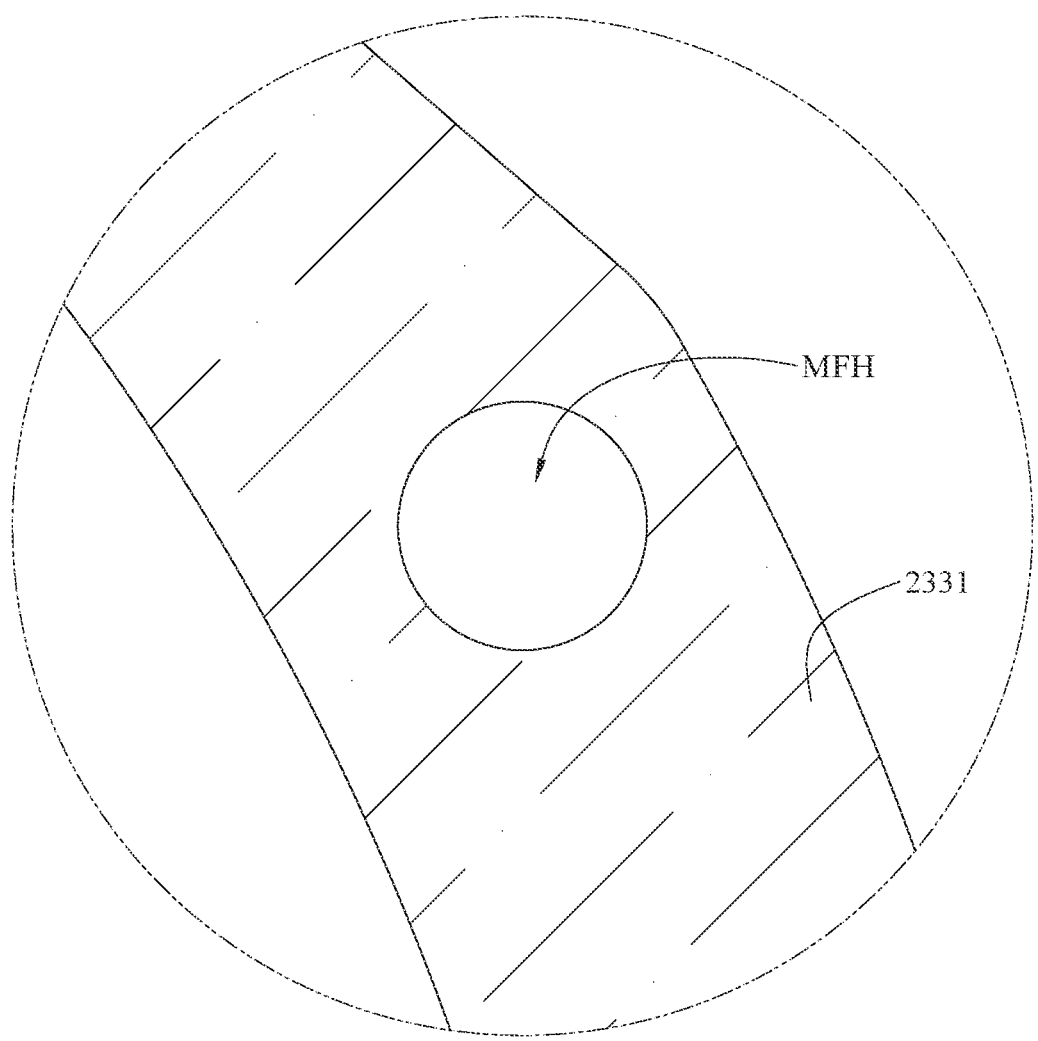
FIG. 10 is an enlarged top view of region EL1 in FIG. 9.
Figure 11:
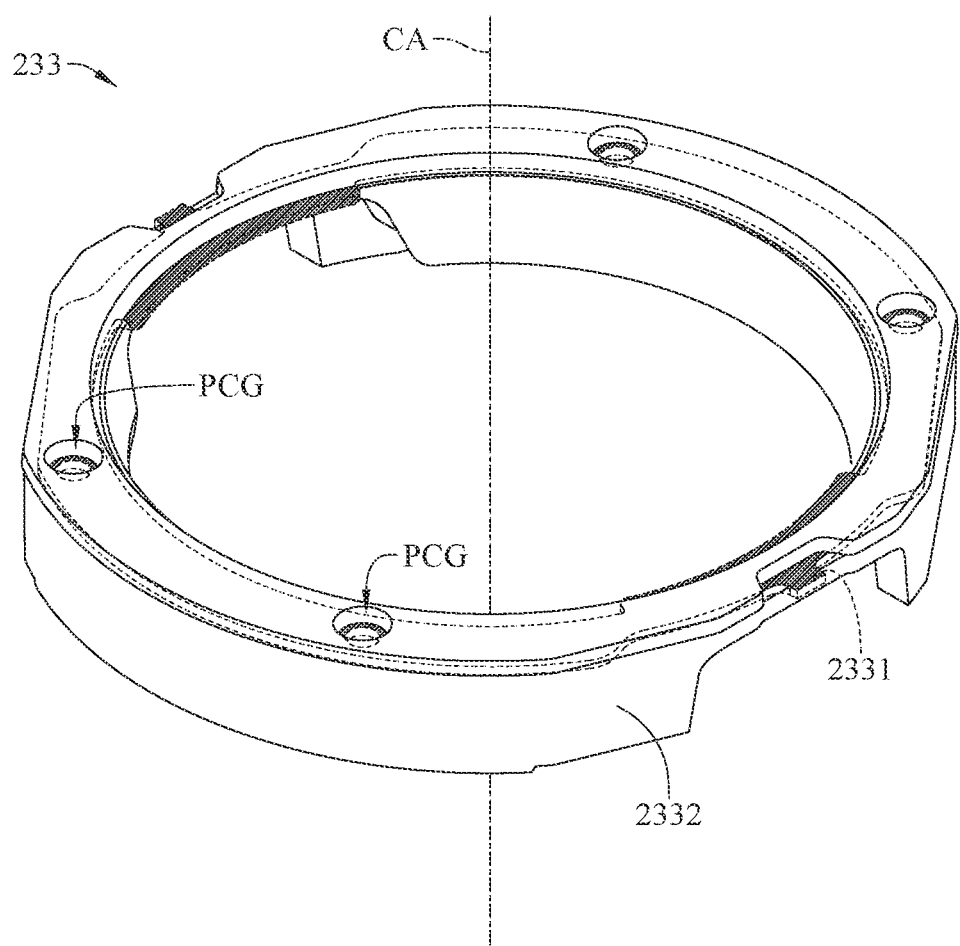
FIG. 11 is another perspective view of the frame element of the fixed portion in FIG. 5.
Figure 12:
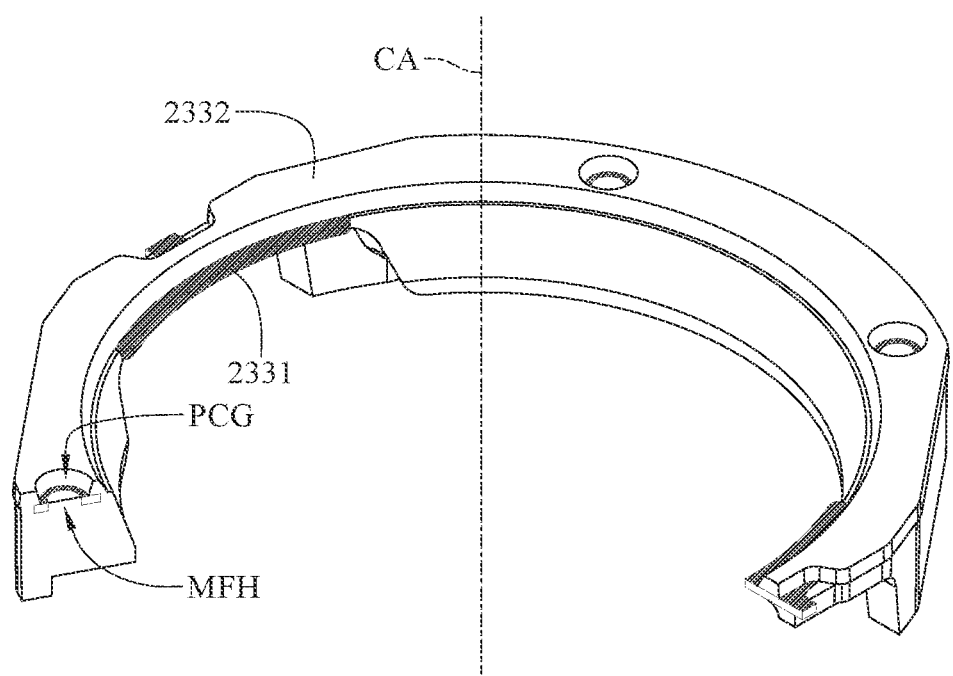
FIG. 12 is a sectional view of the frame element in FIG. 11.
Figure 13:
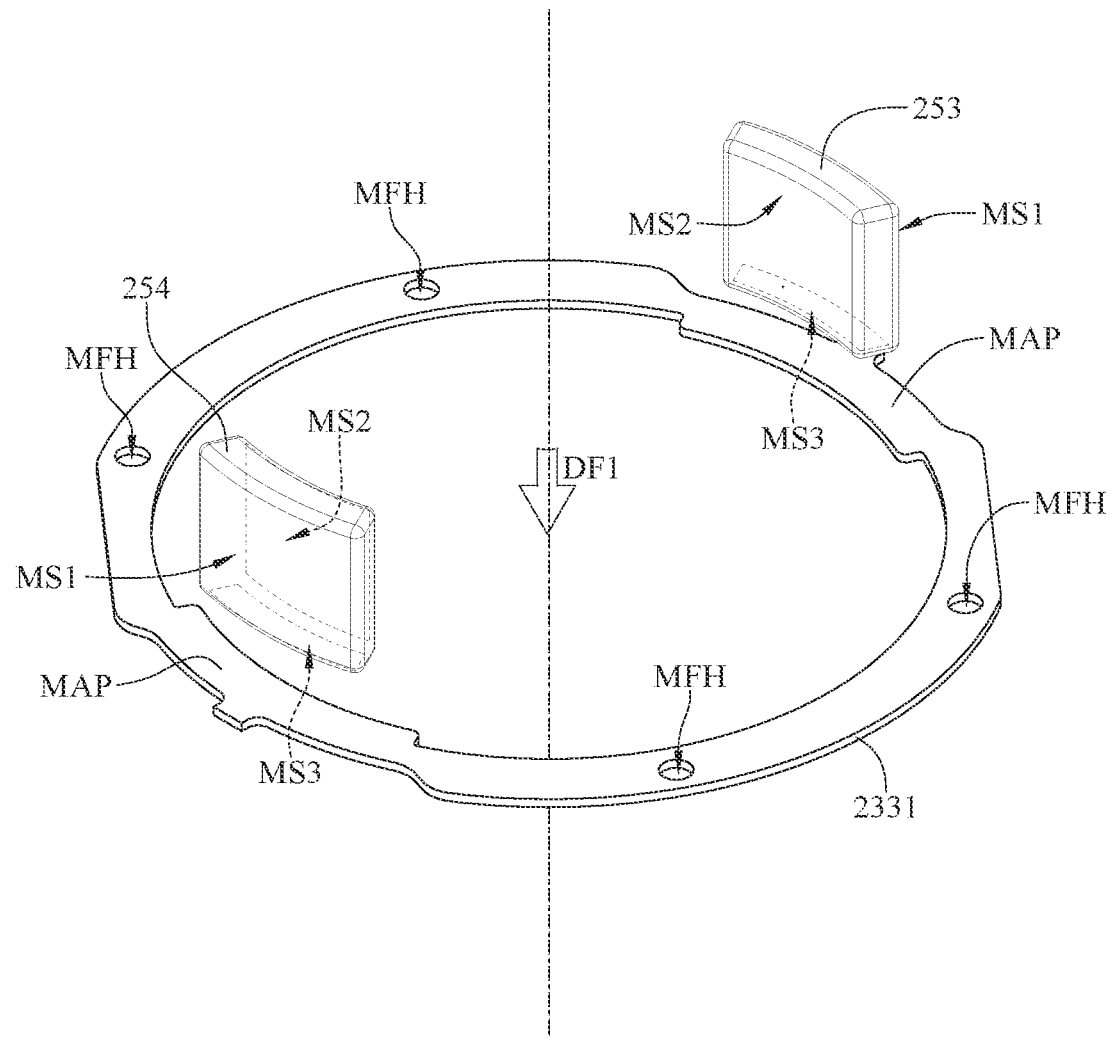
FIG. 13 is a schematic view of the relative position of a metal component of the frame element of the fixed portion and magnets of the driving part in FIG. 5.

Please refer to FIG. 9 to FIG. 13. FIG. 9 is a perspective view of the rollable elements and the frame element of the fixed portion in FIG. 5, FIG. 10 is an enlarged top view of region EL1 in FIG. 9, FIG. 11 is another perspective view of the frame element of the fixed portion in FIG. 5, FIG. 12 is a sectional view of the frame element in FIG. 11, and FIG. 13 is a schematic view of the relative position of a metal component of the frame element of the fixed portion and the magnets of the driving part in FIG. 5.

In this embodiment, the frame element 233 includes a metal component 2331 and a clad component 2332, and the metal component 2331 is insert-molded with the clad component 2332 to together form the frame element 233. The metal component 2331 has a plurality of filled holes MFH, and the filled holes MFH are full holes and are circular through holes. The clad component 2332 is, for example, made of plastic material or ceramic material, and the clad component 2332 is filled into the filled holes MFH of the metal component 2331.

The frame element 233 further has a plurality of recesses PCG located at the clad component 2332, and a part of the metal component 2331 is exposed by the recesses PCG. Moreover, the recesses PCG are respectively disposed corresponding to the filled holes MFH of the metal component 2331 so as to reduce the number of holes (e.g., the recesses PCG) of the clad component 2332, and the filled holes MFH are respectively partially exposed by the recesses PCG. In this embodiment, the recesses PCG are, for example, ejection holes disposed corresponding to ejector pins of a mold.

The metal component 2331 includes two attraction portions MAP which are ferromagnetic. The attraction portions MAP are respectively disposed corresponding to the first magnet 253 and the second magnet 254 so as to generate a magnetic attraction in a direction DF1, and the magnetic attraction forces the first magnet 253, the second magnet 254 and the rotatable element 251 to exert a pressure on the rollable elements 270 in the direction DF1 so as to maintain the position of the rollable elements 270. In addition, a direction of the magnetic field generated by the first coil 255 and the second coil 256 is different from the direction DF1 of the magnetic attraction between the metal component 2331 and the magnets. Specifically, each of the first magnet 253 and the second magnet 254 includes a first surface MS1, a second surface MS2 and a connection surface MS3. The first surfaces MS1 respectively face the coils 255 and 256, the second surfaces MS2 are located closer to the light pass aperture 210 than the first surfaces MS1 to the light pass aperture 210, and each of the connection surfaces MS3 is connected to the corresponding first surface MS1 and second surface MS2. Moreover, the attraction portions MAP of the metal component 2331 respectively correspond to the connection surfaces MS3 of the first magnet 253 and the second magnet 254. As shown in FIG. 13, the filled holes MFH of the metal component 2331 do not overlap with the first magnet 253 and the second magnet 254 in the direction parallel to the central axis CA, such that the filled holes MFH do not correspond to the magnets 253 and 254. In this embodiment, each of the first magnet 253 and the second magnet 254 is in an arc shape, and a direction of the arc shape corresponds to a rotation direction of the magnets 253 and 254.

Figure 14:
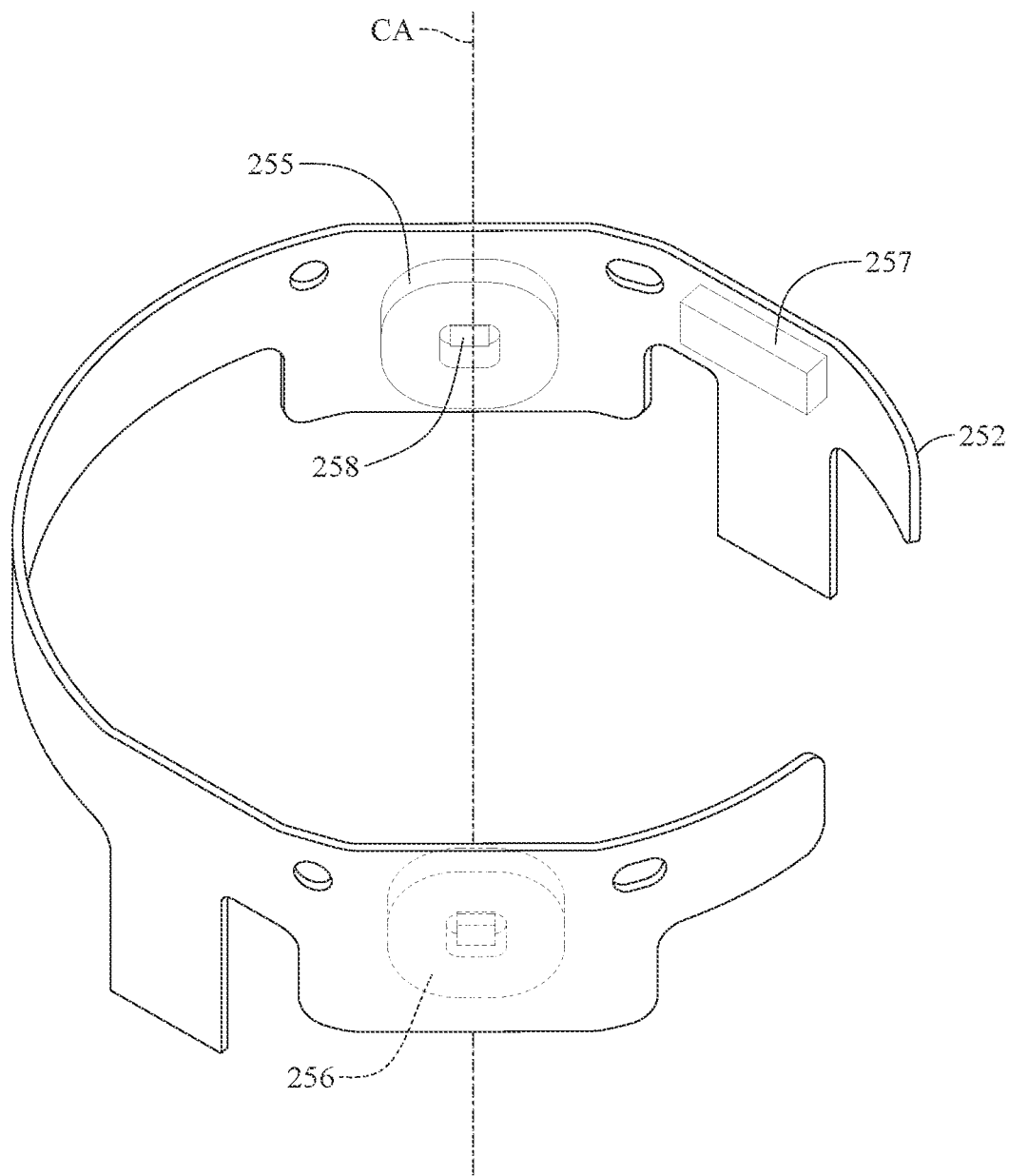
FIG. 14 is a perspective view of a flexible printed circuit board, coils and an electronic component of the driving part in FIG. 5.
Figure 41:
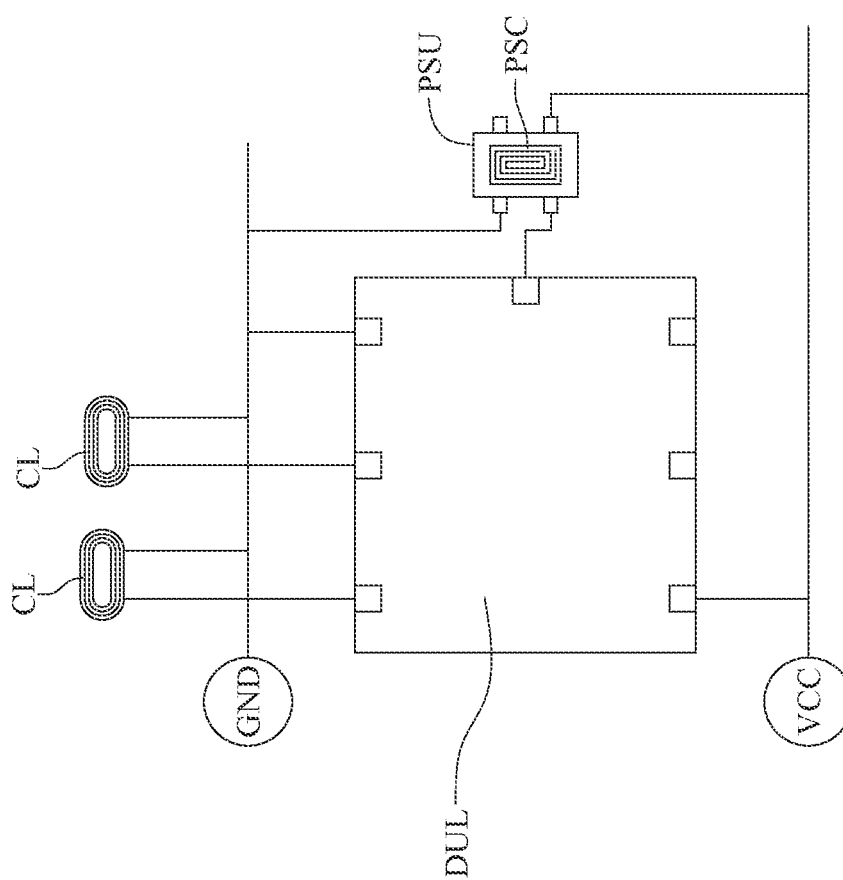
FIG. 41 is a schematic view of an electrical connection of a driver controller, a position sensor and coils according to one embodiment of the present disclosure.
Figure 43:
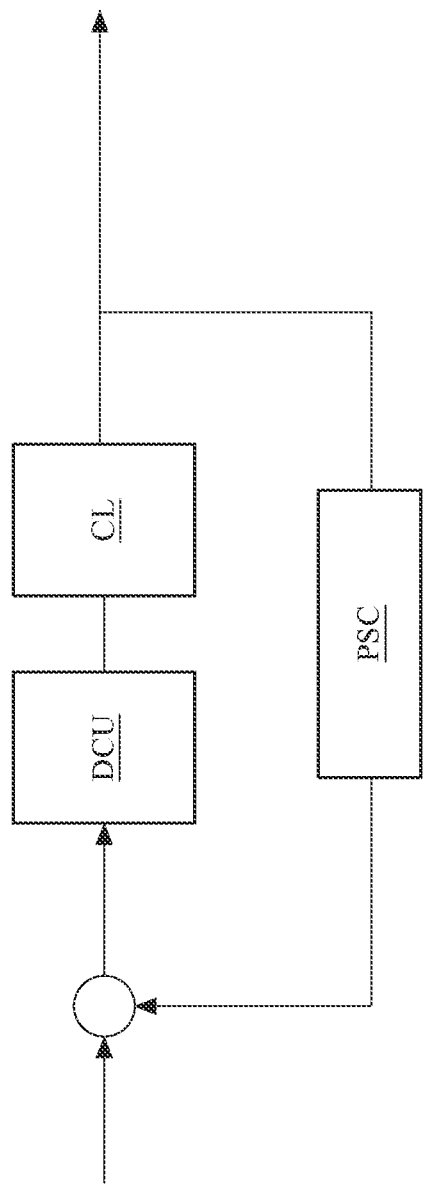
FIG. 43 is a block diagram of a feedback control system of the driver controller, the coils and a position sensing circuit in FIG. 41 or FIG. 42.

Please refer to FIG. 14, is a perspective view of the flexible printed circuit board, coils and electronic component of the driving part in FIG. 5. The driving part 25 further includes a first electronic component 257 and a second electronic component 258. The first electronic component 257 is a driver controller disposed on the flexible printed circuit board 252 and electrically connected to the second coil 256 and the first coil 255 via the flexible printed circuit board 252, and the first electronic component 257 is configured to control the coils 255 and 256 to generate required magnetic fields. The second electronic component 258 is a position sensor, and the position sensor includes a position sensing circuit configured to obtain the position information of the rotatable element 251. The second electronic component 258 is disposed on the flexible printed circuit board 252 and electrically connected to the first electronic component 257 (i.e., the driver controller) via the flexible printed circuit board 252 so as to achieve feedback control, thereby ensuring the accuracy of size adjustment of the controllable aperture stop 2. The electrical connection and feedback control process of the first electronic component 257, the second electronic component 258, the second coil 256 and the first coil 255 in this embodiment are illustrated in reference to FIG. 41 and FIG. 43, where FIG. 41 is a schematic view of an electrical connection of a driver controller, a position sensor and coils according to one embodiment of the present disclosure, and FIG. 43 is a block diagram of a feedback control system of the driver controller, the coils and a position sensing circuit in FIG. 41. In FIG. 41, a driver controller DCU and a position sensor PSU are two separate components and connected to a power VCC and ground GND. The driver controller DCU is electrically connected to coils CL so as to control the coils CL to generate required magnetic fields. One end of each of the coils CL is connected to ground GND. The position sensor PSU has a position sensing circuit PSC configured to obtain the position information of a rotatable element and magnets in a direction around a light pass aperture, and the position sensor PSU is electrically connected to the driver controller DCU so as to generate signals to the driver controller DCU according to the obtained position information. As shown in FIG. 43, in a closed loop feedback control system, the position sensing circuit PSC detects the position of the magnets on the rotatable element and feedbacks the same to the driver controller DCU, and therefore, the driver controller DCU may adjust the magnetic field generated by the coils CL so as to adjust the position of the rotatable element.

Figure 15:
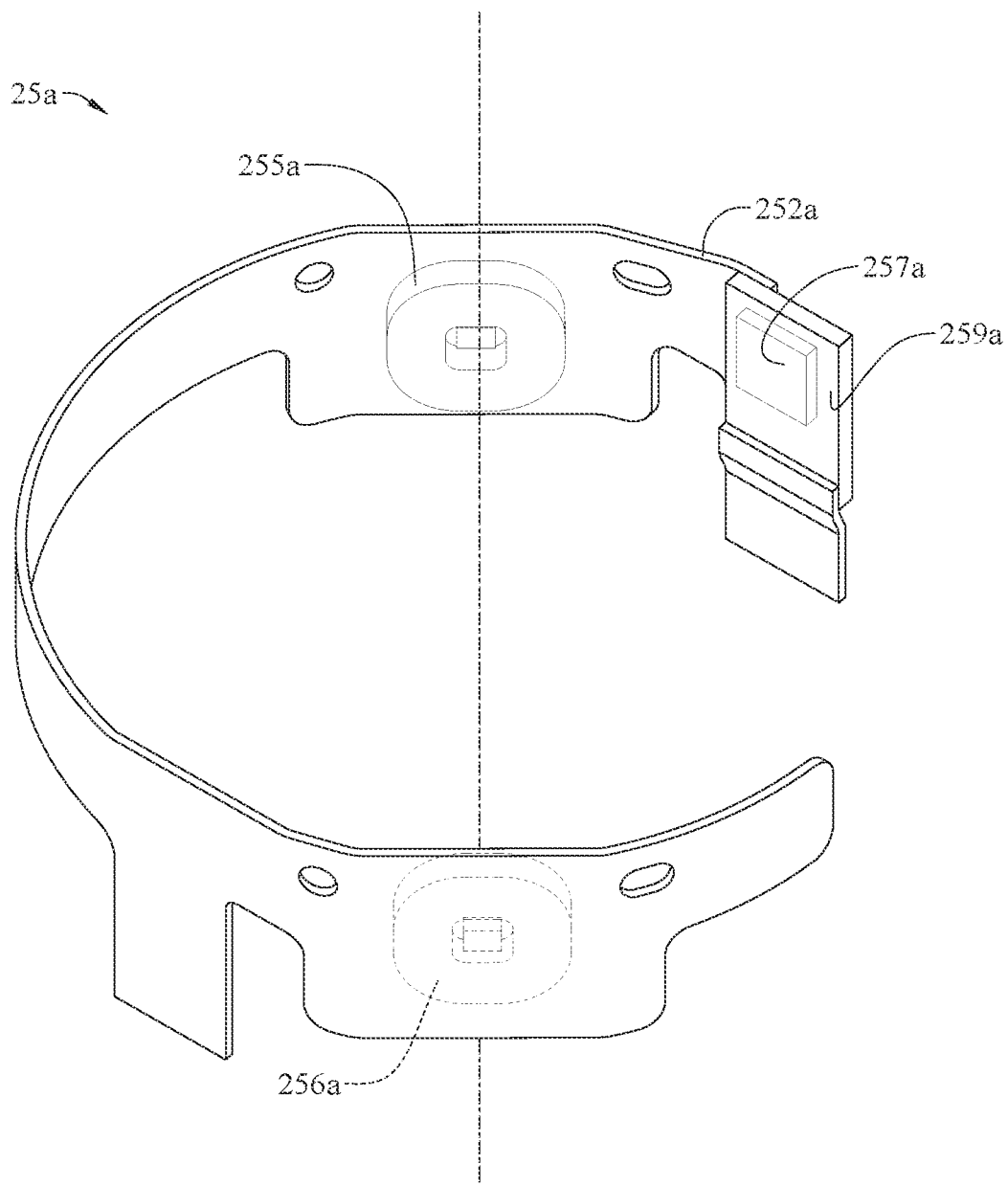
FIG. 15 is a perspective and partial view of a driving part of the compact camera module according to another configuration of the 1st embodiment of the present disclosure.

In this embodiment, the first electronic component 257 (i.e., the driver controller) is directly disposed on the flexible printed circuit board 252 and electrically connected to the second coil 256 and the first coil 255 via the flexible printed circuit board 252, but the present disclosure is not limited thereto. For example, please refer to FIG. 15, which is a perspective and partial view of a driving part of the compact camera module according to another configuration of the 1st embodiment of the present disclosure. In other embodiments, a driving part 25a further includes a printed circuit board 259a, and the printed circuit board 259a is electrically connected to a flexible printed circuit board 252a. A first electronic component 257a (e.g., a driver controller) is disposed on the printed circuit board 259a and electrically connected to a first coil 255a and a second coil 256a via the printed circuit board 259a and the flexible printed circuit board 252a so as to improve assembling process.

In this embodiment, the second electronic component 258 (i.e., the position sensor) and the first magnet 253 are disposed corresponding to each other, and the second electronic component 258 is located farther away from the light pass aperture 210 than the first magnet 253 to the light pass aperture 210. In this embodiment, the position sensing circuit detects the magnetic field change of the first magnet 253 to obtain position information of components.

Figure 16:
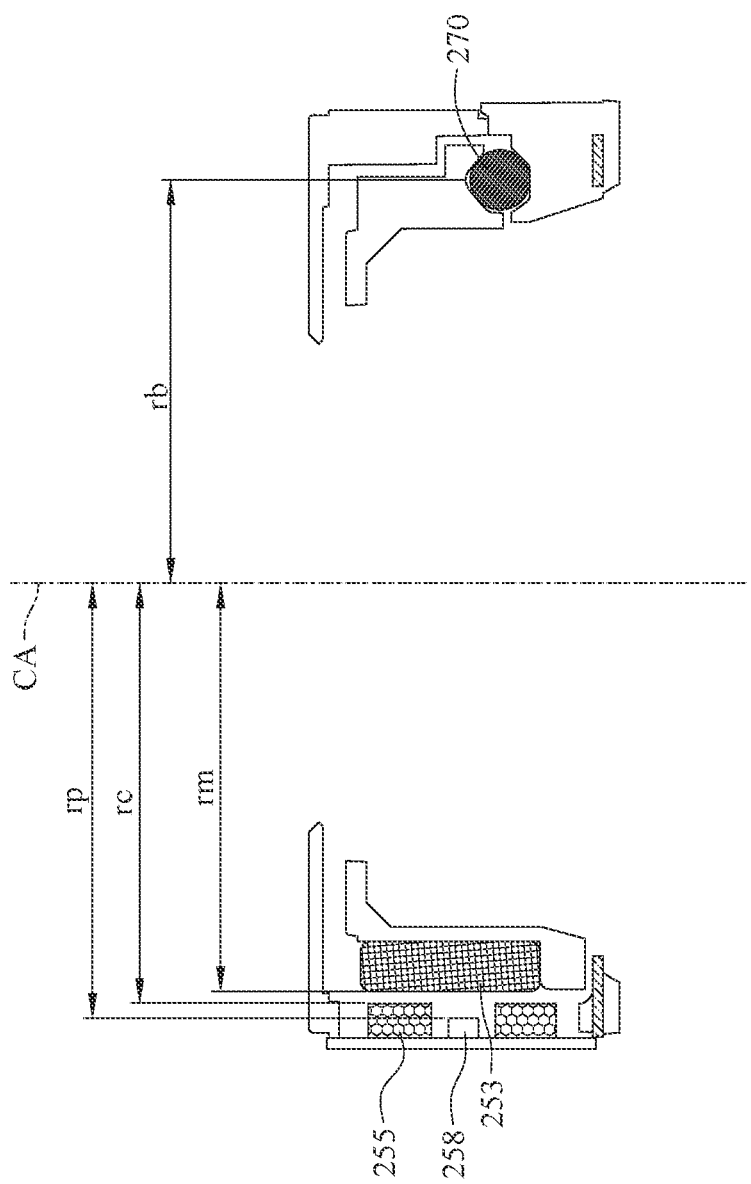
FIG. 16 is a cross-sectional view of the controllable aperture stop in FIG. 4.

Please refer to FIG. 16, which is a cross-sectional view of the controllable aperture stop in FIG. 4.

When a farthest distance between the first magnet 253 and the central axis CA is rm, and a shortest distance between the first coil 255 and the central axis CA is rc, the following conditions are satisfied: rm=4.10 mm; rc=4.22 mm; and rm/rc=0.97. In this embodiment, the distance relation between the second magnet 254, the second coil 256 and the central axis CA can also satisfy the above conditions.

When a shortest distance between the rollable elements 270 and the central axis CA is rb, and the farthest distance between the first magnet 253 and the central axis CA is rm, the following conditions are satisfied: rb=3.75 mm; rm=4.10 mm; and rb/rm=0.91.

When the farthest distance between the first magnet 253 and the central axis CA is rm, and a shortest distance between the second electronic component 258 and the central axis CA is rp, the following conditions are satisfied: rm=4.10 mm; rp=4.37 mm; and rm/rp=0.94.

Figure 17:
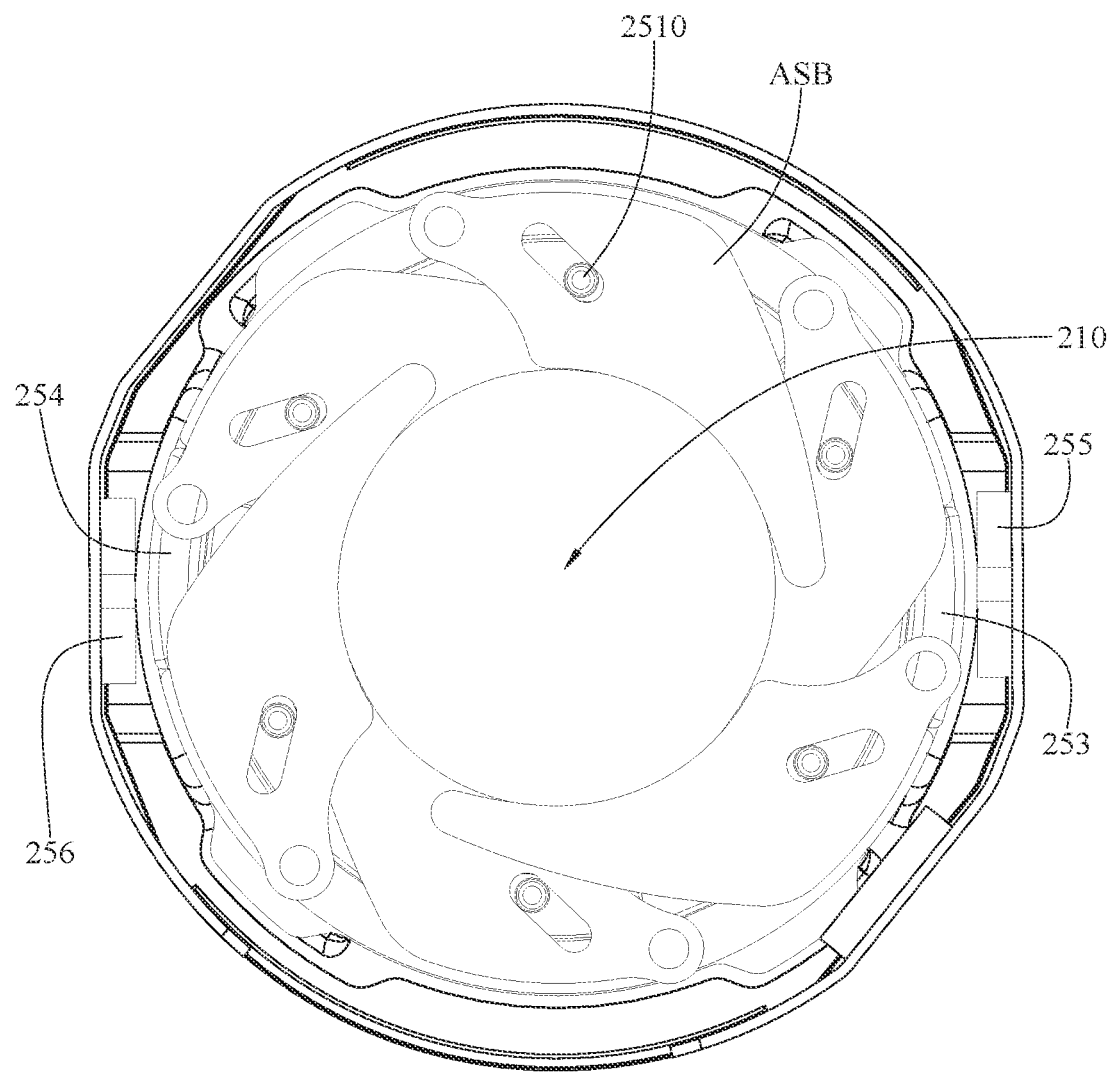
FIG. 17 is a top view of the controllable aperture stop of the compact camera module in a maximum aperture state according to the 1st embodiment of the present disclosure.
Figure 18:
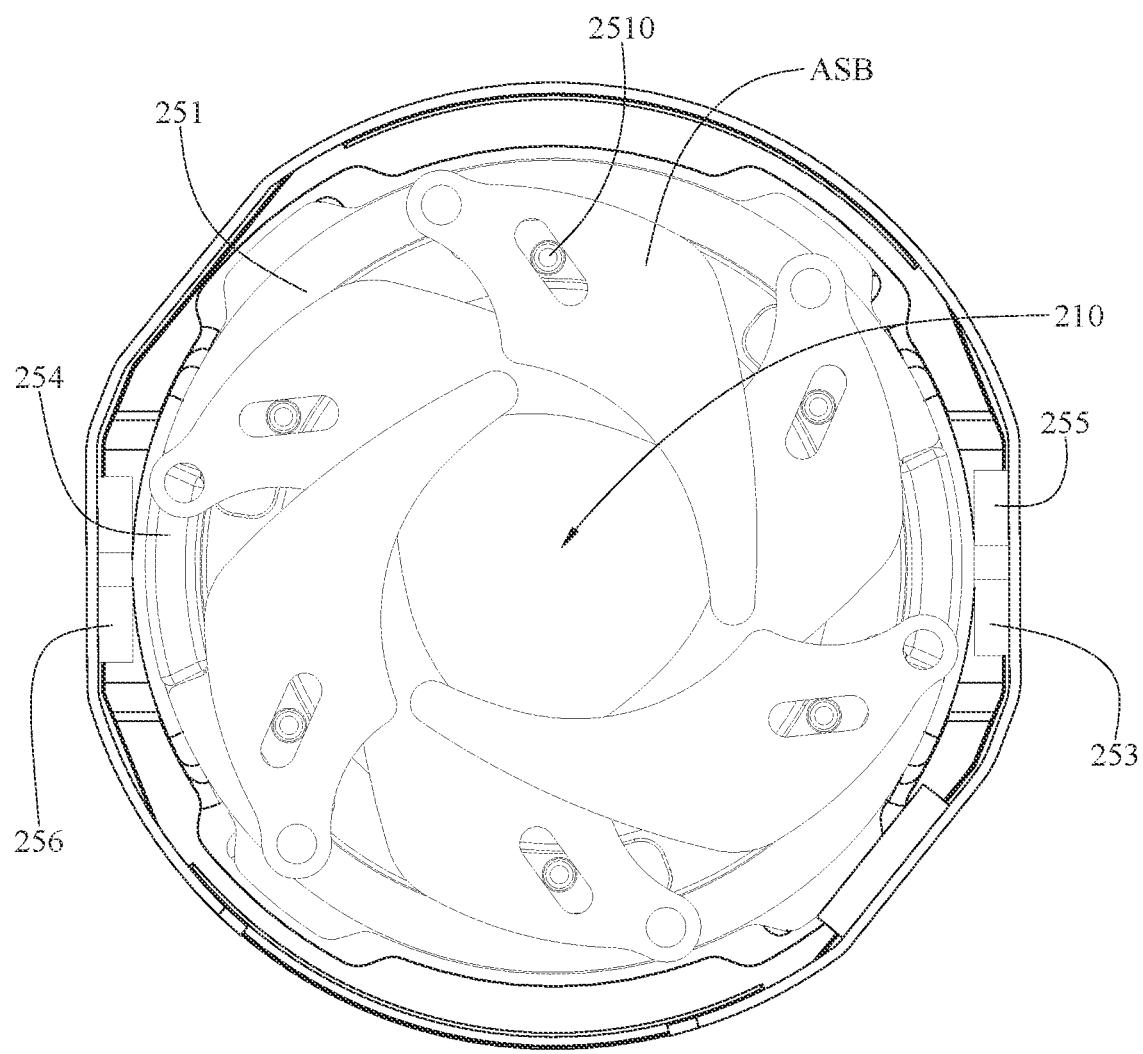
FIG. 18 is a top view of the controllable aperture stop of the compact camera module in another aperture state according to the 1st embodiment of the present disclosure.
Figure 19:
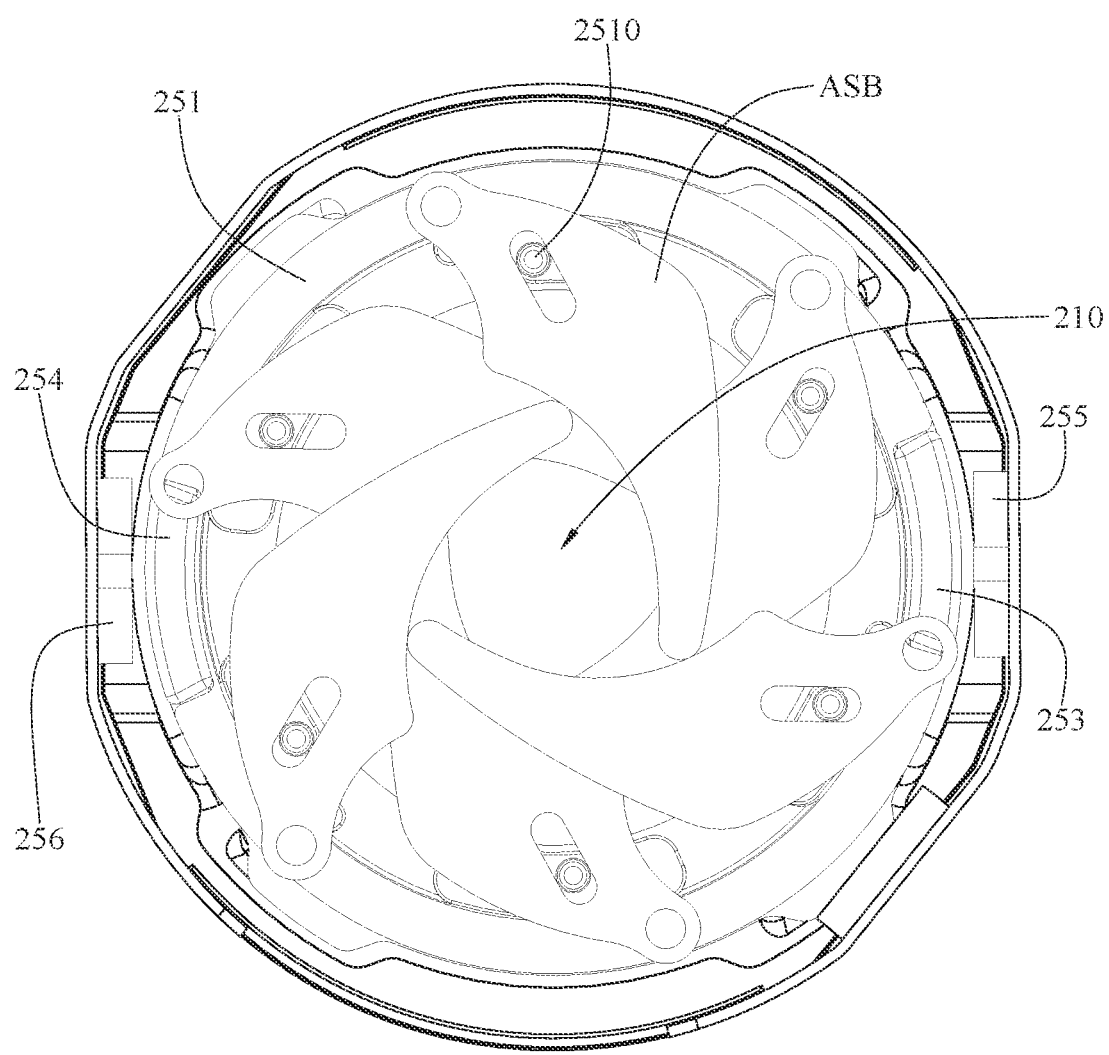
FIG. 19 is a top view of the controllable aperture stop of the compact camera module in another aperture state according to the 1st embodiment of the present disclosure.

Please refer to FIG. 6 and FIG. 17 to FIG. 19, where FIG. 17 is a top view of the controllable aperture stop of the compact camera module in a maximum aperture state according to the 1st embodiment of the present disclosure, FIG. 18 is a top view of the controllable aperture stop of the compact camera module in another aperture state according to the 1st embodiment of the present disclosure, and FIG. 19 is a top view of the controllable aperture stop of the compact camera module in another aperture state according to the 1st embodiment of the present disclosure.

In this embodiment, the size of the light pass aperture 210 can be adjusted by the driving part 25, so that the controllable aperture stop 2 can have various aperture states, and thus, the compact camera module 1 has different f-numbers.

For example, as shown in FIG. 6, when the size of the light pass aperture 210 is to be enlarged, the first magnet 253, the second magnet 254, the first coil 255 and the second coil 256 of the driving part 25 together generate a driving force to drive the rotatable element 251 to rotate in a rotation direction DF2. At this moment, the rollable elements 270 are driven by the rotatable element 251 to move in the curved installation structures AMS of the frame element 233 in a rolling direction DF3. Therefore, the rotatable element 251 is rotatable relative to the frame element 233 of the fixed portion 23. When the rotatable element 251 is rotated in the rotation direction DF2, the connection protrusions 2510 of the rotatable element 251 drive the movable blades ASB to rotate in a direction DF4 respectively around the shaft structures 2310 of the shaft element 231 as rotation axes, thereby enlarging the size of the light pass aperture 210.

On the other hand, when the size of the light pass aperture 210 is to be reduced, the first magnet 253, the second magnet 254, the first coil 255 and the second coil 256 of the driving part 25 together generate a driving force to drive the rotatable element 251 to rotate in a direction opposite to the rotation direction DF2, and the connection protrusions 2510 of the rotatable element 251 drive the movable blades ASB to rotate respectively around the shaft structures 2310 of the shaft element 231 as rotation axes in a direction opposite to the direction DF4, thereby reducing the size of the light pass aperture 210.

FIG. 17 to FIG. 19 respectively show three aperture states of the controllable aperture stop 2 in this embodiment.

As shown in FIG. 17, when the controllable aperture stop 2 is in a first aperture state, a focal length of the compact camera module 1 is f, and an aperture area of the light pass aperture 210 is a1, the following conditions are satisfied: f=6.19 mm; a1=15.34 mm$^2$; and f/√(a1)=1.58. In the first aperture state, an f-number of the compact camera module 1 is fno, and the following condition is satisfied: fno=1.4. Moreover, a difference between a farthest distance and a shortest distance between a periphery of the light pass aperture 210 and the central axis CA is smaller than 9.8%. In this embodiment, the first aperture state is the maximum aperture state of the controllable aperture stop 2, and the light pass aperture 210 is circular in the maximum aperture state.

As shown in FIG. 18, when the controllable aperture stop 2 is in a second aperture state, the focal length of the compact camera module 1 is f, and the aperture area of the light pass aperture 210 is a1, the following conditions are satisfied: f=6.19 mm; a1=7.52 mm$^2$; and f/√(a1)=2.26. In the second aperture state, the f-number of the compact camera module 1 is fno, and the following condition is satisfied: fno=2.0.

As shown in FIG. 19, when the controllable aperture stop 2 is in a third aperture state, the focal length of the compact camera module 1 is f, and the aperture area of the light pass aperture 210 is a1, the following conditions are satisfied: f=6.19 mm; a1=3.58 mm$^2$; and f/√(a1)=3.27. In the third aperture state, the f-number of the compact camera module 1 is fno, and the following condition is satisfied: fno=2.9.

2nd Embodiment

Figure 20:
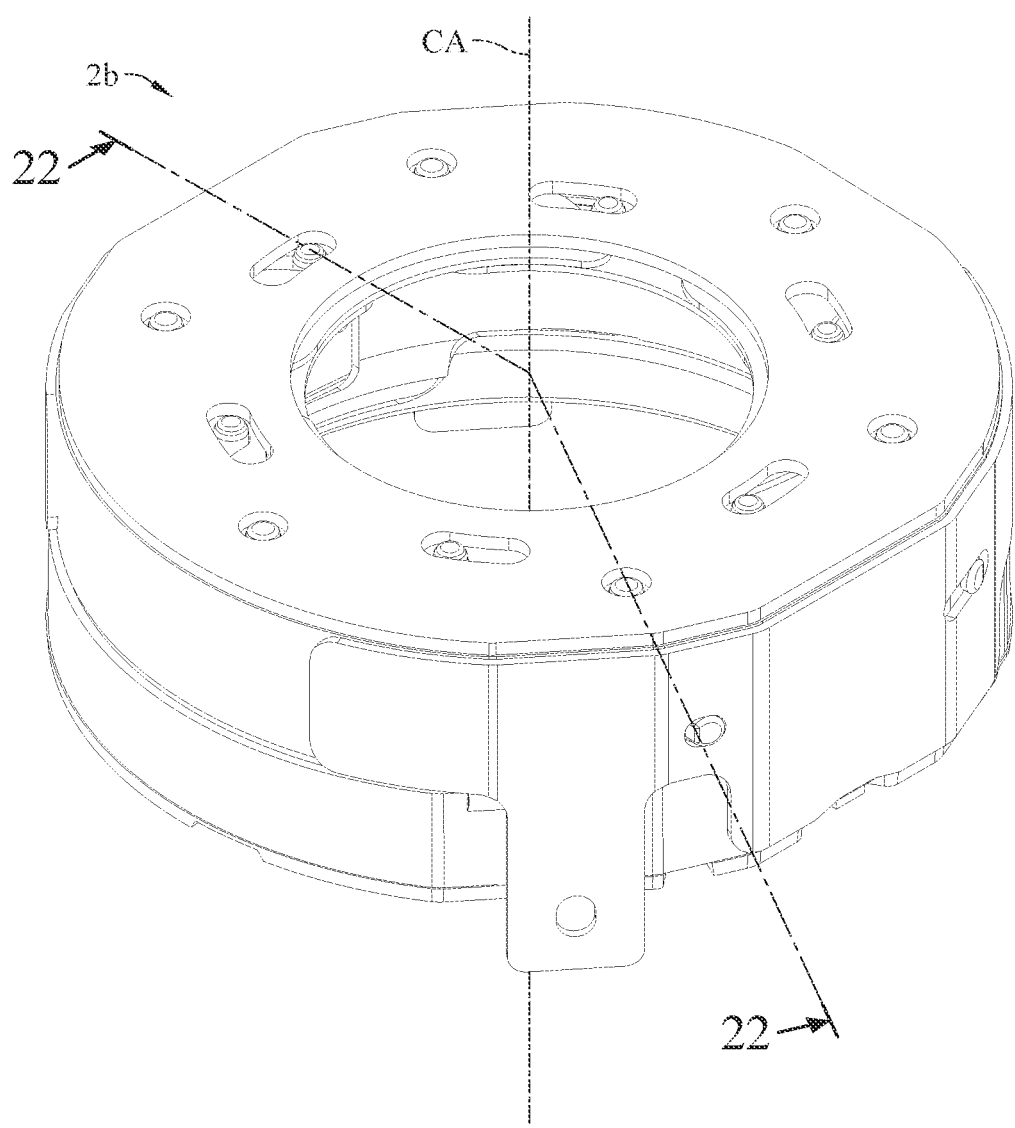
FIG. 20 is a perspective view of a compact camera module according to the 2nd embodiment of the present disclosure.
Figure 21:
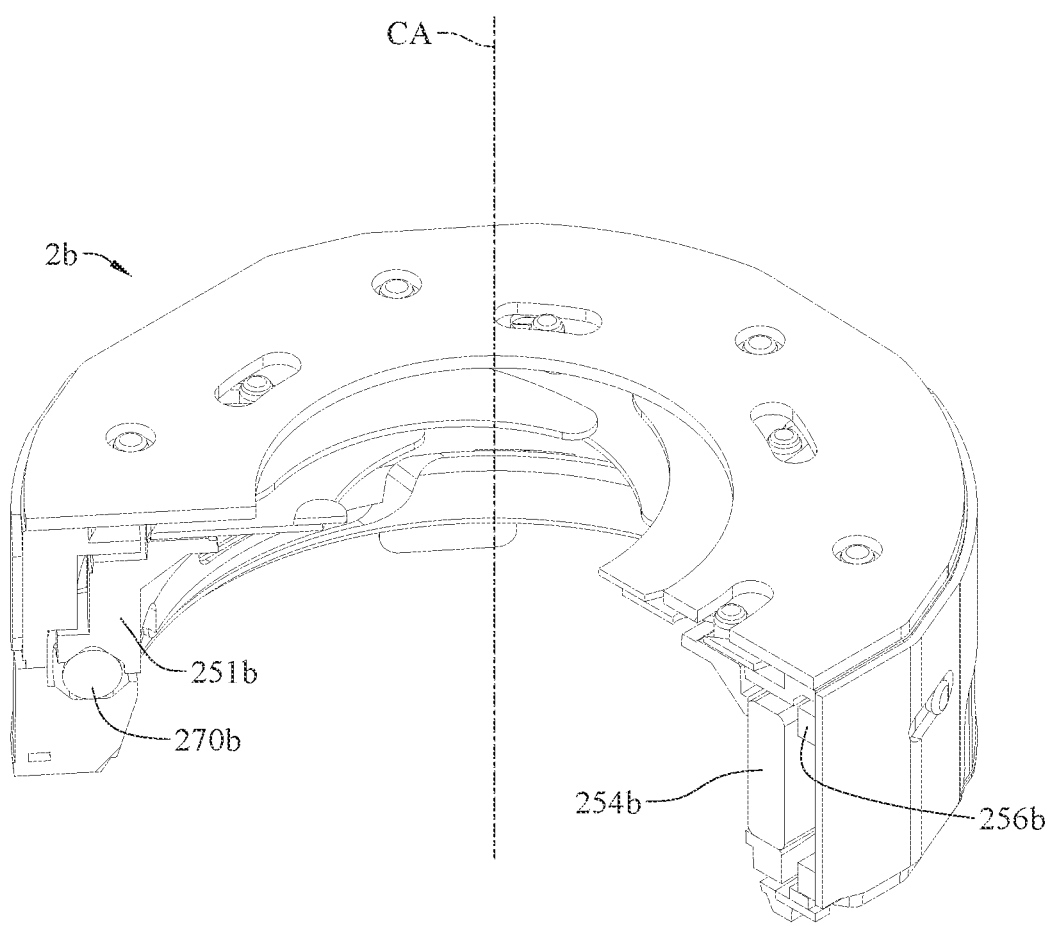
FIG. 21 is a sectional view of a controllable aperture stop of the compact camera module in FIG. 20.
Figure 22:
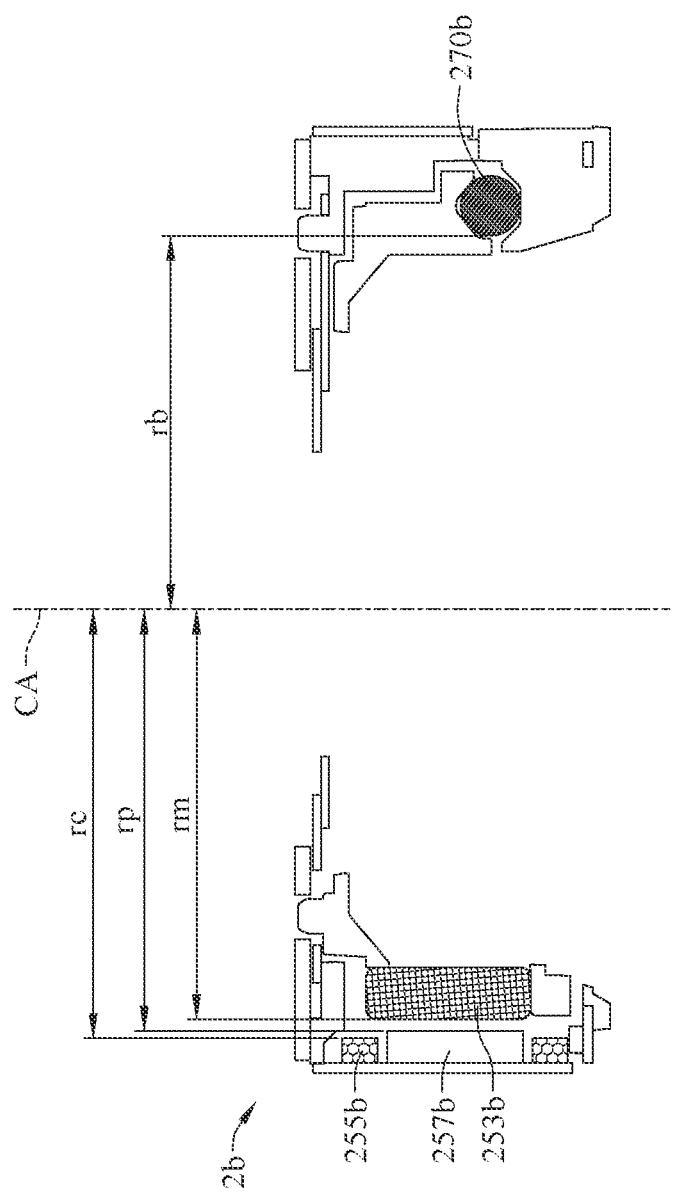
FIG. 22 is a side view of the controllable aperture stop of the compact camera module along line 22-22 in FIG. 21.
Figure 23:
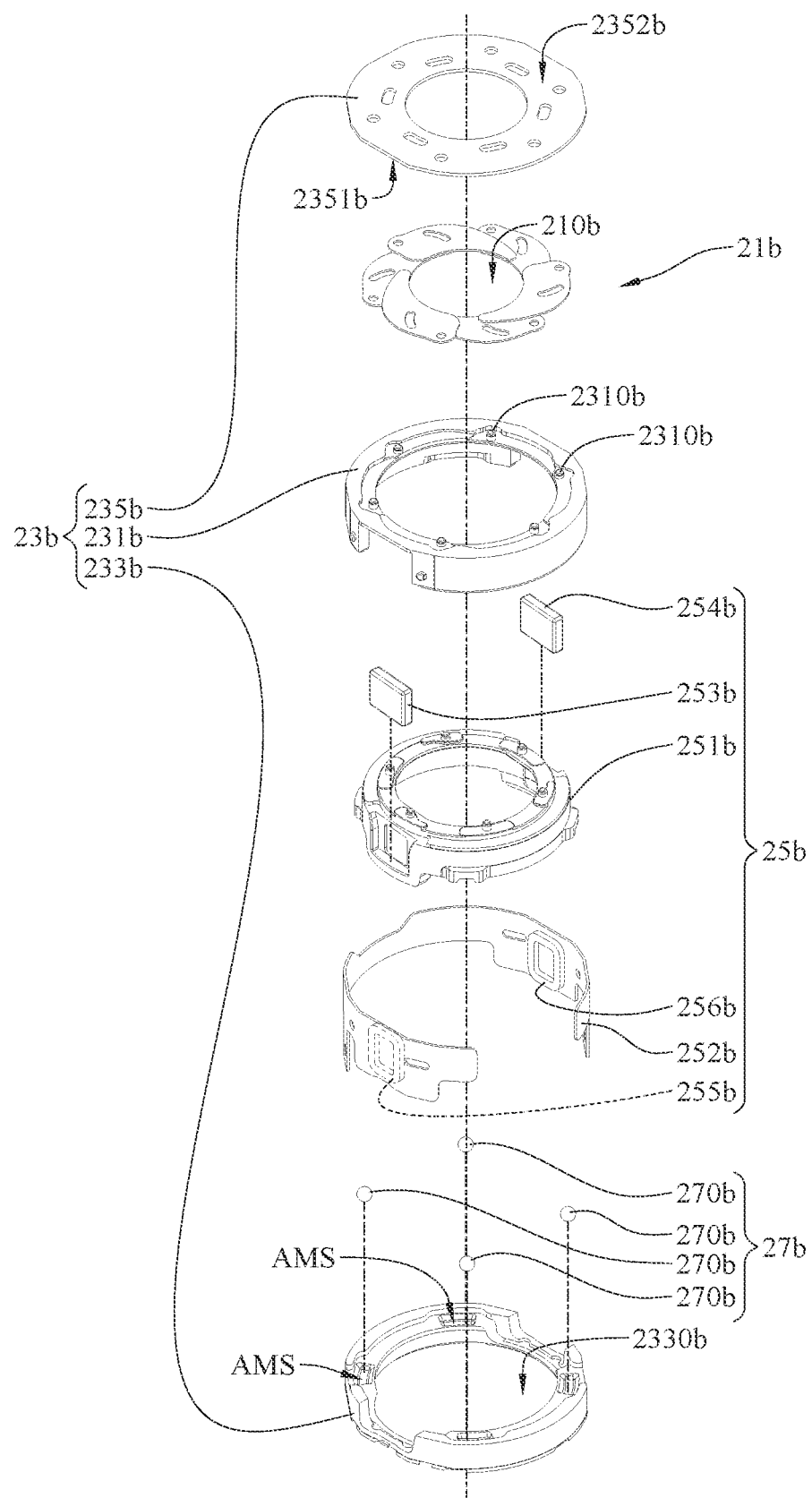
FIG. 23 is an exploded view of the controllable aperture stop of the compact camera module in FIG. 20.
Figure 24:
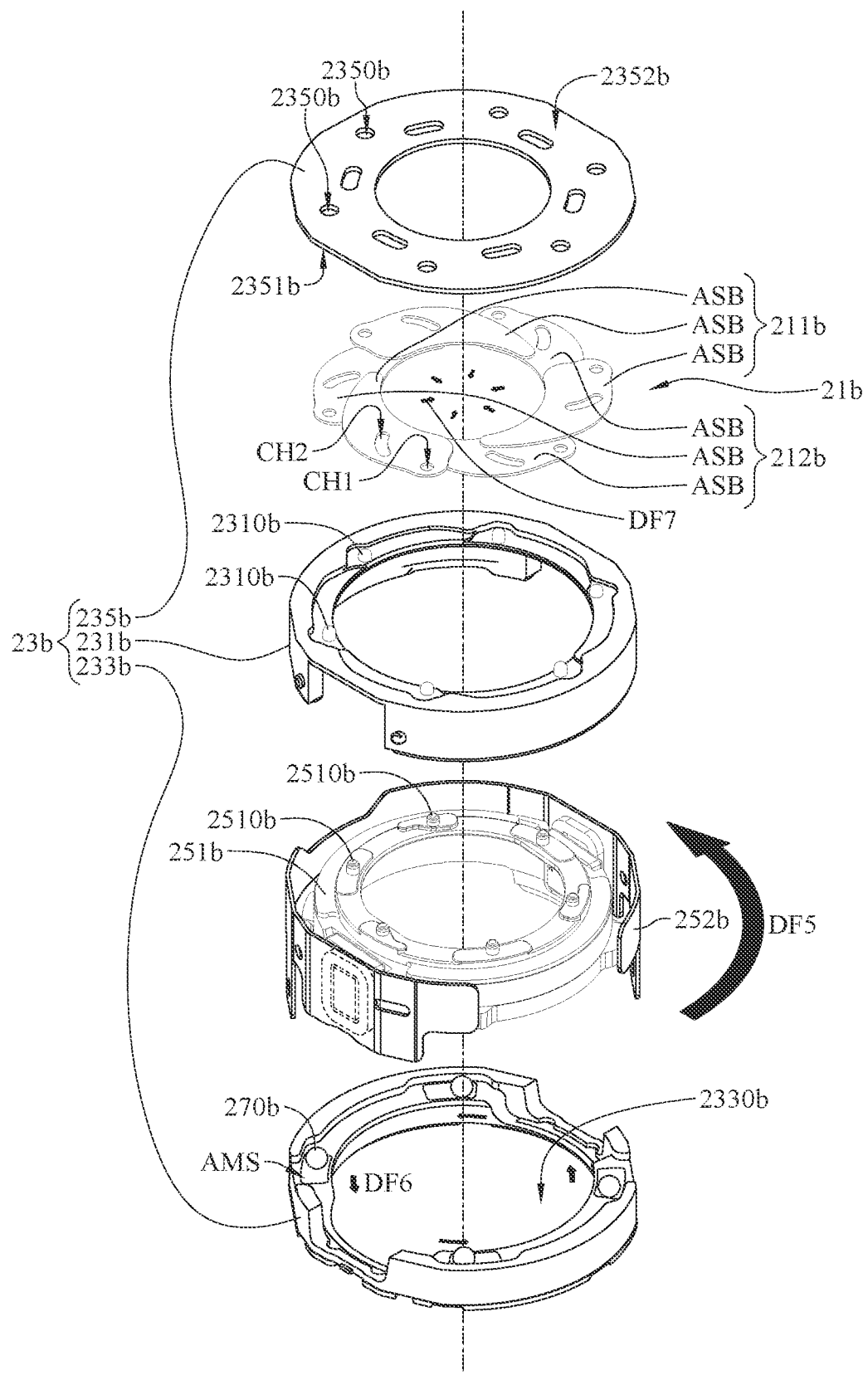
FIG. 24 is another exploded view of the controllable aperture stop of the compact camera module in FIG. 20.
Figure 25:
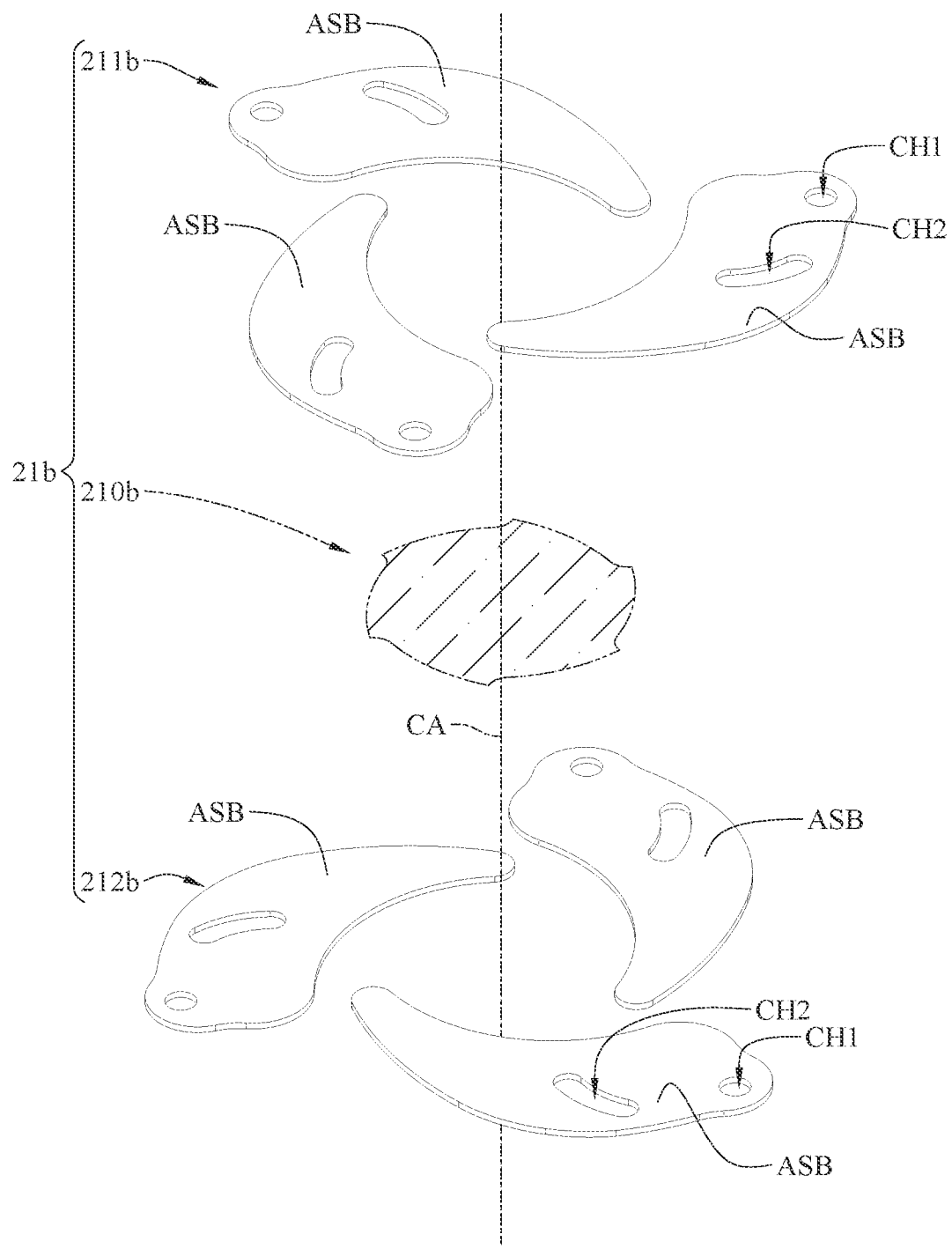
FIG. 25 is an exploded view of a light pass portion of the controllable aperture stop in FIG. 23.

FIG. 20 is a perspective view of a compact camera module according to the 2nd embodiment of the present disclosure, FIG. 21 is a sectional view of a controllable aperture stop of the compact camera module in FIG. 20, FIG. 22 is a side view of the controllable aperture stop of the compact camera module along line 22-22 in FIG. 21, FIG. 23 is an exploded view of the controllable aperture stop of the compact camera module in FIG. 20, FIG. 24 is another exploded view of the controllable aperture stop of the compact camera module in FIG. 20, and FIG. 25 is an exploded view of a light pass portion of the controllable aperture stop in FIG. 23.

In this embodiment, a compact camera module 1b includes a controllable aperture stop 2b, a lens assembly, a lens driving unit and an image sensor (not shown in figures). Moreover, the controllable aperture stop 2b is disposed on an aperture position of the compact camera module 1b, the lens driving unit is configured to drive the lens assembly to move along an optical axis of the lens assembly, and the image sensor is disposed on an image surface of the lens assembly. In addition, the arrangement of the lens assembly, the lens driving unit and the image sensor of the compact camera module 1b is the same as that of the lens assembly LEA, the lens driving unit DGU and the image sensor ISU of the compact camera module 1 as disclosed in the 1st embodiment.

The controllable aperture stop 2b includes a light pass portion 21b, a fixed portion 23b, a driving part 25b and a support portion 27b.

The light pass portion 21b includes a first blade assembly 211b and a second blade assembly 212b. The first blade assembly 211b includes three movable blades ASB, and the second blade assembly 212b includes three movable blades ASB. The movable blades ASB of the first blade assembly 211b and the second blade assembly 212b together surround a light pass aperture 210b. Moreover, the size of the light pass aperture 210b can be adjusted through the rotation of the movable blades ASB driven by the driving part 25b.

As shown in FIG. 24 and FIG. 25, in a direction of a central axis CA of the light pass aperture 210b, the movable blades ASB of the first blade assembly 211b do not overlap with one another, the movable blades ASB of the second blade assembly 212b do not overlap with one another, and the first blade assembly 211b and the second blade assembly 212b at least partially overlap with each other. Furthermore, in a direction around the light pass aperture 210b (e.g., in a circumferential direction of the central axis CA), the movable blades ASB of the first blade assembly 211b at least partially overlap with one another, the movable blades ASB of the second blade assembly 212b at least partially overlap with one another, and the first blade assembly 211b and the second blade assembly 212b do not overlap with each other. In FIG. 25, an area of the light pass aperture 210b is an overlapping area of a projection of an opening surrounded by the movable blades ASB of the first blade assembly 211b in the direction of the central axis CA and a projection of an opening surrounded the movable blades ASB of the second blade assembly 212b in the direction of the central axis CA. In FIG. 25, that the light pass aperture 210b is separated from the first blade assembly 211b and the second blade assembly 212b is only illustrated for descriptive purpose. The light pass aperture 210b is not a real element, but a light permeable hole defined by the movable blades ASB as described above. Moreover, that the controllable aperture stop 2b is disposed on a position where the aperture of the compact camera module 1b exists can indicate that the light pass aperture 210b is disposed on said position for the aperture of the compact camera module 1b. In addition, the optical axis of the lens assembly and the central axis CA of the light pass aperture 210b are substantially totally overlapping each other.

The fixed portion 23b includes a shaft element 231b, a frame element 233b and a cover 235b which are fixed to one another. The shaft element 231b has six shaft structures 2310b, and the shaft structures 2310b are respectively disposed corresponding to the three movable blades ASB of the first blade assembly 211b and the three movable blades ASB of the second blade assembly 212b. The frame element 233b has through hole 2330b disposed corresponding to the light pass aperture 210b, such that the frame element 233b can be sleeved on the lens assembly. The cover 235b includes six positioning holes 2350b, and the positioning holes 2350b are respectively disposed corresponding to the shaft structures 2310b.

The driving part 25b includes a rotatable element 251b, a flexible printed circuit board 252b, a first magnet 253b, a second magnet 254b, a first coil 255b and a second coil 256b.

The rotatable element 251b is rotatable around the light pass aperture 210b and connected to the movable blades ASB, and the rotatable element 251b is configured to drive the movable blades ASB to rotate respectively relative to the shaft structures 2310b the light pass aperture 210b. In detail, the first blade assembly 211b and the second blade assembly 212b are disposed between the cover 235b and the rotatable element 251b. The rotatable element 251b includes six connection protrusions 2510b, and the connection protrusions 2510b are respectively disposed corresponding to the three movable blades ASB of the first blade assembly 211b and the three movable blades ASB of the second blade assembly 212b. Moreover, each of the movable blades ASB has a shaft structure corresponsive hole CH1 and a protrusion corresponsive groove CH2. The shaft structures 2310b of the shaft element 231b are respectively disposed through the shaft structure corresponsive holes CH1 of the movable blades ASB and fixed to the positioning holes 2350b of the cover 235b, such that the movable blades ASB can be rotated respectively around the shaft structures 2310b as rotation axes. Therefore, the cover 235b is maintained in a predetermined position, and with the collaboration of the cover 235b and the rotatable element 251b, the movable blades ASB are movable in a certain range. The connection protrusions 2510b of the rotatable element 251b are respectively slidably disposed in the protrusion corresponsive grooves CH2 of the movable blades ASB, so that the rotatable element 251b can drive the movable blades ASB to rotate respectively around the shaft structures 2310b as rotation axes so as to adjust the size of the light pass aperture 210b. In this embodiment, the positioning holes 2350b are through holes.

In this embodiment, the number of the movable blades ASB is six, but the present disclosure is not limited thereto. In other embodiments, the number of movable blades may be, for example, four or eight, and the numbers of shaft structures, connection protrusions and positioning holes may be corresponsive.

In this embodiment, the cover 235b further includes an inner surface 2351b and an outer surface 2352b. The inner surface 2351b faces the movable blades ASB, and the outer surface 2352b is located farther away from the movable blades ASB than the inner surface 2351b to the movable blades ASB. Moreover, a reflectivity of the outer surface 2352b is smaller than a reflectivity of the inner surface 2351b. An arithmetic average roughness (Ra) of the inner surface 2351b is smaller than 0.25 μm.

The flexible printed circuit board 252b is arranged around the rotatable element 251b. The first magnet 253b and the second magnet 254b are disposed on a side wall SLO of the rotatable element 251b in the direction of the central axis CA, and the first coil 255b and the second coil 256b are disposed on the flexible printed circuit board 252b and electrically connected to the flexible printed circuit board 252b, thereby improving assembling yield rate. The first coil 255b and the second coil 256b respectively correspond to the first magnet 253b and the second magnet 254b. Moreover, the first coil 255b is located farther away from the light pass aperture 210b than the first magnet 253b to the light pass aperture 210b, and the second coil 256b is located farther away from the light pass aperture 210b than the second magnet 254b to the light pass aperture 210b. The first magnet 253b, the second magnet 254b, the first coil 255b and the second coil 256b are configured to drive the rotatable element 251b to rotate around the light pass aperture 210b. In this embodiment, the second magnet 254b and the second coil 256b are disposed symmetrical to the first magnet 253b and the first coil 255b.

The support portion 27b includes four rollable elements 270b, and the rollable elements 270b are disposed between the fixed portion 23b and the rotatable element 251b and arranged around the light pass aperture 210b. In detail, the frame element 233b of the fixed portion 23b further has four curved installation structures AMS, the rollable elements 270b are respectively disposed on the curved installation structures AMS of the frame element 233b and movable along the curved installation structures AMS in the direction around the light pass aperture 210b, and the frame element 233b is in physical contact with the rollable elements 270b so as to support the rollable elements 270b and the rotatable element 251b, such that the rotatable element 251b is rotatable relative to the fixed portion 23b in the circumferential direction of the central axis CA. In this embodiment, the curved installation structures AMS of the frame element 233b are arc-shaped recesses, but the present disclosure is not limited thereto. The rollable elements 270b are balls, and are made of metal material, ceramic material or plastic material. In this embodiment, the shaft structures 2310b and the rollable elements 270b are respectively disposed on the shaft element 231b and the frame element 233b.

Figure 26:
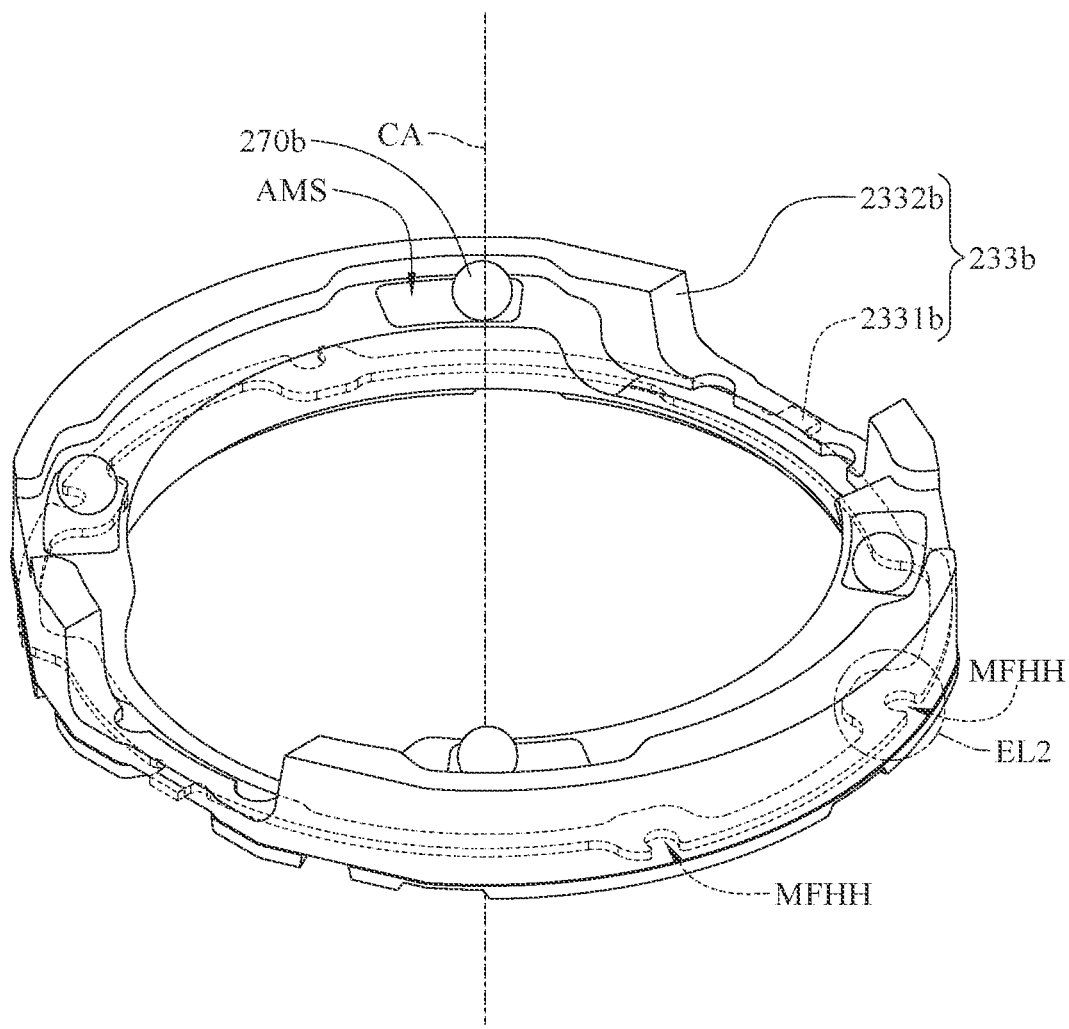
FIG. 26 is a perspective view of rollable elements and a frame element of a fixed portion in FIG. 23.
Figure 27:
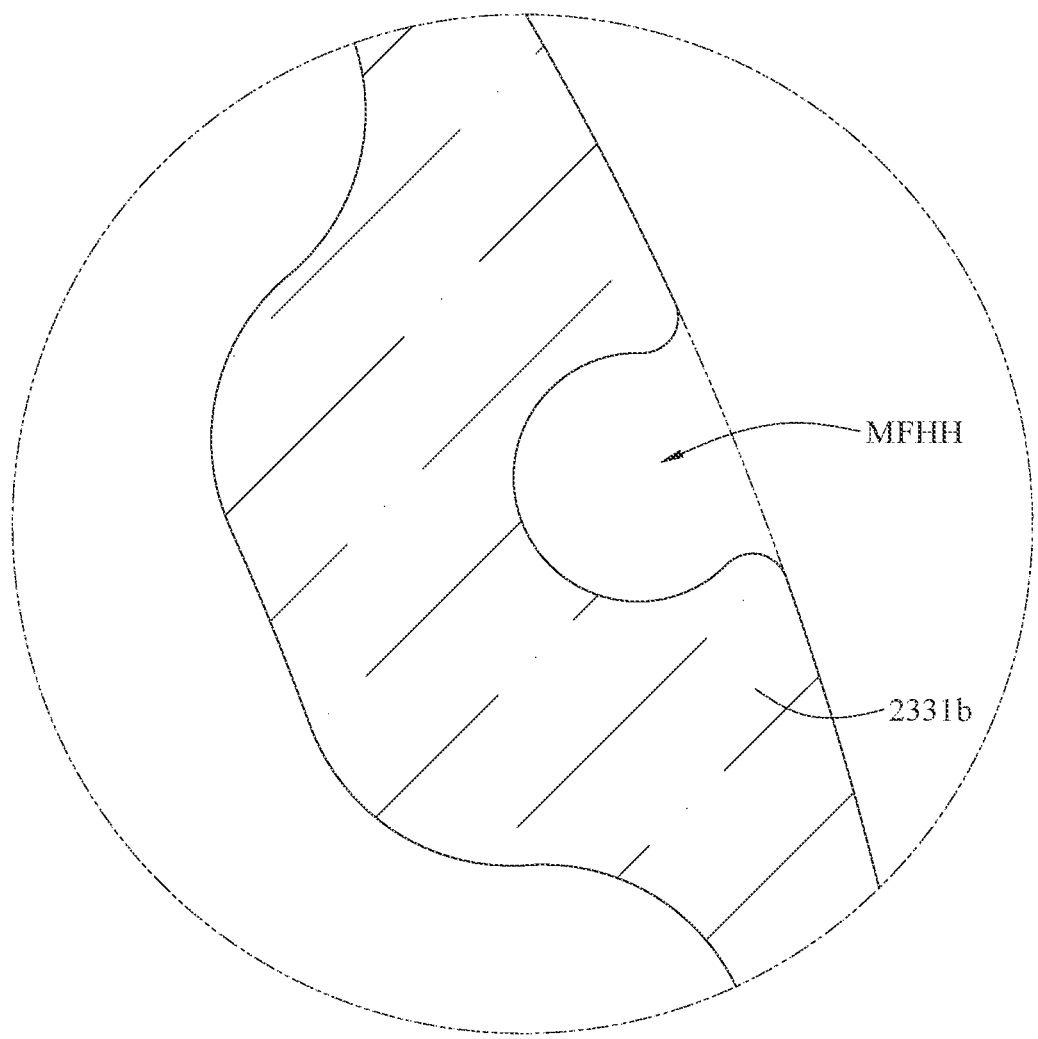
FIG. 27 is an enlarged top view of region EL2 in FIG. 26.
Figure 28:
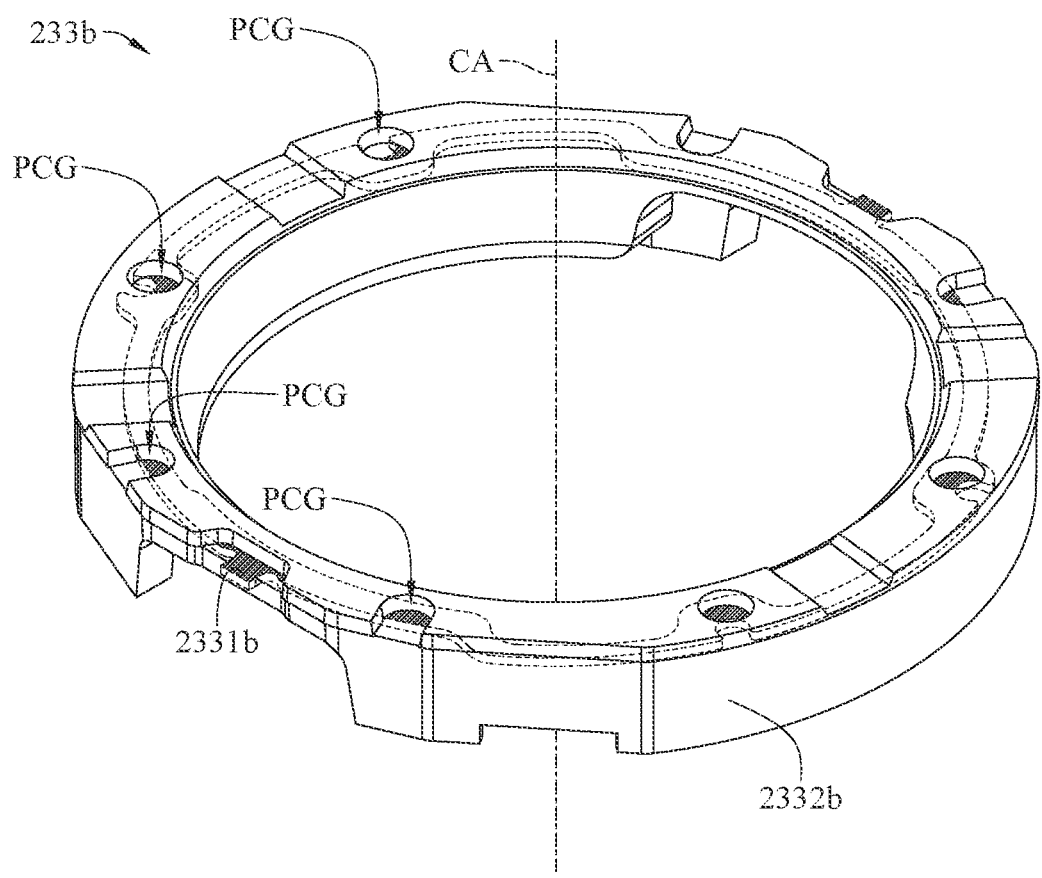
FIG. 28 is another perspective view of the frame element of the fixed portion in FIG. 23.
Figure 29:
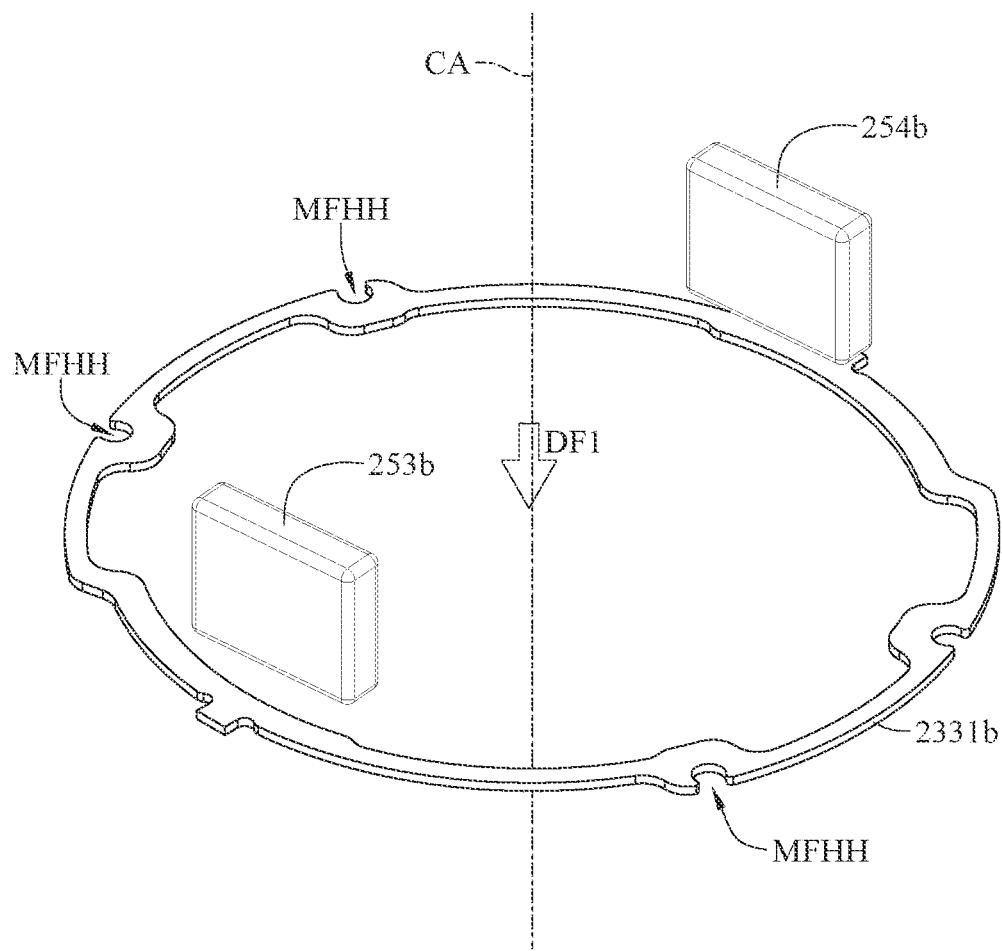
FIG. 29 is a schematic view of the relative position of a metal component of the frame element of the fixed portion and magnets of a driving part in FIG. 23.

Please refer to FIG. 26 to FIG. 29. FIG. 26 is a perspective view of the rollable elements and the frame element of the fixed portion in FIG. 23, FIG. 27 is an enlarged top view of region EL2 in FIG. 26, FIG. 28 is another perspective view of the frame element of the fixed portion in FIG. 23, and FIG. 29 is a schematic view of the relative position of a metal component of the frame element of the fixed portion and the magnets of the driving part in FIG. 23.

In this embodiment, the frame element 233b includes a metal component 2331b and a clad component 2332b, and the metal component 2331b is insert-molded with the clad component 2332b to together form the frame element 233b. The metal component 2331b has a plurality of filled holes MFHH, and the filled holes MFHH are half holes. The clad component 2332b is, for example, made of plastic material or ceramic material, and the clad component 2332b is filled into the filled holes MFHH of the metal component 2331b.

The frame element 233b further has a plurality of recesses PCG located at the clad component 2332b, and a part of the metal component 2331b is exposed by the recesses PCG so as to position the metal component 2331b. Moreover, the recesses PCG are respectively disposed corresponding to the filled holes MFHH of the metal component 2331b so as to reduce the number of holes (e.g., the recesses PCG) of the clad component 2332b, and the filled holes MFHH are respectively partially exposed by the recesses PCG. In this embodiment, the recesses PCG are, for example, ejection holes disposed corresponding to ejector pins of a mold.

The metal component 2331b is ferromagnetic, the metal component 2331b, the first magnet 253b and the second magnet 254b together generate a magnetic attraction in a direction DF1, and the magnetic attraction forces the first magnet 253b, the second magnet 254b and the rotatable element 251b to exert a pressure on the rollable elements 270b in the direction DF1 so as to maintain the position of the rollable elements 270b. In addition, a direction of the magnetic field generated by the first coil 255b and the second coil 256b is different from the direction DF1 of the magnetic attraction between the metal component 2331b and the magnets. As shown in FIG. 29, the filled holes MFHH of the metal component 2331b do not overlap with the first magnet 253b and the second magnet 254b in the direction parallel to central axis CA, such that the filled holes MFHH do not correspond to the magnets 253b and 254b.

Figure 30:
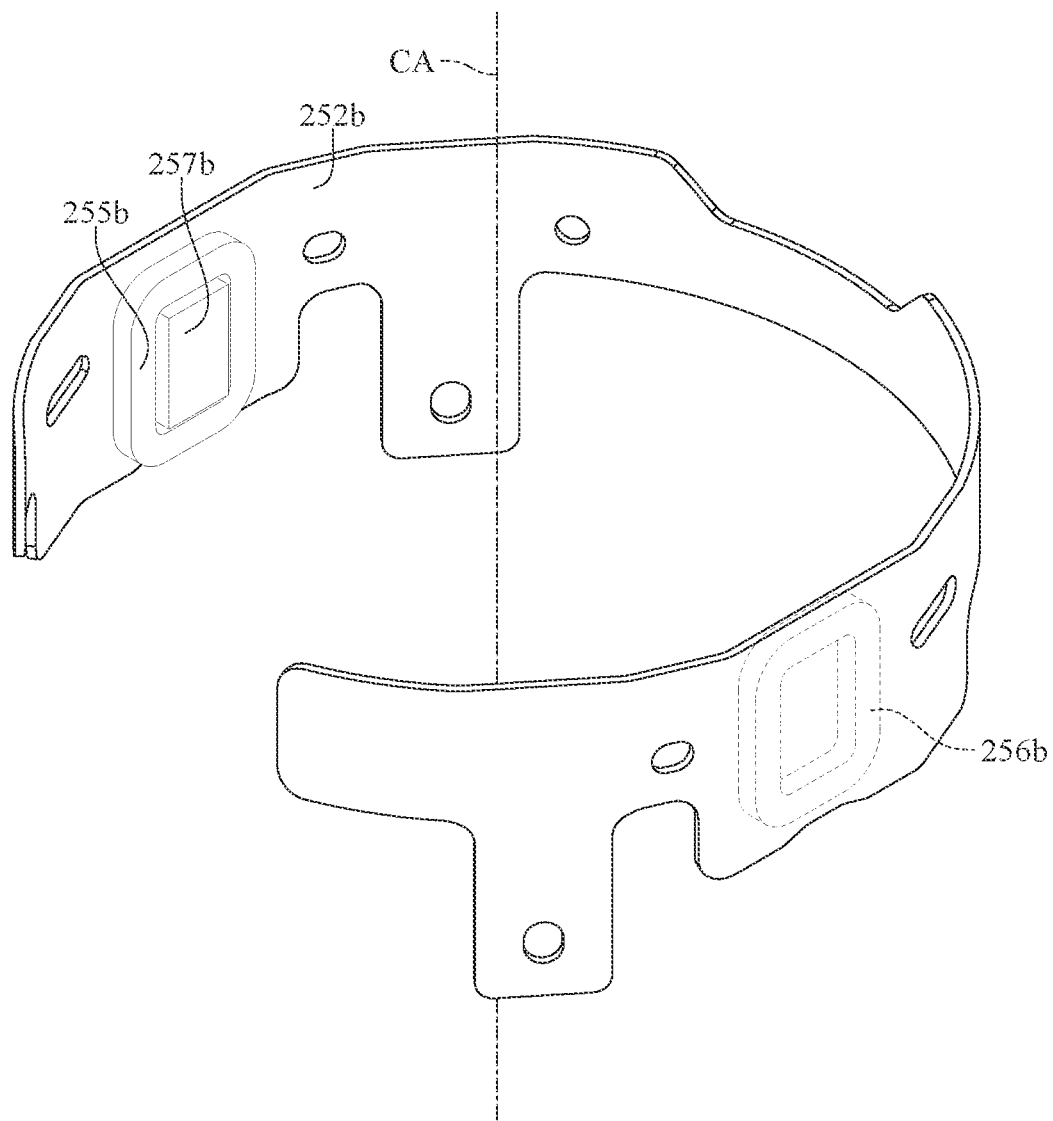
FIG. 30 is a perspective view of a flexible printed circuit board, coils and an electronic component of the driving part in FIG. 23.
Figure 42:
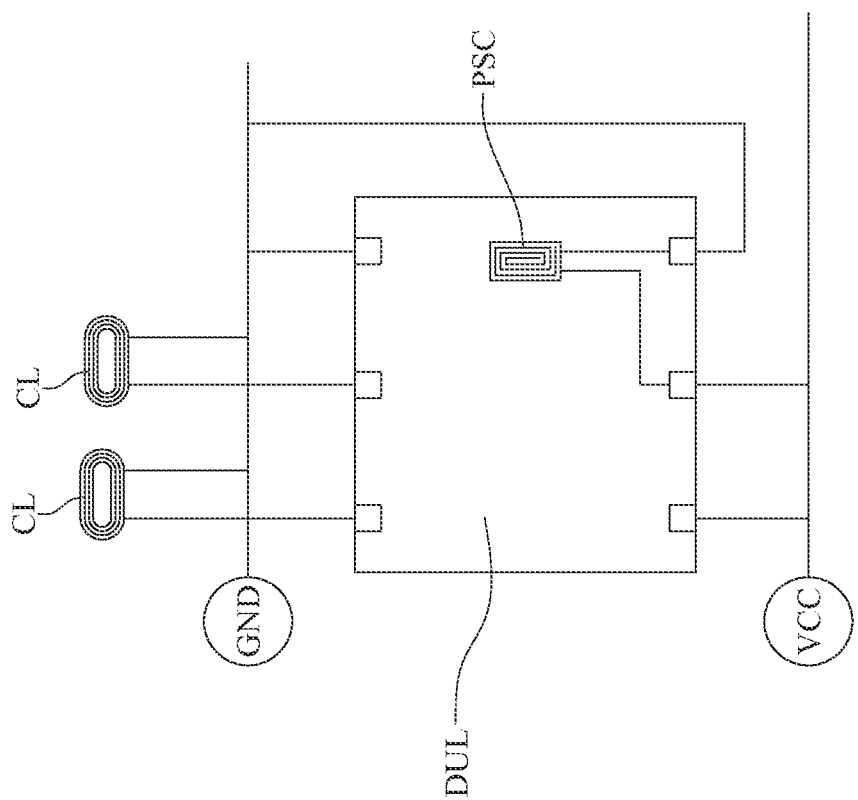
FIG. 42 is a schematic view of an electrical connection of a driver controller and coils according to one embodiment of the present disclosure.

Please refer to FIG. 30, which is a perspective view of the flexible printed circuit board, the coils and an electronic component of the driving part in FIG. 23. The driving part 25b further includes a third electronic component 257b, and the third electronic component 257b is a driver controller having a position sensing circuit, thereby simplifying cable arrangement. The third electronic component 257b is disposed on the flexible printed circuit board 252b and electrically connected to the first coil 255b and the second coil 256b via the flexible printed circuit board 252b, and the third electronic component 257b is configured to control the coils 255b and 256b to generate required magnetic fields. Moreover, the third electronic component 257b is disposed corresponding to the first magnet 253b so as to obtain the position information of the rotatable element 251b and the first magnet 253b in the direction around the light pass aperture 210b through the position sensing circuit, thereby achieving feedback control so as to ensure the accuracy of size adjustment of the controllable aperture stop 2b. The electrical connection and feedback control process of the third electronic component 257b, the first coil 255b and the second coil 256b in this embodiment are illustrated in reference to FIG. 42 and FIG. 43, where FIG. 42 is a schematic view of an electrical connection of a driver controller and coils according to one embodiment of the present disclosure, and FIG. 43 is a block diagram of a feedback control system of the driver controller, the coils and a position sensing circuit in FIG. 42. In FIG. 42, a driver controller DCU has a position sensing circuit PSC, and the driver controller DCU and the position sensing circuit PSC are connected to a power VCC and GND. The driver controller DCU is electrically connected to coils CL so as to control the coils CL to generate required magnetic fields. One end of each of the coils CL is connected to ground GND. The position sensing circuit PSC of the driver controller DCU is configured to obtain the position information of a rotatable element and magnets in a direction around a light pass aperture. As shown in FIG. 43, in a closed loop feedback control system, the position sensing circuit PSC detects the position of the magnets on the rotatable element and feedbacks the same to the driver controller DCU, and therefore, the driver controller DCU may adjust the magnetic field generated by the coils CL so as to adjust the position of the rotatable element.

In this embodiment, the third electronic component 257b is disposed corresponding to the first magnet 253b, and the third electronic component 257b is located farther away from the light pass aperture 210b than the first magnet 253b to the light pass aperture 210b. In this embodiment, the position sensing circuit detects the magnetic field change of the first magnet 253b to obtain position information of components.

Figure 31:
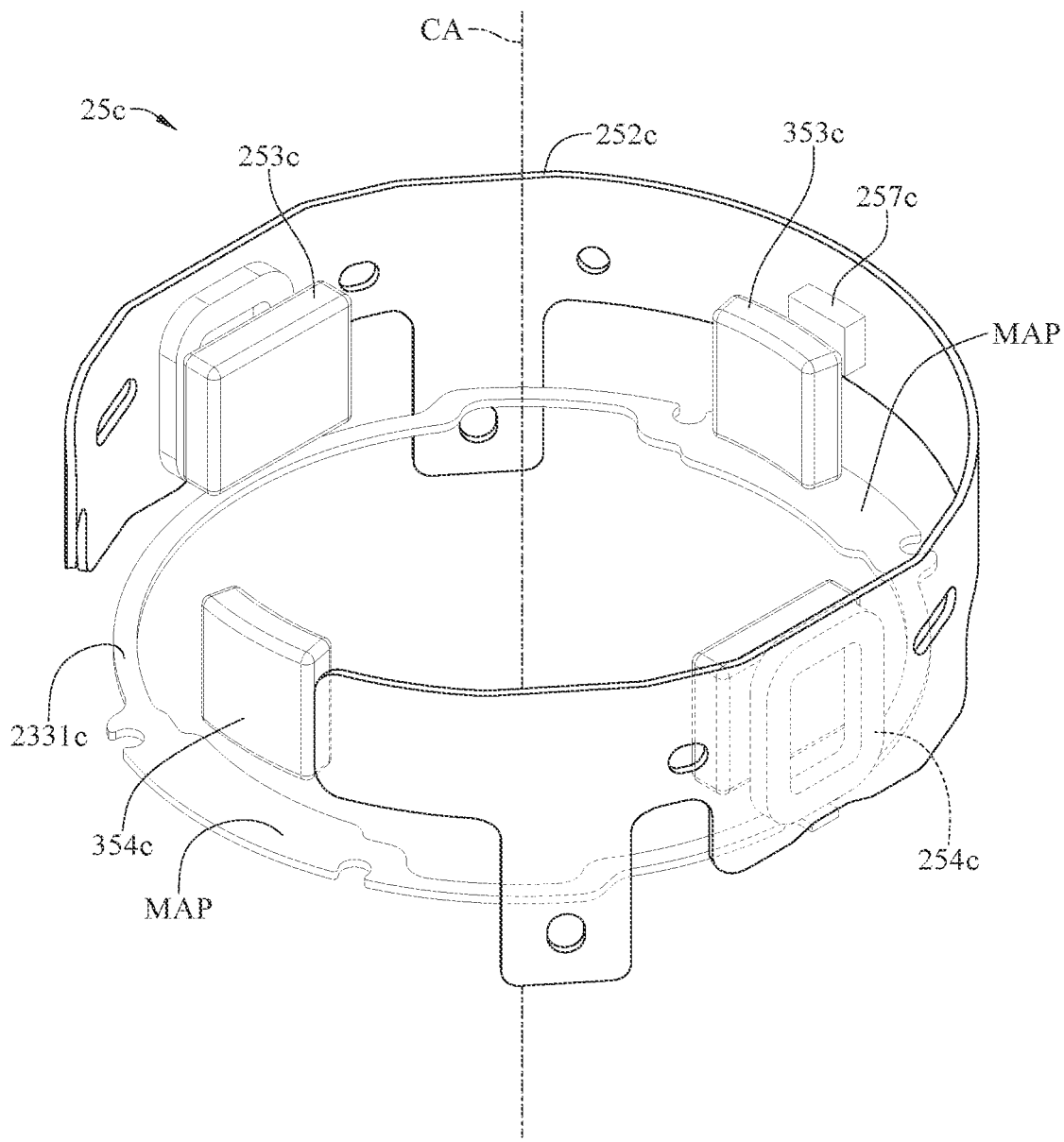
FIG. 31 is a perspective and partial view of a driving part and a metal component of the compact camera module according to another configuration of the 2nd embodiment of the present disclosure.

In this embodiment, the number of magnets of the driving part 25b is two, the third electronic component 257b is disposed corresponding to the first magnet 253b, and the metal component 2331b is made of ferromagnetic material such that the whole metal component 2331b is ferromagnetic, but the present disclosure is not limited thereto. For example, please refer to FIG. 31, which is a perspective and partial view of a driving part and a metal component of the compact camera module according to another configuration of the 2nd embodiment of the present disclosure. In other embodiments, the number of magnets of a driving part 25c is four; that is, the driving part 25c further includes a third magnet 353c and a fourth magnet 354c disposed on the side wall of a rotatable element, and the third magnet 353c and the fourth magnet 354c are respectively disposed between a first magnet 253c and a second magnet 254c, such that the first magnet 253c, the second magnet 254c, the third magnet 353c and the fourth magnet 354c together surround the rotatable element. Moreover, a third electronic component 257c disposed on a flexible printed circuit board 252c is disposed corresponding to the third magnet 353c, and the third electronic component 257c is configured to detect the magnetic field change of the third magnet 353c through a position sensing circuit thereof so as to obtain the position information of the rotatable element and the third magnet 353c in a direction around the light pass aperture. In addition, a metal component 2331c is not entirely ferromagnetic but includes two attraction portions MAP that are ferromagnetic at some portions thereof. The attraction portions MAP are respectively disposed corresponding to the third magnet 353c and the fourth magnet 354c so as to together generate a magnetic attraction in the direction DF1, and the magnetic attraction forces the third magnet 353c, the fourth magnet 354c and the rotatable element to exert a pressure on rollable elements in the direction DF1 so as to stabilize the operation process.

When a shortest distance between the first magnet 253b and the central axis CA is rm, and a shortest distance between the first coil 255b and the central axis CA is rc, the following conditions are satisfied: rm=4.12 mm; rc=4.31 mm; and rm/rc=0.96. In this embodiment, the distance relation between the second magnet 254b, the second coil 256b and the central axis CA can also satisfy the above conditions.

When a shortest distance between the rollable elements 270b and the central axis CA is rb, and the farthest distance between the first magnet 253b and the central axis CA is rm, the following conditions are satisfied: rb=3.75 mm; rm=4.12 mm; and rb/rm=0.91.

When the farthest distance between the first magnet 253b and the central axis CA is rm, and a shortest distance between the third electronic component 257b and the central axis CA is rp, the following conditions are satisfied: rm=4.12 mm; rp=4.25 mm; and rm/rp=0.97.

Figure 32:
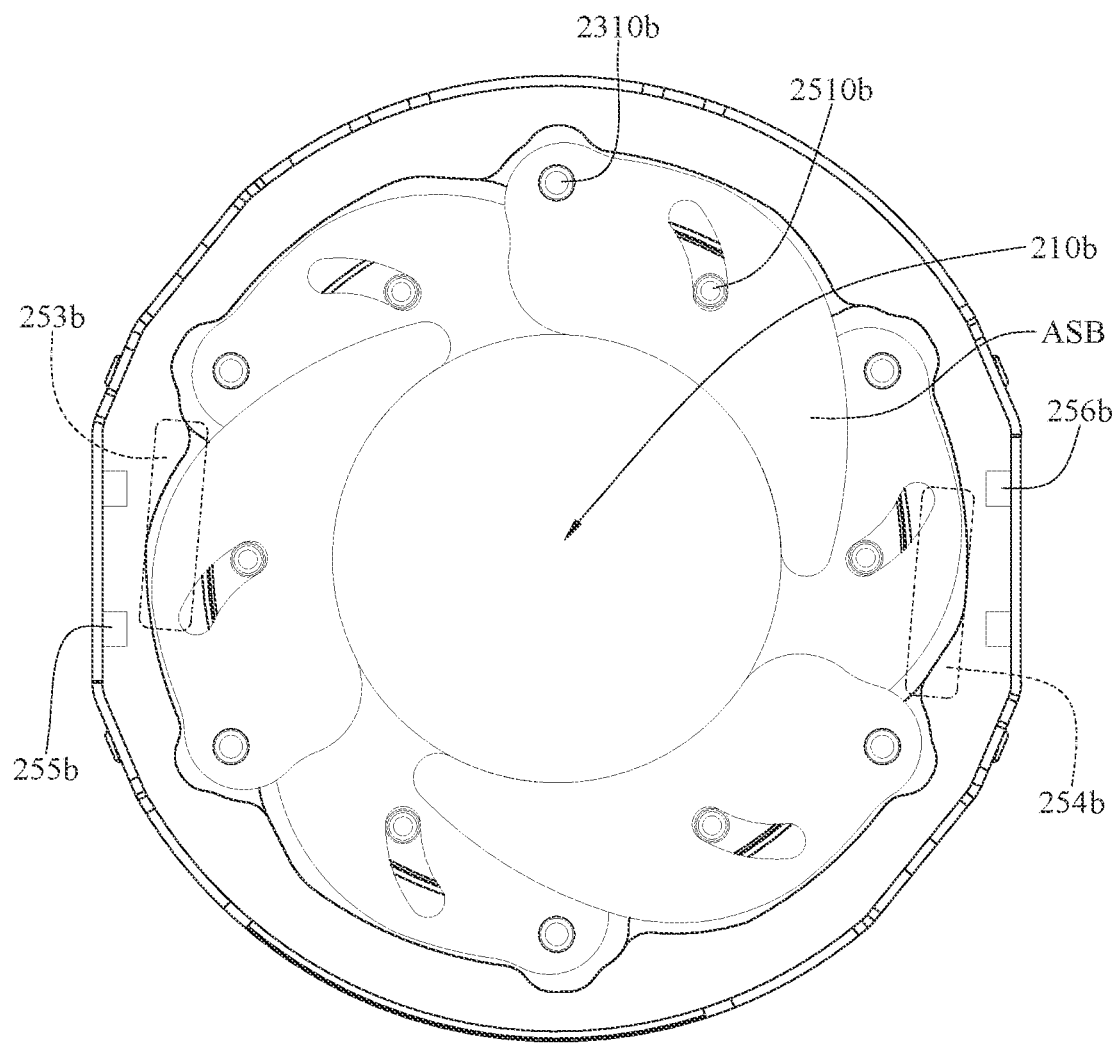
FIG. 32 is a top view of the controllable aperture stop of the compact camera module in a maximum aperture state according to the 2nd embodiment of the present disclosure.
Figure 33:
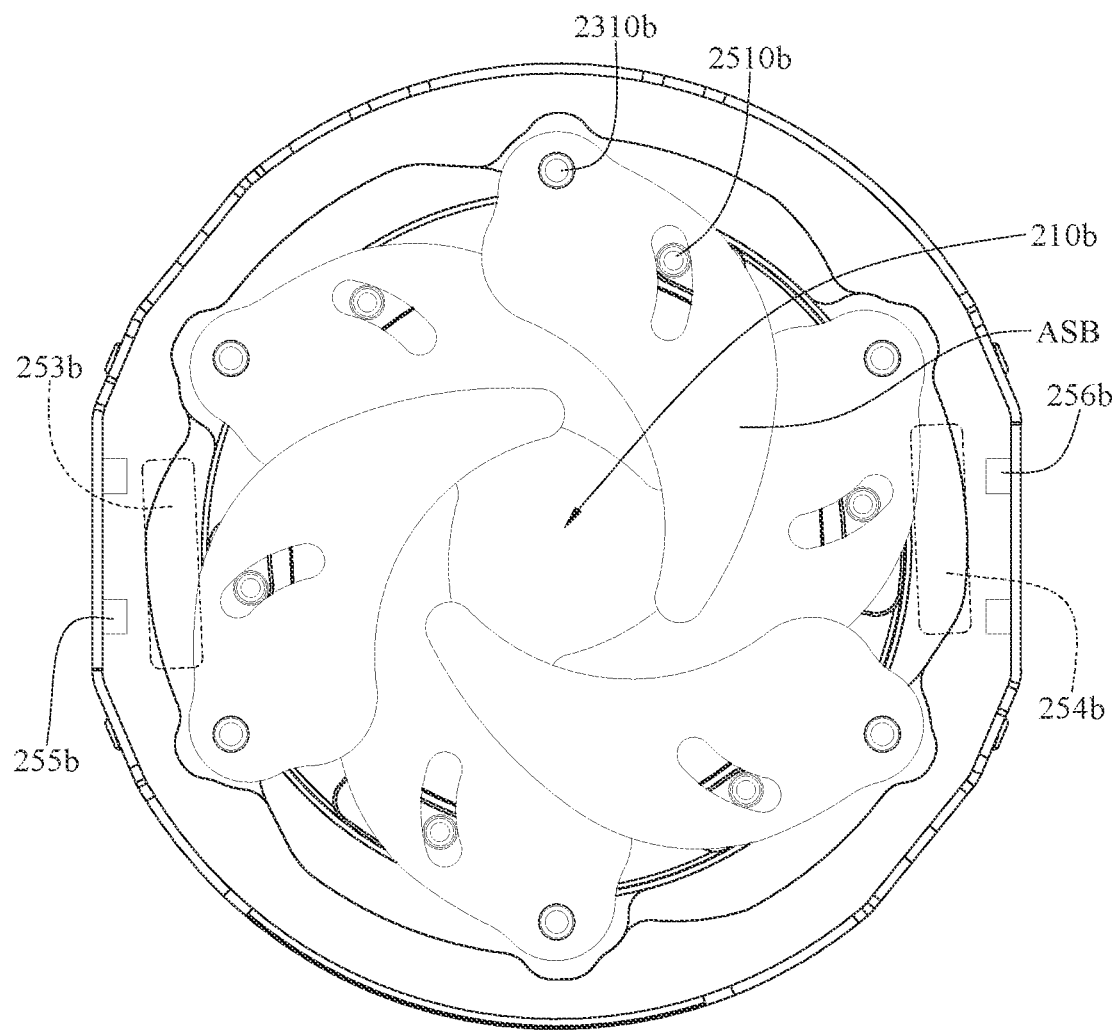
FIG. 33 is a top view of the controllable aperture stop of the compact camera module in another aperture state according to the 2nd embodiment of the present disclosure.
Figure 34:
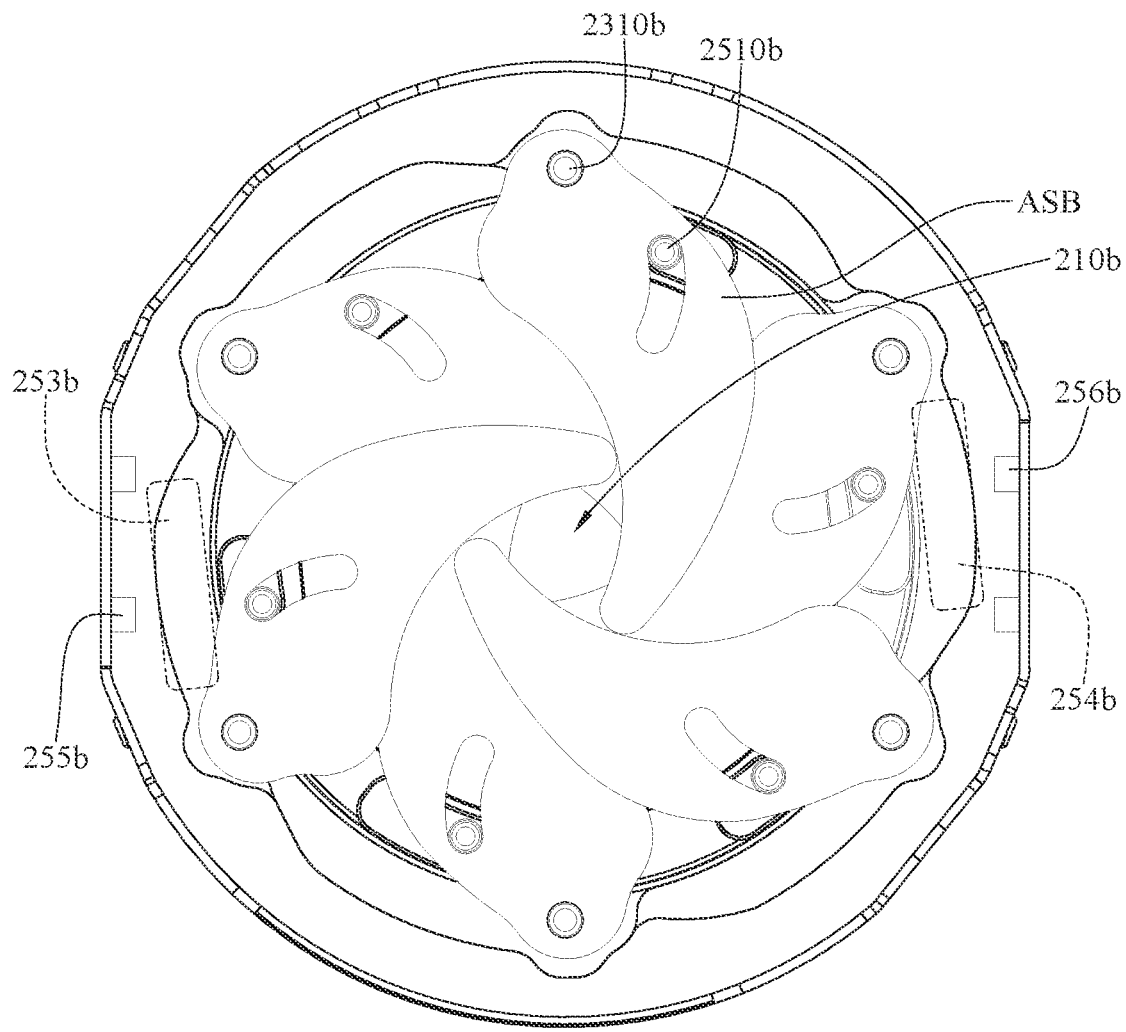
FIG. 34 is a top view of the controllable aperture stop of the compact camera module in another aperture state according to the 2nd embodiment of the present disclosure.

Please refer to FIG. 24 and FIG. 32 to FIG. 34, where FIG. 32 is a top view of the controllable aperture stop of the compact camera module in a maximum aperture state according to the 2nd embodiment of the present disclosure, FIG. 33 is a top view of the controllable aperture stop of the compact camera module in another aperture state according to the 2nd embodiment of the present disclosure, and FIG. 34 is a top view of the controllable aperture stop of the compact camera module in another aperture state according to the 2nd embodiment of the present disclosure.

In this embodiment, the size of the light pass aperture 210b can be adjusted by the driving part 25b, so that the controllable aperture stop 2b can have various aperture states, and thus, the compact camera module 1b has different f-numbers.

For example, as shown in FIG. 24, when the size of the light pass aperture 210b is to be reduced, the first magnet 253b, the second magnet 254b, the first coil 255b and the second coil 256b of the driving part 25b together generate a driving force to drive the rotatable element 251b to rotate in a rotation direction DF5. At this moment, the rollable elements 270b are driven by the rotatable element 251b to move in the curved installation structures AMS of the frame element 233b in a rolling direction DF6. Therefore, the rotatable element 251b is rotatable relative to the frame element 233b of the fixed portion 23b. When the rotatable element 251b is rotated in the rotation direction DF5, the connection protrusions 2510b of the rotatable element 251b drive the movable blades ASB to rotate in a direction DF7 respectively around the shaft structures 2310b of the shaft element 231b as rotation axes, thereby enlarging the size of the light pass aperture 210b.

On the other hand, when the size of the light pass aperture 210b is to be enlarged, the first magnet 253b, the second magnet 254b, the first coil 255b and the second coil 256b of the driving part 25b together generate a driving force to drive the rotatable element 251b to rotate in a direction opposite to the rotation direction DF5, and the connection protrusions 2510b of the rotatable element 251b drive the movable blades ASB to rotate respectively around the shaft structures 2310b of the shaft element 231b as rotation axes in a direction opposite to the direction DF7, thereby reducing the size of the light pass aperture 210b. FIG. 32 to FIG. 34 respectively show three aperture states of the controllable aperture stop 2b in this embodiment.

As shown in FIG. 32, when the controllable aperture stop 2b is in a first aperture state, a focal length of the compact camera module 1b is f, and an aperture area of the light pass aperture 210b is at the following conditions are satisfied: f=6.19 mm; a1=15.34 mm$^2$; and f$\sqrt{}$(a1)=1.58. In the first aperture state, an f-number of the compact camera module 1b is fno, and the following condition is satisfied: fno=1.4. Moreover, a difference between a farthest distance and a shortest distance between a periphery of the light pass aperture 210b and the central axis CA is smaller than 9.8%. In this embodiment, the first aperture state is the maximum aperture state of the controllable aperture stop 2b, and the light pass aperture 210b in the maximum aperture state.

As shown in FIG. 33, when the controllable aperture stop 2b is in a second aperture state, the focal length of the compact camera module 1b is f, and the aperture area of the light pass aperture 210b is a1, the following conditions are satisfied: f=6.19 mm; a1=3.84 mm$^2$; and f$\sqrt{}$(a1)=3.16. In the second aperture state, the f-number of the compact camera module 1b is fno, and the following condition is satisfied: fno=2.8.

As shown in FIG. 34, when the controllable aperture stop 2b is in a third aperture state, the focal length of the compact camera module 1b is f, and the aperture area of the light pass aperture 210b is a1, the following conditions are satisfied: f=6.19 mm; a1=0.96 mm$^2$; and f$\sqrt{}$(a1)=6.32. In the third aperture state, the f-number of the compact camera module 1b is fno, the following condition is satisfied: fno=5.6.

3rd Embodiment

Figure 35:
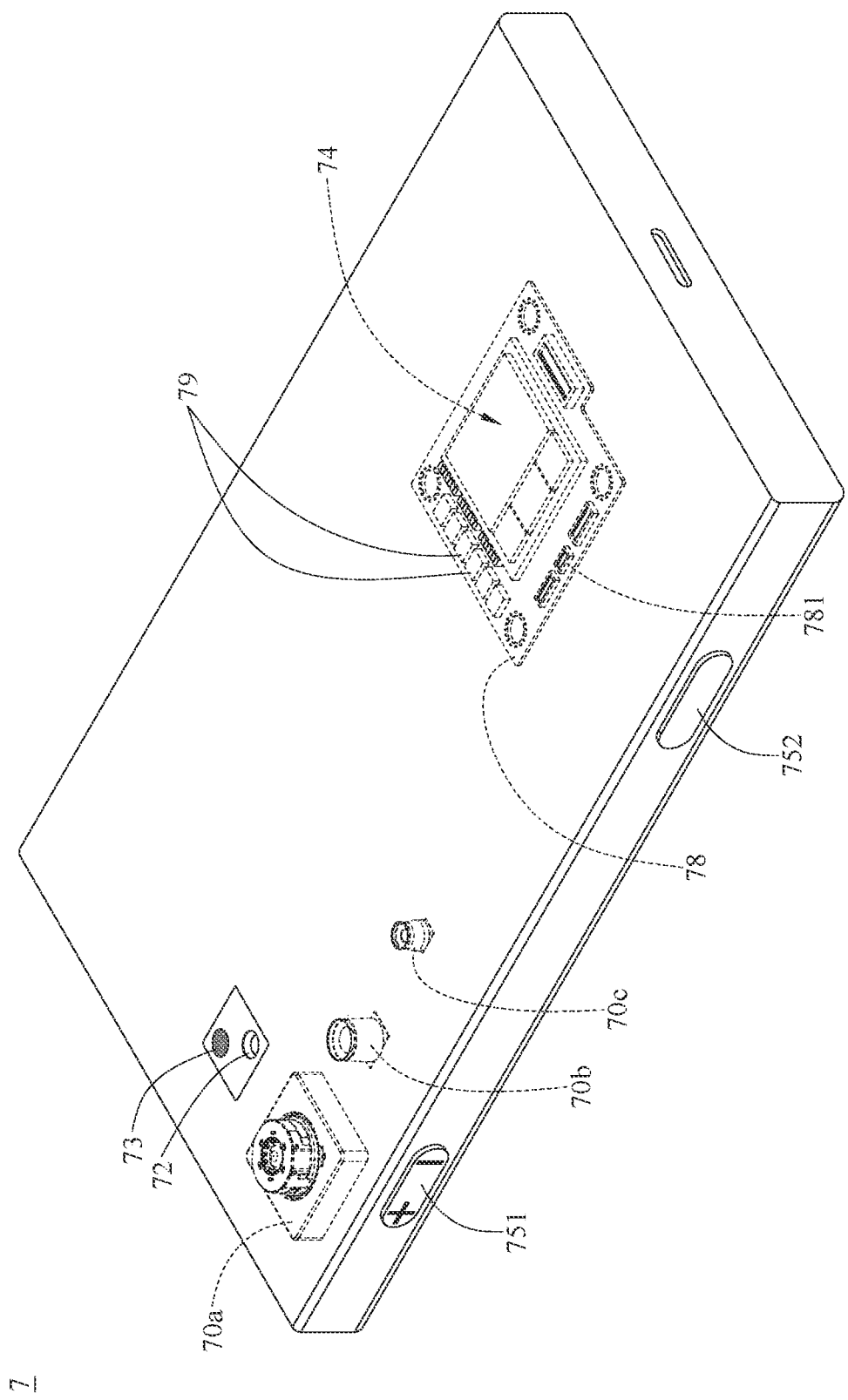
FIG. 35 is one perspective view of an electronic device according to the 3rd embodiment of the present disclosure.
Figure 36:
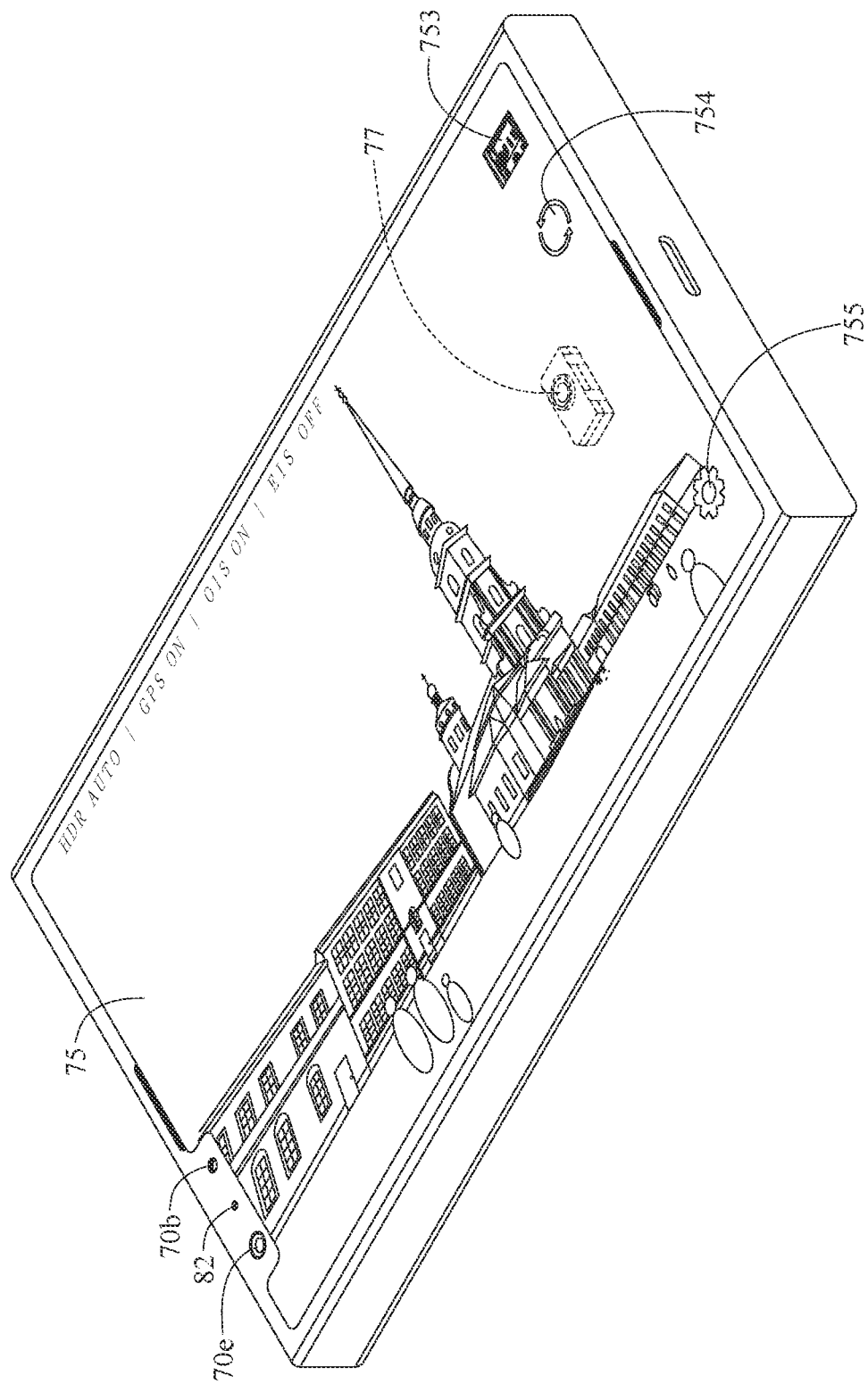
FIG. 36 is another perspective view of the electronic device in FIG. 35.
Figure 37:
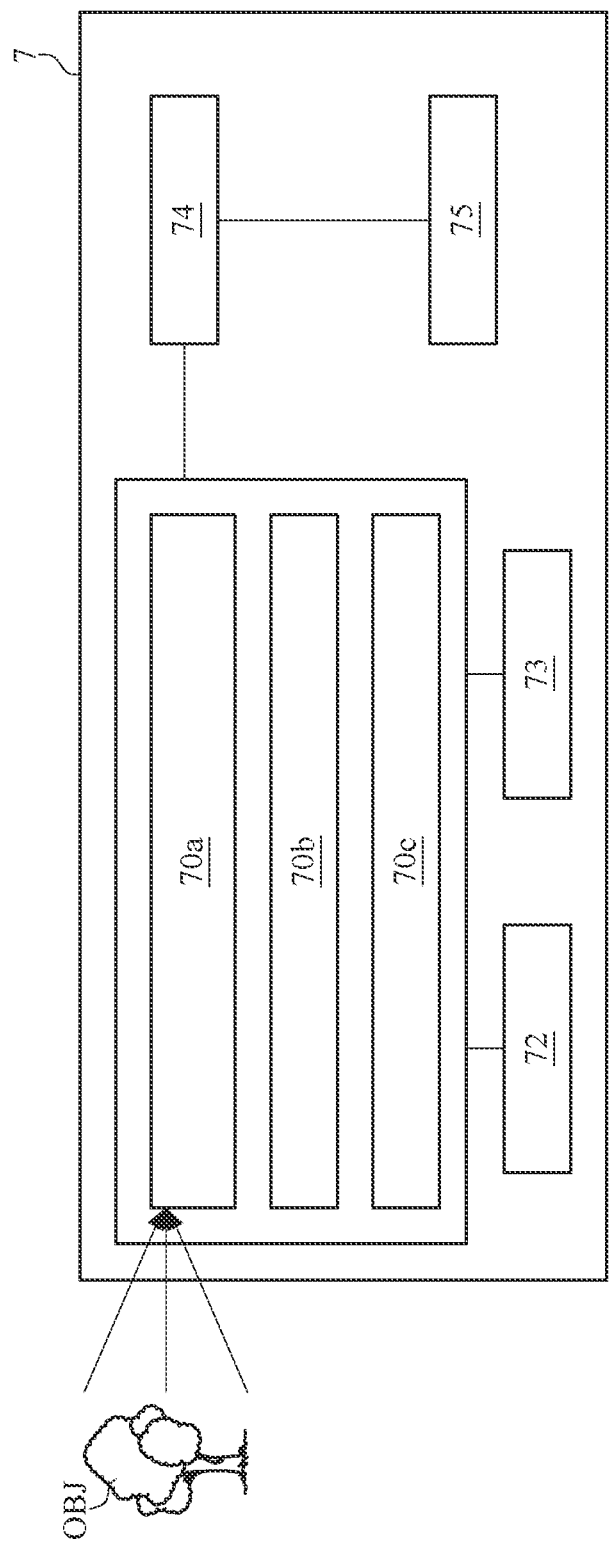
FIG. 37 is a block diagram of the electronic device in FIG. 35.

Please refer to FIG. 35 to FIG. 37. FIG. 35 is one perspective view of an electronic device according to the 3rd embodiment of the present disclosure, FIG. 36 is another perspective view of the electronic device in FIG. 35, and FIG. 37 is a block diagram of the electronic device in FIG. 35.

In this embodiment, an electronic device 7 is a mobile device such as a computer, a smartphone, a smart wearable device, a camera drone, a driving recorder and displayer, and the present disclosure is not limited thereto. The electronic device 7 includes a compact camera module 70a having a controllable aperture stop, a wide-angle compact camera module 70b, a macro-photo compact camera module 70c, a compact camera module 70d, a ToF (time of flight) camera module 70e, a flash module 72, a focus assist module 73, an image signal processor, a display module 75, an image software processor and a biometric identification device 77. In addition, the compact camera module 70a a having controllable aperture stop is, for example, the compact camera module 1 as disclosed in the 1st embodiment, but the present disclosure is not limited thereto. Each of the camera modules 70b, 70c, 70d and 70e may be one of the compact camera modules as disclosed in the above embodiments of the present disclosure.

The compact camera module 70a, the compact camera module 70b and the compact camera module 70c are disposed on the same side of the electronic device 7. The compact camera module 70d, the ToF camera module 70e and the display module 75 are disposed on the opposite side of the electronic device 7. The display module 75 can be a user interface, such that the camera module 70d and the camera module 70e can be front-facing cameras of the electronic device 7 for taking selfies, but the present disclosure is not limited thereto.

Figure 38:
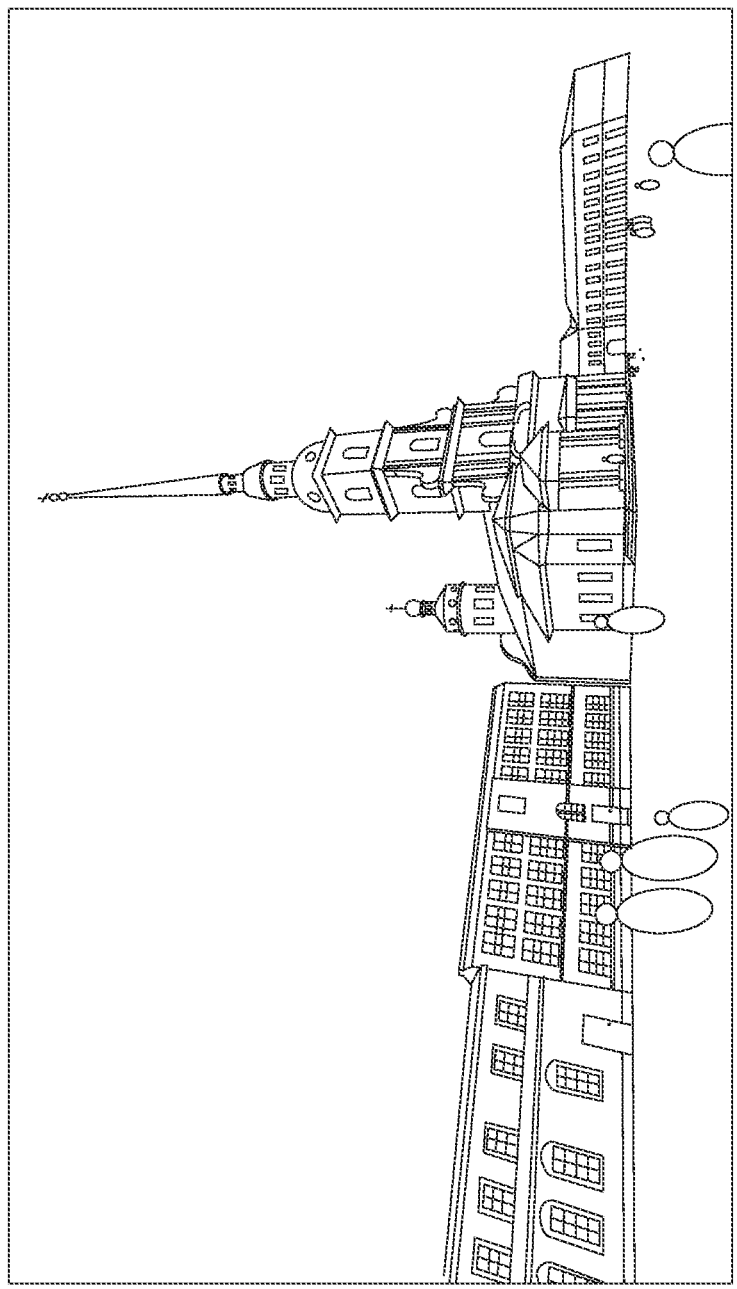
FIG. 38 shows an image captured by the electronic device using a wide-angle compact camera module in FIG. 35.
Figure 39:
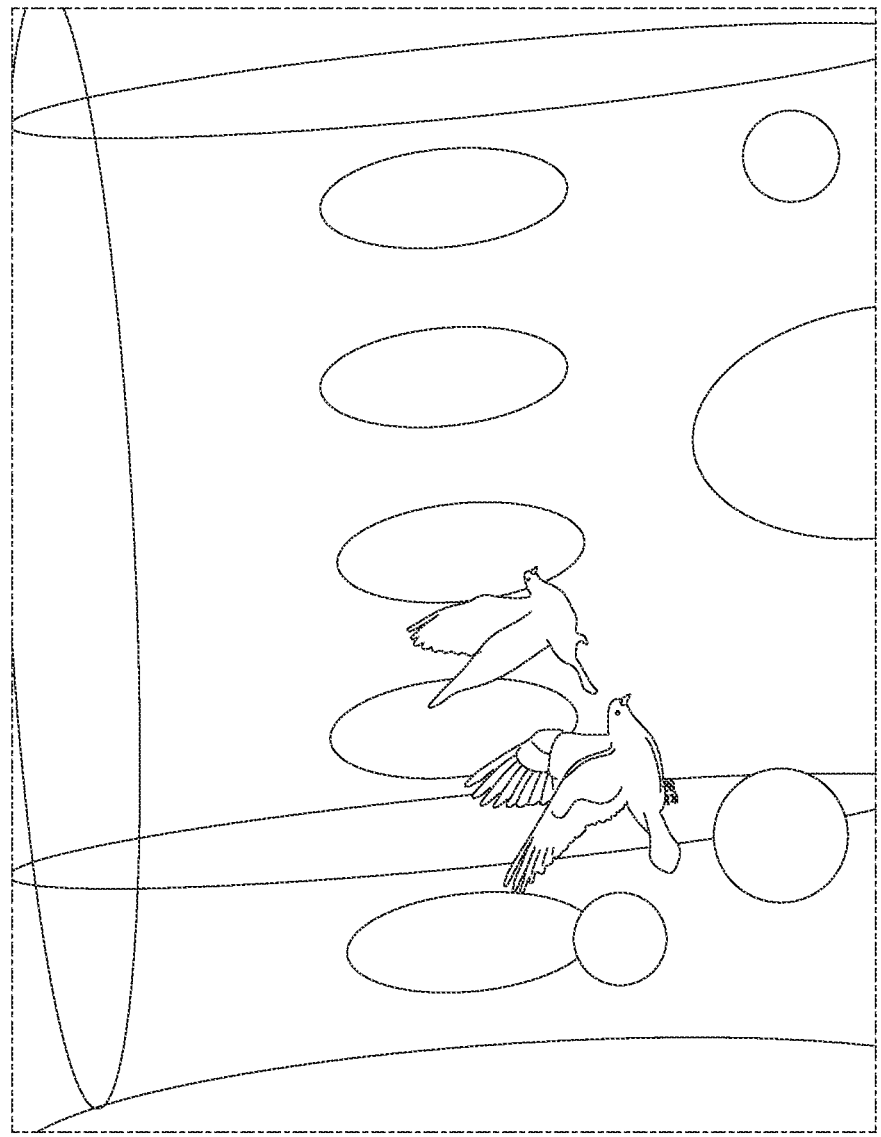
FIG. 39 shows an image captured by the electronic device using a compact camera module having controllable aperture stop in FIG. 35 with an F-number of 1.4.
Figure 40:
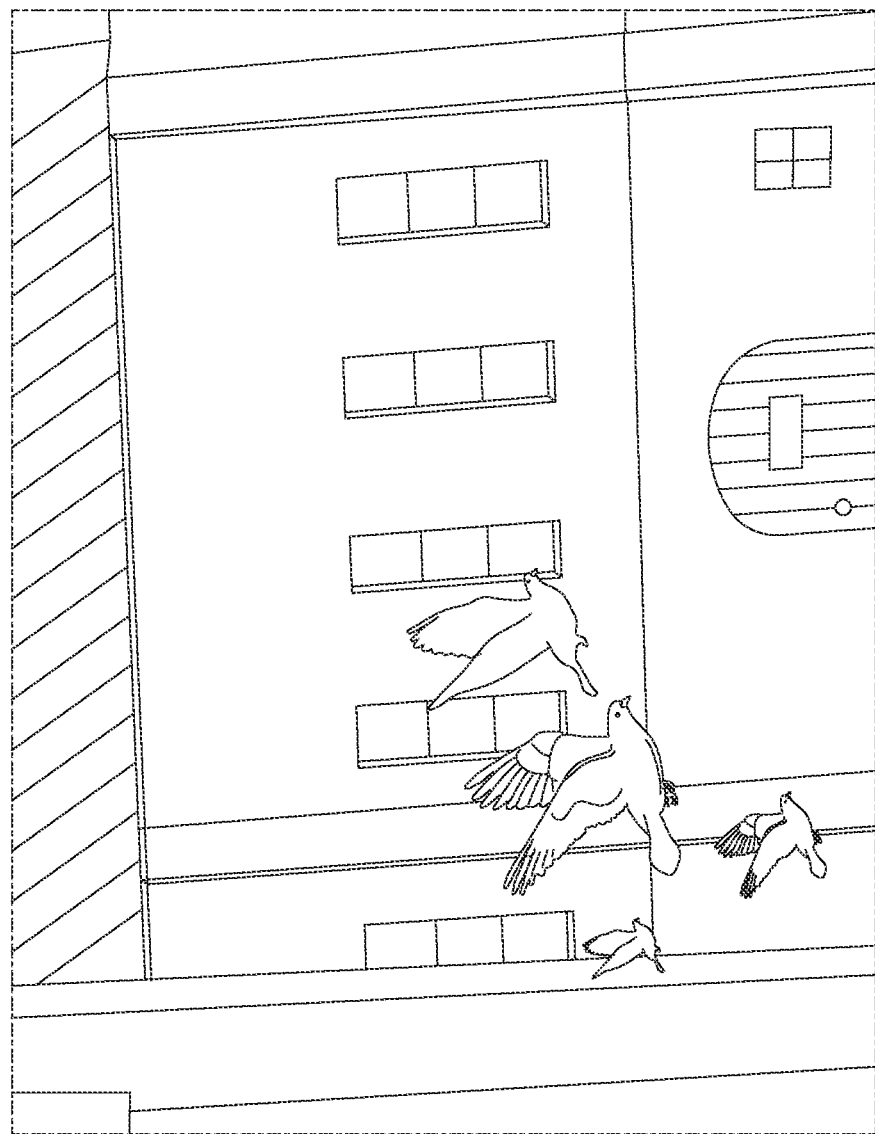
FIG. 40 shows an image captured by the electronic device using a compact camera module having controllable aperture stop in FIG. 35 with an F-number of 5.6.

In this embodiment, the compact camera module 70a, the compact camera module 70b and the compact camera module 70c have different fields of view, such that the electronic device 7 can have various magnification ratios so as to meet the requirement of optical zoom functionality. For example, the wide-angle compact camera module 70b has a relatively large field of view, and the image captured by the wide-angle compact camera module 70b can refer to FIG. 38, which shows an image captured by the electronic device 7 with a wide-angle compact camera module, and the captured image as shown in FIG. 38 includes the whole cathedral, surrounding buildings and people in front of the cathedral. The captured image as shown in FIG. 38 has a relatively large field of view and depth of view, but it often has a relatively large degree of distortion. The image captured by the compact camera module 70a having a controllable aperture stop with a relatively small f-number can refer to FIG. 39, and the image captured by the compact camera module 70a having a controllable aperture stop with a relatively large f-number can refer to FIG. 40. FIG. 39 shows an image captured by the electronic device 7 with a compact camera module having a controllable aperture stop with an f-number of 1.4, FIG. 40 shows an image captured by the electronic device 7 with a compact camera module having a controllable aperture stop with an f-number of 5.6, and the captured images as shown in FIG. 39 and FIG. 40 include birds flying in front of the cathedral. As shown in FIG. 39, when the controllable aperture stop of the compact camera module 70a provides a relatively large light pass aperture, the image sensor receives more light, but the background in the image is relatively blurry. As shown in FIG. 40, when the controllable aperture stop of the compact camera module 70a provides a relatively small light pass aperture, the image sensor receives less light, but the background in the image is relatively clear. The captured images as shown in FIG. 39 and FIG. 40 have a relatively small field of view and depth of view, and the compact camera module 70a having a controllable aperture stop can be used for shooting moving targets. For example, the lens driving unit can drive the lens assembly to quickly and continuously autofocus on the target, such that the captured image of the target would not be blurred due to long focusing distance. When imaging, the compact camera module 70a having a controllable aperture stop can further perform optical zoom for imaged objects so as to obtain clearer images. In addition, the camera module 70e can determine depth information of the imaged object. In this embodiment, the electronic device 7 includes multiple camera modules 70a, 70b, 70c, 70d, and 70e, but the present disclosure is not limited to the number and arrangement of camera modules.

When a user captures images of an object OBJ, light rays converge in the camera module 70a, the camera module 70b or the camera module 70c to generate images, and the flash module 72 is activated for light supplement. The focus assist module 73 detects the object distance of the imaged object OBJ to achieve fast auto focusing. The image signal processor is configured to optimize the captured image to improve image quality. The light beam emitted from the focus assist module 73 can be either conventional infrared or laser.

In addition, the light rays may converge in the camera module 70d or the camera module 70e to generate images. The electronic device 7 can include a reminder light 82 that can be illuminated to remind the user that the camera module 70d or the camera module 70e is working. The display module 75 can be a touch screen or physical buttons such as a zoom button 751 and a shutter release button 752. The user is able to interact with the display module 75 and the image software processor having multiple functions to capture images and complete image processing. The image processed by the image software processor can be displayed on the display module 75. The user can replay the previously captured image through an image playback button 753 of the display module 75, can choose a suitable camera module for shooting through a camera module switching button 754 of the display module 75, and can properly adjust shooting parameters according to current shooting situations through an integrated menu button 755 of the display module 75.

Further, the electronic device 7 further includes a circuit board 78 and a plurality of electronic components 79 disposed on the circuit board 78. The camera modules 70a, 70b, 70c, 70d, and 70e are electrically connected to the electronic component 79 via connectors 781 on the circuit board 78. The electronic components 79 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 79 can also include a storage unit, a random access memory for storing image information, a gyroscope, and a position locator for facilitating the navigation or positioning of the electronic device 7. In this embodiment, the image signal processor, the image software processor and the random access memory are integrated into a single chip system 74, but the present disclosure is not limited thereto. In some other embodiments, the electronic components can also be integrated in the camera module or can also be disposed on one of the circuit boards. In addition, the user can use the biometric identification device 77 to turn on and unlock the electronic device 7.

The smartphone in this embodiment is only exemplary for showing the compact camera module of the present disclosure installed in an electronic device, and the present disclosure is not limited thereto. The compact camera module can be optionally applied to optical systems with a movable focus. Furthermore, the compact camera module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A controllable aperture stop comprising:
   a light pass portion comprising a plurality of movable blades, and the plurality of movable blades together surrounding a light pass aperture;
   a fixed portion having a plurality of shaft structures respectively disposed corresponding to the plurality of movable blades;
   a driving part comprising:
      a rotatable element connected to the plurality of movable blades, and the rotatable element configured to drive the plurality of movable blades to rotate respectively relative to the plurality of shaft structures so as to adjust a size of the light pass aperture;
      a first magnet disposed on the rotatable element; and
      a first coil disposed corresponding to the first magnet, and the first magnet and the first coil configured to drive the rotatable element to rotate around the light pass aperture; and
   a plurality of rollable elements disposed between the fixed portion and the rotatable element and arranged around the light pass aperture, so that the rotatable element can be rotated relative to the fixed portion;
   wherein the fixed portion comprises a frame element, the frame element is in physical contact with the plurality of rollable elements so as to support the plurality of rollable elements and the rotatable element, the frame element comprises a metal component and a clad component, and the metal component is insert-molded with the clad component to together form the frame element;
   wherein the metal component has a plurality of filled holes, the clad component is filled into the plurality of filled holes, and the plurality of filled holes and the first magnet do not overlap with each other in a direction parallel to a central axis of the light pass aperture.

2. The controllable aperture stop of claim 1, wherein the fixed portion further comprises a shaft element, the shaft element has the plurality of shaft structures, and the shaft element and the frame element are fixed to each other.

3. The controllable aperture stop of claim 1, wherein the fixed portion further comprises a cover, the plurality of movable blades are disposed between the cover and the rotatable element, the cover comprises a positioning hole, and the positioning hole is disposed corresponding to one of the plurality of shaft structures.

4. The controllable aperture stop of claim 3, wherein the cover comprises an inner surface facing the plurality of movable blades;
wherein an arithmetic average roughness (Ra) of the inner surface is smaller than 0.25 μm.

5. The controllable aperture stop of claim 3, wherein the cover comprises an inner surface and an outer surface, the inner surface faces the plurality of movable blades, the outer surface is located farther away from the plurality of movable blades than the inner surface to the plurality of movable blades, and a reflectivity of the outer surface is smaller than a reflectivity of the inner surface.

6. The controllable aperture stop of claim 1, wherein the first magnet is in an arc shape, and a direction of the arc shape corresponds to a rotation direction of the first magnet.

7. The controllable aperture stop of claim 1, wherein the fixed portion further comprises a top contact surface, and the plurality of movable blades are disposed on the top contact surface;
wherein an arithmetic average roughness (Ra) of the top contact surface is smaller or equal to 0.25 μm.

8. The controllable aperture stop of claim 1, wherein the rotatable element comprises a bottom contact surface, and the plurality of movable blades are disposed on the bottom contact surface;
wherein an arithmetic average roughness (Ra) of the bottom contact surface is smaller than 0.25 μm.

9. The controllable aperture stop of claim 1, wherein the frame element further comprises a curved installation structure, and at least one of the plurality of rollable elements is disposed on the curved installation structure and movable along the curved installation structure in a direction around the light pass aperture.

10. The controllable aperture stop of claim 1, wherein the driving part further comprises a driver controller electrically connected to the first coil.

11. The controllable aperture stop of claim 10, wherein the driver controller has a position sensing circuit.

12. The controllable aperture stop of claim 1, wherein the plurality of movable blades consist of a first blade assembly and a second blade assembly, the first blade assembly comprises some of the plurality of movable blades, and the second blade assembly comprises others of the plurality of movable blades;
wherein in a direction parallel to the central axis, the plurality of movable blades of the first blade assembly do not overlap with one another, the plurality of movable blades of the second blade assembly do not overlap with one another, and the first blade assembly and the second blade assembly at least partially overlap with each other; and
wherein in a direction around the light pass aperture, the plurality of movable blades of the first blade assembly at least partially overlap with one another, the plurality of movable blades of the second blade assembly at least partially overlap with one another, and the first blade assembly and the second blade assembly do not overlap with each other.

13. The controllable aperture stop of claim 1, wherein the driving part further comprises a second magnet and a second coil, and the second magnet and the second coil are disposed symmetrical to the first magnet and the first coil.

14. The controllable aperture stop of claim 1, wherein when the controllable aperture stop is in a maximum aperture state, a difference between a farthest distance and a shortest distance between a periphery of the light pass aperture and the central axis is smaller than 9.8%.

15. The controllable aperture stop of claim 1, wherein one of the plurality of filled holes is a C-shaped hole.

16. The controllable aperture stop of claim 1, wherein the metal component is ferromagnetic, the metal component and the first magnet are disposed corresponding to each other so as to generate a magnetic attraction, and the magnetic attraction forces the first magnet and the rotatable element to exert a pressure on the plurality of rollable elements.

17. The controllable aperture stop of claim 1, wherein the frame element has a plurality of recesses, the plurality of recesses are respectively disposed corresponding to the plurality of filled holes, and the plurality of filled holes are respectively partially exposed by the plurality of recesses.

18. A compact camera module comprising:
the controllable aperture stop of claim 1, wherein the controllable aperture stop is disposed on an aperture position of the compact camera module;
wherein a focal length of the compact camera module is f, an aperture area of the light pass aperture is a1, and the following condition is satisfied:

$$1.19 \leq f/\sqrt{(a1)} \leq 11.99.$$

19. An electronic device comprising:
the compact camera module of claim 18.

* * * * *